(12) United States Patent
Anand et al.

(10) Patent No.: US 9,613,102 B2
(45) Date of Patent: Apr. 4, 2017

(54) SYSTEMS AND METHODS FOR RANKING DATA VISUALIZATIONS

(71) Applicant: Tableau Software, Inc., Seattle, WA (US)

(72) Inventors: Anushka Anand, Seattle, WA (US); Jock Douglas Mackinlay, Bellevue, WA (US); Kanit Wongsuphasawat, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 100 days.

(21) Appl. No.: 14/242,843

(22) Filed: Apr. 1, 2014

(65) Prior Publication Data

US 2015/0278213 A1 Oct. 1, 2015

(51) Int. Cl.
*G06F 17/30* (2006.01)

(52) U.S. Cl.
CPC .... *G06F 17/3053* (2013.01); *G06F 17/30554* (2013.01)

(58) Field of Classification Search
None
See application file for complete search history.

(56) References Cited

U.S. PATENT DOCUMENTS

| | | |
|---|---|---|
| 4,800,810 A | 1/1989 | Masumoto |
| 5,036,314 A | 7/1991 | Barillari et al. |
| 5,060,980 A | 10/1991 | Johnson et al. |
| 5,143,888 A | 9/1992 | Olbrich |
| 5,144,452 A | 9/1992 | Abuyama |
| 5,169,713 A | 12/1992 | Kumurdjian |
| 5,265,244 A | 11/1993 | Ghosh et al. |
| 5,265,246 A | 11/1993 | Li et al. |
| 5,377,348 A | 12/1994 | Lau et al. |
| 5,383,029 A | 1/1995 | Kojima |
| 5,461,708 A | 10/1995 | Kahn |

(Continued)

FOREIGN PATENT DOCUMENTS

| | | |
|---|---|---|
| HU | 215657 B | 1/1994 |
| WO | WO 2006/060773 A2 | 6/2006 |

OTHER PUBLICATIONS

Becker, Trellis Graphics Displays: A Multi-Dimensional Data Visualization Tool for Data Mining, 1997, 13 pgs.

(Continued)

*Primary Examiner* — Hung Q Pham
(74) *Attorney, Agent, or Firm* — Morgan, Lewis & Bockius LLP

(57) ABSTRACT

A method of ranking data visualizations is performed at a computing device having one or more processors and memory. The memory stores one or more programs for execution by the one or more processors. A user selects a set of data fields from a set of data. The computing device identifies a plurality of data visualizations based on the data fields selected by the user. For each of the plurality of data visualizations, a score is computed based on a set of ranking criteria. A first ranking criterion of the set of ranking criteria is based on values of one or more of the user-selected data fields in the set of data. A ranked list of the data visualizations is created, which is ordered according to the computed scores of the data visualizations. The ranked list is presented to the user.

30 Claims, 33 Drawing Sheets

(56) References Cited

U.S. PATENT DOCUMENTS

| | | |
|---|---|---|
| 5,560,007 A | 9/1996 | Thai |
| 5,577,241 A | 11/1996 | Spencer |
| 5,581,677 A | 12/1996 | Myers et al. |
| 5,664,172 A | 9/1997 | Antoshenkov |
| 5,664,182 A | 9/1997 | Nierenberg et al. |
| 5,668,987 A | 9/1997 | Schneider |
| 5,794,246 A | 8/1998 | Sankaran et al. |
| 5,850,531 A | 12/1998 | Cox et al. |
| 5,864,856 A | 1/1999 | Young |
| 5,893,088 A | 4/1999 | Hendricks et al. |
| 5,933,830 A | 8/1999 | Williams |
| 6,031,632 A | 2/2000 | Yoshihara et al. |
| 6,032,158 A | 2/2000 | Mukhopadhyay et al. |
| 6,044,374 A | 3/2000 | Nesamoney et al. |
| 6,100,901 A | 8/2000 | Mohda et al. |
| 6,115,744 A | 9/2000 | Robins et al. |
| 6,144,962 A | 11/2000 | Weinberg et al. |
| 6,154,766 A | 11/2000 | Yost et al. |
| 6,173,310 B1 | 1/2001 | Yost et al. |
| 6,188,403 B1 | 2/2001 | Sacerdoti et al. |
| 6,208,990 B1 | 3/2001 | Suresh et al. |
| 6,222,540 B1 | 4/2001 | Sacerdoti |
| 6,247,008 B1 | 6/2001 | Cambot et al. |
| 6,253,257 B1 | 6/2001 | Dundon |
| 6,260,050 B1 | 7/2001 | Yost et al. |
| 6,269,393 B1 | 7/2001 | Yost et al. |
| 6,300,957 B1 | 10/2001 | Rao et al. |
| 6,301,579 B1 | 10/2001 | Becker |
| 6,317,750 B1 | 11/2001 | Tortolani et al. |
| 6,327,628 B1 | 12/2001 | Anuff et al. |
| 6,339,775 B1 | 1/2002 | Zamanian et al. |
| 6,377,259 B1 | 4/2002 | Tenev et al. |
| 6,397,195 B1 | 5/2002 | Pinard et al. |
| 6,400,366 B1 | 6/2002 | Davies et al. |
| 6,405,195 B1 | 6/2002 | Ahlberg |
| 6,405,208 B1 | 6/2002 | Raghavan et al. |
| 6,424,933 B1 | 7/2002 | Agrawala et al. |
| 6,490,593 B2 | 12/2002 | Proctor |
| 6,492,989 B1 | 12/2002 | Wilkinson |
| 6,505,205 B1 | 1/2003 | Kothuri et al. |
| 6,522,342 B1 | 2/2003 | Gagnon et al. |
| 6,529,217 B1 | 3/2003 | Maguire, III et al. |
| 6,581,068 B1 | 6/2003 | Bensoussan et al. |
| 6,590,577 B1 | 7/2003 | Yonts |
| 6,611,825 B1 | 8/2003 | Billheimer et al. |
| 6,643,646 B2 | 11/2003 | Su et al. |
| 6,678,615 B2 | 1/2004 | Howard et al. |
| 6,701,485 B1 | 3/2004 | Igra et al. |
| 6,707,454 B1 | 3/2004 | Barg et al. |
| 6,714,897 B2 | 3/2004 | Whitney et al. |
| 6,725,230 B2 | 4/2004 | Ruth et al. |
| 6,750,864 B1 | 6/2004 | Anwar |
| 6,763,308 B2 | 7/2004 | Chu et al. |
| 6,768,986 B2 | 7/2004 | Cras et al. |
| 6,867,788 B2 | 3/2005 | Takeda |
| 6,906,717 B2 | 6/2005 | Couckuyt et al. |
| 6,920,608 B1 | 7/2005 | Davis |
| 6,928,433 B2 | 8/2005 | Goodman et al. |
| 6,961,716 B2 | 11/2005 | Rhodes |
| 6,985,905 B2 | 1/2006 | Prompt et al. |
| 7,009,609 B2 | 3/2006 | Miyadai |
| 7,089,266 B2 | 8/2006 | Stolte et al. |
| 7,117,058 B2 | 10/2006 | Lin et al. |
| 7,168,035 B1 | 1/2007 | Bell et al. |
| 7,181,450 B2 | 2/2007 | Malloy et al. |
| 7,250,951 B1 | 7/2007 | Hurley et al. |
| 7,315,305 B2 | 1/2008 | Crotty et al. |
| 7,379,601 B2 | 5/2008 | Yang et al. |
| 7,420,562 B2 | 9/2008 | Shinohara et al. |
| 7,630,971 B2 | 12/2009 | Arrouye et al. |
| 7,694,278 B2 | 4/2010 | Pasumansky et al. |
| 7,725,483 B2 | 5/2010 | Poyourow et al. |
| 7,853,456 B2 | 12/2010 | Soto et al. |
| 7,999,809 B2 | 8/2011 | Beers et al. |
| 8,060,497 B1 | 11/2011 | Zatsman et al. |
| 8,677,235 B2 | 3/2014 | Chronister et al. |
| 8,812,947 B1 | 8/2014 | Maoz et al. |
| 9,348,881 B1 | 5/2016 | Hao et al. |
| 2002/0016699 A1 | 2/2002 | Hoggart et al. |
| 2002/0118192 A1 | 8/2002 | Couckuyt et al. |
| 2002/0123865 A1 | 9/2002 | Whitney et al. |
| 2002/0133441 A1 | 9/2002 | Tanaka |
| 2002/0154118 A1 | 10/2002 | McCarthy et al. |
| 2003/0042928 A1 | 3/2003 | Tsai |
| 2003/0200034 A1 | 10/2003 | Fellenberg et al. |
| 2003/0204511 A1 | 10/2003 | Brundage et al. |
| 2004/0183800 A1 | 9/2004 | Peterson |
| 2004/0224577 A1 | 11/2004 | Kaji |
| 2004/0227759 A1 | 11/2004 | McKnight et al. |
| 2004/0243593 A1 | 12/2004 | Stolte et al. |
| 2005/0035966 A1 | 2/2005 | Pasquarette et al. |
| 2005/0035967 A1 | 2/2005 | Joffrain et al. |
| 2005/0060300 A1 | 3/2005 | Stolte et al. |
| 2005/0099423 A1 | 5/2005 | Brauss |
| 2005/0234688 A1 | 10/2005 | Pinto et al. |
| 2005/0234920 A1 | 10/2005 | Rhodes |
| 2006/0020586 A1 | 1/2006 | Prompt et al. |
| 2006/0020641 A1 | 1/2006 | Walsh et al. |
| 2006/0031187 A1 | 2/2006 | Pyrce et al. |
| 2006/0053363 A1 | 3/2006 | Bargh et al. |
| 2006/0100873 A1 | 5/2006 | Bittner et al. |
| 2006/0100912 A1 | 5/2006 | Kumar et al. |
| 2006/0101391 A1 | 5/2006 | Ulke et al. |
| 2006/0129913 A1 | 6/2006 | Vigesaa et al. |
| 2006/0136825 A1 | 6/2006 | Cory et al. |
| 2006/0206512 A1* | 9/2006 | Hanrahan ......... G06F 17/30554 |
| 2006/0229753 A1 | 10/2006 | Seskin et al. |
| 2007/0055487 A1 | 3/2007 | Habitz et al. |
| 2007/0061344 A1 | 3/2007 | Dickerman et al. |
| 2007/0061611 A1* | 3/2007 | Mackinlay ........ G06F 17/30554 714/5.1 |
| 2007/0073722 A1 | 3/2007 | Ramer et al. |
| 2007/0112844 A1 | 5/2007 | Tribble et al. |
| 2007/0211056 A1 | 9/2007 | Chakraborty et al. |
| 2007/0245238 A1 | 10/2007 | Fugitt et al. |
| 2007/0250523 A1 | 10/2007 | Beers et al. |
| 2008/0065634 A1 | 3/2008 | Krinsky |
| 2008/0082348 A1 | 4/2008 | Paulus et al. |
| 2008/0117213 A1 | 5/2008 | Cirit et al. |
| 2008/0133573 A1 | 6/2008 | Haft et al. |
| 2008/0163085 A1 | 7/2008 | Subbu et al. |
| 2008/0243785 A1 | 10/2008 | Stading |
| 2008/0262327 A1 | 10/2008 | Kato |
| 2009/0231340 A1 | 9/2009 | Savornin |
| 2014/0114970 A1 | 4/2014 | Prabu et al. |
| 2015/0019958 A1* | 1/2015 | Ying .................... G06F 17/248 715/243 |

OTHER PUBLICATIONS

Becker, Visualizing Decision Table Classifiers, 1998, 4 pgs.

Beers, Notice of Allowance, U.S. Appl. No. 11/787,761, Apr. 8, 2011, 8 pgs.

Beers, Office Action, U.S. Appl. No. 11/787,761, Dec. 1, 2010, 16 pgs.

Beers, Office Action, U.S. Appl. No. 11/787,761, Jul. 8, 2009, 14 pgs.

Beers, Office Action, U.S. Appl. No. 11/787,761, Jun. 12, 2008, 12 pgs.

Beers, Office Action, U.S. Appl. No. 11/787,761, Seo, 14, 2010, 12 pgs.

Beers, Office Action, U.S. Appl. No. 11/787,761, Dec. 17, 2008, 13 pgs.

Beers, Office Action, U.S. Appl. No. 11/787,761, Apr. 28, 2010, 10 pgs.

Beers, Office Action, U.S. Appl. No. 11/787,761, Nov. 30, 2009, 14 pgs.

Beers, Office Action, U.S. Appl. No. 13/211,048, Oct. 11, 2012, 13 pgs.

Bosch, Performance Analysis and Visualization of Parallel Systems Using SimOS and Rivet: A Case Study, Jan. 2000, 12 pgs.

(56) References Cited

OTHER PUBLICATIONS

Bosch, Rivet: A Flexible Environment for Computer Systems Visualization, Jan. 2000, 9 pgs.
Brunk, MineSet: An Integrated System for Data Mining, 1997, 4 pgs.
Derthick, An Interactive Visual Query Environment for Exploring Data, 1997, 11 pgs.
Freeze, Unlocking OLAP with Microsoft SQL Server and Excel 2000, 2000, pp. 155-332 and 379-422.
Fua, Hierarchical Parallel Coordinates of Exploration of Large Datasets.
Goldstein, A Framework for Knowledge-Based Interactive Data Exploration, Dec. 1994, 30 pgs.
Gray, Data Cube: A Relational Aggregation Operator Generalizing Group-By, Cross-Tab, and Sub-Total, 1997, 25 pgs.
Hanrahan, Notice of Allowance, U.S. Appl. No. 11/005,652, May 18, 2010, 4 pgs.
Hanrahan, Office Action, U.S. Appl. No. 11/005,652, Feb. 20, 2009, 12 pgs.
Hanrahan, Office Action, U.S. Appl. No. 11/005,652, Oct. 23, 2009, 14 pgs.
Hanrahan, Office Action, U.S. Appl. No. 11/005,652, Jul. 24, 2008, 11 pgs.
Hanrahan, Office Action, U.S. Appl. No. 11/005,652, Dec. 27, 2007, 11 pgs.
Hanrahan, Specification, U.S. Appl. No. 11/005,652, Dec. 2, 2004, 104 pgs.
Healey, On the Use of Perceptual Cues and Data Mining for Effective Visualization of Scientific Datasets, 1998, 8 pgs.
Kohavi, Data Mining and Visualization, 2000, 8 pgs.
Livny, DeVise: Integrated Querying and Visual Exploration of Large Datasets, May 1997, 12 pgs.
MacDonald, Creating Basic Charts, 2006, 46 pgs.
Mackinlay, Notice of Allowance, U.S. Appl. No. 12/214,818, May 13, 2014, 9 pgs.
Mackinlay, Office Action, U.S. Appl. No. 11/223,658, Jun. 10, 2010, 22 pgs.
Mackinlay, Office Action, U.S. Appl. No. 11/223,658, Nov. 12, 2009, 22 pgs.
Mackinlay, Office Action, U.S. Appl. No. 11/223,658, Jan. 21, 2011, 22 pgs.
Mackinlay, Office Action, U.S. Appl. No. 11/223,658, May 21, 2008, 20 pgs.
Mackinlay, Office Action, U.S. Appl. No. 11/223,658, Feb. 23, 2009, 19 pgs.
Mackinlay, Specification, U.S. Appl. No. 11/223,658, Sep. 5, 2005, 58 pgs.
Magyar Szabadalmi Hivatal, HU Search Report, HU P0700460, Oct. 9, 2007, 1 pg.
Perlin, An Alternative Approach to the Computer Interface, 1993, 11 pgs.
Rao, The Table Lens: Merging Graphical and Symbolic Representations in an Interactive Focus+Context Visualization for Tabular Information, Apr. 1994, 7 pgs.
Roth, Interactive Graphics Design Using Automatic Presentation Knowledge, Apr. 24-28, 1994, 7 pgs.
Roth, Visage: A User Interface Environment for Exploring Information, Oct. 28-29, 2006, 9 pgs.
Screen Dumps for Microsoft Office Excel 2003 SP2, figures 1-24, 2003, 19 pgs.
Spenke, Focus: The Interactive Table for Product Comparison and Selection, Nov. 6-8, 1996, 10 pgs.
Stevens, On the Theory of Scales of Measurement, Jun. 7, 1946, 4 pgs.
Stolte, Multiscale Visualization Using Data Cubes, 2002, 8 pgs.
Stolte, Notice of Allowance, U.S. Appl. No. 10/453,834, Mar. 27, 2006, 3 pgs.
Stolte, Notice of Allowance, U.S. Appl. No. 10/667,194, Mar. 5, 2010, 4 pgs.
Stolte, Notice of Allowance, U.S. Appl. No. 11/488,407, Dec. 29, 2009, 8 pgs.
Stolte, Notice of Allowance, U.S. Appl. No. 12/821,029, Sep. 24, 2012, 8 pgs.
Stolte, Office Action, U.S. Appl. No. 10/667,194, Jan. 7, 2008, 10 pgs.
Stolte, Office Action, U.S. Appl. No. 10/667,194, Feb. 9, 2009, 11 pgs.
Stolte, Office Action, U.S. Appl. No. 10/667,194, Aug. 14, 2007, 16 pgs.
Stolte, Office Action, U.S. Appl. No. 10/667,194, Aug. 14, 2008, 10 pgs.
Stolte, Office Action, U.S. Appl. No. 10/667,194, Jan. 18, 2007, 15 pgs.
Stolte, Office Action, U.S. Appl. No. 10/667,194, Sep. 25, 2009, 10 pgs.
Stolte, Office Action, U.S. Appl. No. 10/667,194, Jun. 26, 2006, 13 pgs.
Stolte, Office Action, U.S. Appl. No. 11/488,407, Apr. 3, 2009, 6 pgs.
Stolte, Office Action, U.S. Appl. No. 12/821,029, Apr. 12, 2011, 9 pgs.
Stolte, Office Action, U.S. Appl. No. 12/821,029, Feb. 24, 2012, 10 pgs.
Stolte Office Action, U.S. Appl. No. 13/753,452, Feb. 26, 2014, 8 pgs.
Stolte, Polaris: A System for Query, Analysis, and Visualization of Multidimensional Relational Databases, Jan. 2002, 14 pgs.
Stolte, Query, Analysis, and Visualization of Hierarchically Structured Data Using Polaris, Jul. 2002, 11 pgs.
Stolte, Specification, U.S. Appl. No. 10/453,834, Jun. 2, 2003, 114 pgs.
Stolte, Visualizing Application Behavior on Superscalar Processors, 1999, 9 pgs.
Tableau Software Inc., IPRP, PCT/US07/009810, Oct. 22, 2008, 7 pgs.
Tableau Software Inc., ISR, PCT/US07/009810, Jul. 7, 2008, 8 pgs.
Tableau Software LLC, IPRP, PCT/US06/35300, Mar. 24, 2009, 5 pgs.
Tableau Software LLC, IPRP, PCT/US2005/043937, Jun. 5, 2007, 9 pgs.
Tableau Software LLC, ISR/WO, PCT/US06/35300, Jul. 7, 2008 6 pgs.
Tableau Software LLC, ISR/WO, PCT/US2005/043937, Apr. 18, 2007, 9 pgs.
The Board of Trustees of the Leland Stanford Jr. University, IPER, PCT/US04/18217, Oct. 19, 2006, 4 pgs.
The Board of Trustees of the Leland Stanford Jr. University, IPRP, PCT/US04/30396, Apr. 19, 2007, 5 pgs.
The Board of Trustees of the Leland Stanford Jr. University, ISR/WO, PCT/US04/18217, Feb. 7, 2006, 6 pgs.
The Board of Trustees of the Leland Stanford Jr. University, ISR/WO, PCT/US04/30396, Aug. 24, 2006, 5 pgs.
The Board of Trustees of the Leland Stanford Jr. University, Supplemental EP Search Report, EP 04754739.3, Dec. 17, 2007, 4 pgs.
Thearling, Visualizing Data Mining Models, 2001, 14 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.
Wilkinson, Statistics and Computing—The Grammar of Graphics.
Wilkinson, "Graph-Theoretic Scagnostics," Proceedings of the IEEE Information Visualization, 2005, 8 pgs.
Mackinlay, Show Me: Automatic Presentation for Visual Analysis, IEEE Transactions on Visualization and Computer Graphics, vol. 13, No. 6, Nov./Dec. 2007, 8 pgs.
Mackinlay, Automating the Design of Graphical Presentations of Relational Information, Stanford University, ACM Transactions on Graphics, vol. 5, No. 2, Apr. 1986, 32 pgs.
Key, VizDeck: Self-Organizing Dashboards for Visual Analytics, SIGMOD '12 May 20-24, 2012, 4 pgs.

(56) References Cited

OTHER PUBLICATIONS

Gotz, Behavior-Driven Visualization Recommendation, IBM T.J. Watson Research Center, IUI'09, Feb. 8-11, 2009, 10 pgs.

Fu, Implementation of Three-dimensional Scagnostics, University of Waterloo, 2009, 61 pgs.

Cleveland, Graphical Perception: Theory, Experimentation, and Application to the Development of Graphical Methods, Journal of the American Statistical Assoc., Sep. 1984, vol. 79, No. 387, Applications Section, 24 pgs.

Bertin, Semiology of Graphics Diagrams Networks Maps, Part One Semiology of the Graphic Sign-System, 1983, 95 pgs.

Sun, Articulate: A Semi-automated Model for Translating Natural Language Queries into Meaningful Visualizations, 2010, 184 pgs.

Savva, ReVision: Automated Classification, Analysis and Redesign of Chart Images, UIST' 11, Oct. 16-19, 2011, 10 pgs.

Miller, The Magical Number Seven, Plus or Minus Two: Some Limits on Our Capacity for Processing Information, originally published in the *The Psychological Review*, 1956, vol. 63, Mar. 10, 2014, 19 pgs.

Ihm, App Analytic: A Study on Correlation Analysis of App Ranking Data, IEEE Third Int'l Conference on Cloud and Green Computing, Sep. 30, 2013, 3 pgs.

Tableau Software Inc., International Search Report and Written Opinion, PCT/US2015/018475, May 8, 2015, 8 pgs.

Anand, Office Action, U.S. Appl. No. 14/242,849, Jan. 5, 2016, 10 pgs.

Anand, Office Action, U.S. Appl. No. 14/242,857, Feb. 9, 2016, 11 pgs.

Anand, Notice of Allowance, U.S. Appl. No. 14/242,849, May 26, 2016, 7 pgs.

Mackinlay, Office Action, U.S. Appl. No. 14/487,016, Sep. 28, 2016, 9 pgs.

Tableau Software, Inc., International Preliminary Report on Patentability, PCT/US2015/018475, Oct. 4, 2016, 6 pgs.

Tableau Software, Inc., Communication Pursuant to Rules 161(1) and 162, EP15711944.7, Nov. 22, 2016, 2 pgs.

\* cited by examiner

Ranked List 408

| Rank (1302) | Preview (1304) | View Type (1306) | Description (1308) |
|---|---|---|---|
| 1 | | scatter plot | fields used to specify X-position and Y-position; shape, color, and size encodings; filters; etc. |
| 2 | | packed line graph | |
| 3 | | bar chart | |
| 4 | | line graph | |
| 5 | | heatmap table | |

1310 points to Description column.

Figure 13

| Data Visualization Ranking Log | 234 |
|---|---|
| User ID | 1502 |
| Date / Time | 1504 |
| User-selected Fields | 1506 |
| User-selected Filters | 1508 |
| Data Visualization Options | 1510 |
|    Data Viz Option ID | 1512 |
|    Rank | 1514 |
|    Partial Scores | 1516 |
|    Weights | 1518 |
|    Intermediate Values | 1520 |
|    Selected by User | 1522 |
|    Visual Specification | 1524 |
|       Field List | 1526 |
|       View Type | 1528 |
|       X-position Fields | 1530 |
|       Y-position Fields | 1532 |
|       Level of Detail Fields | 1534 |
|       Filters | 1536 |
|       Path Encoding | 1538 |
|       Label Encoding | 1540 |
|       Color Encoding | 1542 |
|       Size Encoding | 1544 |
|       ⋮ | |
|    ⋮ | |
| ⋮ | |

Figure 15

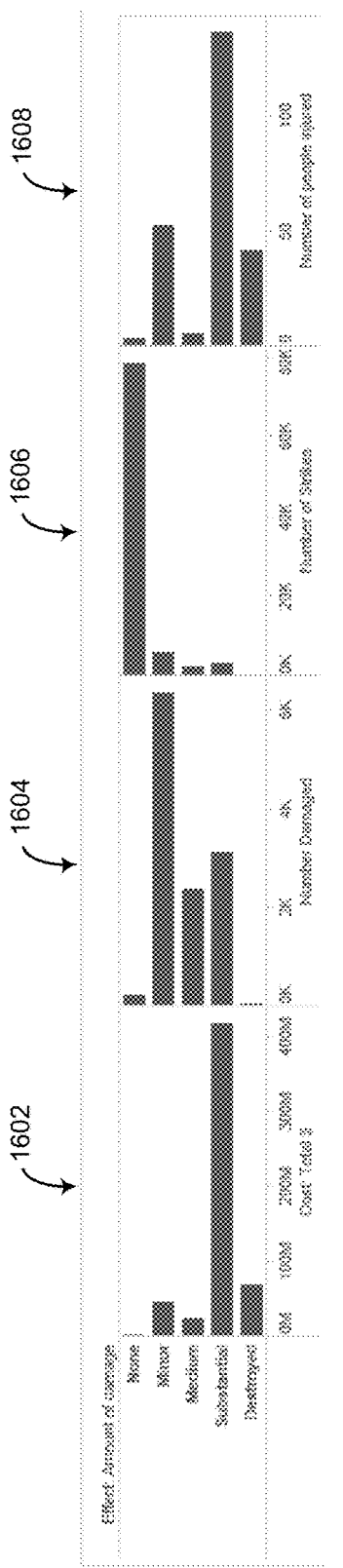
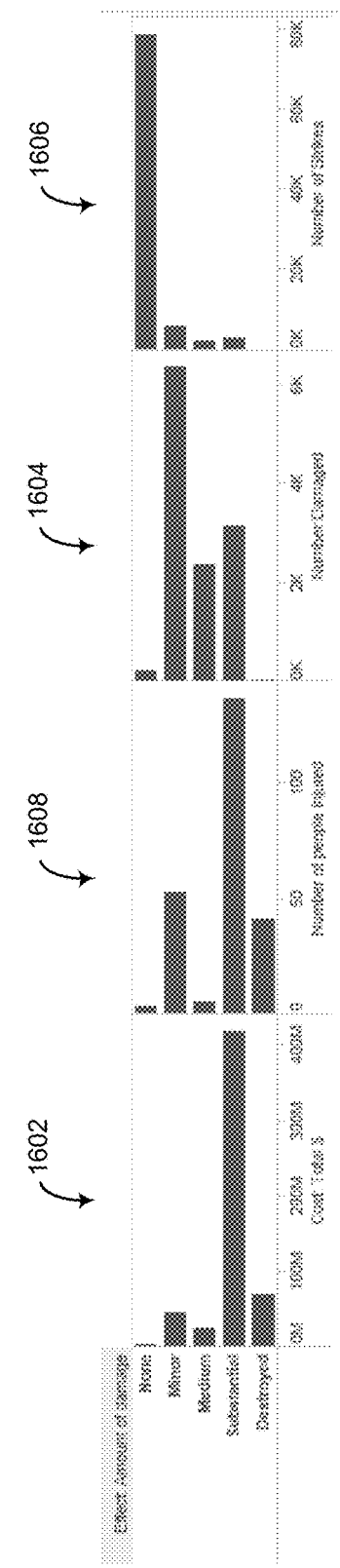
Figure 16A
Figure 16B

SYSTEMS AND METHODS FOR RANKING DATA VISUALIZATIONS

TECHNICAL FIELD

The disclosed implementations relate generally to data visualizations and more specifically to ranking alternative data visualizations based on a set of data fields.

BACKGROUND

Data visualizations are an effective way to communicate data. Information visualization uses visual representations of data to aid in human understanding of relationships and patterns in the data. With the proliferation of "big data" there is increasing demand for data analysts familiar with visual analytics, but there is a short supply of such individuals and tools. Making the tools easier to use would enable a larger number of people to take charge of their data questions and produce insightful visual charts.

Some data visualization systems include tools to assist people in the creation of data visualizations, and some systems even make suggestions based on the data types of selected fields. For example, if two quantitative fields are selected, a scatter plot may be recommended. Examples of such systems are described in U.S. Pat. No. 8,099,674, entitled "Computer Systems and Methods for Automatically Viewing Multidimensional Databases," which is incorporated herein by reference in its entirety.

Some data visualization systems automatically generate marks in a data visualization to represent one or more data fields from a data source. For example, some techniques are described in U.S. patent application Ser. No. 12/214,818, entitled "Methods and Systems of Automatically Generating Marks in a Graphical View," which is incorporated herein by reference in its entirety.

SUMMARY

Disclosed implementations provide a recommendation engine for data visualizations. The systems take a set of data fields selected by a user and intelligently suggest good visual representations to further the user's analysis. Implementations identify a set of possible data visualizations based on the selected data fields, then rank the identified data visualizations. Some implementations rank data visualizations based on visual aspects of presenting the underlying data values (e.g., clustering, outliers, and image aspect ratio).

With a very large number of potential data visualizations, a good system must present the "better" alternatives first. For example, there may be 10,000 or more alternative data visualizations for a selected set of data fields. It would not be much help to a user if the 10,000 options were listed in a random or arbitrary order. Some implementations rank the alternative data visualizations in a two part process. First, for each view type (e.g., bar chart, line chart, scatter plot, etc.) the ranking system ranks the alternatives within that view type (e.g., rank all of the alternative bar charts against each other). Second, the system merges the rankings into a single overall ranking.

Disclosed implementations typically use multiple criteria for ranking Some criteria measure statistical structure in the data (e.g., visual patterns in a visualization such as outliers or clusters). Some criteria measure the similarity of a potential data visualization to previous data visualizations selected by a user (e.g., comparing the level of detail, the x-axis and y-axis for layout of the data, and other visual encodings, such as size or color). Previous selections may be from the same user who is preparing a data visualization now, or from a different user or set of users. Some criteria measure the aesthetic qualities (e.g., aspect ratio) of a potential data visualization. Some criteria use user preferences (e.g., a preference for certain view types or encodings within a view type). Some criteria use aggregate preferences based on the history of multiple users (either for the specific data fields currently selected or more generally). By combining these criteria, the ranking correlates with effectiveness at representing structures in the data and delivering insight to the user. Implementations assign weights to each of the criteria, and typically update the weights based on continued feedback from users (e.g., by comparing the data visualizations selected to the calculated rankings).

Disclosed implementations assist users in the cycle of visual analysis. The cycle typically proceeds by selecting a set of data fields, visually representing those data fields in some way, noticing results from the visual representation, and asking follow-up questions. The follow-up questions often lead to more data visualizations, which may drill down, drill up, filter the data, bring in additional data fields, or just view the data in a different way. Creating views of the data can be a slow task, particularly when a user is not familiar with the visual analytic tool or when the task is not clear. For example, it may not be clear to a user what view type to create, what level of detail to select for the data, or what aesthetics would be useful. Disclosed implementations speed up the user's journey to insight by identifying good, analytically useful views of the user selected data fields and presenting those views in ranked order.

Providing a ranked list of meaningful views of selected data has two main phases. First, a system must identify a set of possible views for the selected set of data fields. This is sometimes referred to as the "generation" phase. Second, the system ranks each of the possible views. This is sometimes referred to as the "evaluation" phase.

Implementations use various criteria in the evaluation phase. For example, some criteria quantify the extent to which a possible data visualization displays some "interesting" structure or pattern that exists in the data. Some interesting structures relate to statistical properties of the selected data fields or relationships between the selected data fields. A particular visual representation is ranked higher when such structures or patterns are visually identifiable. Some criteria apply information visualization best practices to present the data in an aesthetically pleasing and clear manner. As described in more detail below, these criteria and others are applied together to evaluate visual representations for the selected set of data fields.

Some criteria depend heavily on the view type of each data visualization because different view types have different strengths. For example, different view types are better able to represent different types of data, different view types are able to aesthetically represent different amounts of data, and different view types facilitate various analytic tasks. Because of this, some implementations divide the evaluation into two parts: rank the possible data visualizations within each view type, then combine the ranked lists of views of different types together to provide a diverse list of analytically useful views of the selected data fields.

A simple example illustrates typical processes. Consider a set of quantitative data with a geographic component that may be visualized as a text table, a bar chart, or a map. The map is the best at highlighting the geographical distribution, so it is ranked first. The bar chart works well to showcase the overall trend of the quantitative variable and to make more precise relative comparisons of values encoded as bar lengths, so it is ranked next. A text table has the densest display and is good for looking up precise details, but is ranked last. Of course the ranking could be different based on other criteria, such as a user preference to see data in text tables. One of the advantages of some implementations is providing a unified way to combine various criteria, which can result in different rankings depending on the user, the user's history, historical usage of the data set, current selections by the user, and so on.

In some implementations, the list of meaningful views presented to the user includes views with modified sets of data fields (i.e., the set of data fields is not exactly the set of data fields the user selected). For example, views may include additional data fields, fewer data fields, or replace a selected data field with another data field. In addition, some implementations add or modify filters of the data (e.g., sales data filtered to 2015 may provide more useful information if sales data for 2014 were included as well). Some implementations include these additional views in the same ranked list that includes the views that use exactly the data fields selected by the user. Other implementations place these "complementary" views in a separate ranked list.

When all of the views are presented together, some implementations include criteria for how to interleave the data visualizations. For example, some implementations include a weighting factor based on whether a data visualization uses exactly the data fields selected by the user. For example, a ranking score may be decreased by each modification to the user-selected set of data fields. Note that a really good data visualization based on a modified set of fields may be ranked higher than some average data visualizations that use the exact set of user selected fields.

In accordance with some implementations, a method executes at a computing device with one or more processors and memory to identify and rank a set of potential data visualizations. The method receives user selection of a set of data fields from a set of data and identifies a plurality of data visualizations based on the plurality of user-selected data fields. For each of the plurality of data visualizations, a score is computed based on a set of ranking criteria. A first ranking criterion of the set of ranking criteria is based on values of one or more of the user-selected data fields in the set of data. A first ranked list of the identified data visualizations is created, which is ordered according to the computed scores of the data visualizations. In some implementations, the first ranked list is presented to the user.

In accordance with some implementations, a method executes at a computing device with one or more processors and memory to identify and rank a set of potential data visualizations. A user selects a plurality of data fields from a set of data, and the device identifies a plurality of data visualizations that use a majority of the user-selected data fields. For each of the plurality of data visualizations, the device computes a score based on a set of ranking criteria. A first ranking criterion of the set of ranking criteria is based on values of one or more of the user-selected data fields in the set of data. The device creates a first ranked list of the data visualizations, where the items in the list are ordered according to the computed scores of the data visualizations. In some implementations, the first ranked list is presented to the user. In some implementations, the user selects from the first ranked list and the computing device displays a data visualization corresponding to the user selection.

In accordance with some implementations, a method executes at a computing device with one or more processors and memory to identify and rank a set of potential data visualizations. A user selects a set of data fields from a set of data, and the device identifies a plurality of data visualizations that use each data field in the user-selected set of data fields. In addition, the device identifies a plurality of alternative data visualizations. Each alternative data visualization uses each data field in a respective modified set of data fields. Each respective modified set differs from the user-selected set by a limited sequence of atomic operations (e.g., at most two). Too many changes would lead to an exponential increase in the number of options to evaluate, and those options would deviate further from what the user requested. Examples of atomic operations include: adding a single data field that was not selected by the user; or removing one of the user selected data fields. For each of the data visualizations and each of the alternative data visualizations, the device computes a score based on a set of ranking criteria. At least one criterion used to compute each score uses values of one or more of the data fields in the set of data (e.g., one of the data fields on which an alternative data visualization is based). Finally, a subset of the highest scoring data visualizations and alternative data visualizations is presented to the user.

In some implementations, the first ranking criterion scores each respective data visualization according to visual structure of values of one or more of the user-selected data fields as rendered in the respective data visualization. In some implementations, the visual structure includes clustering of data points. In some implementations, the visual structure includes the presence of outliers. In some implementations, the visual structure includes monotonicity of rendered data points (i.e., monotonically increasing, monotonically non-decreasing, monotonically decreasing, or monotonically non-increasing). In some implementations, the visual structure includes striation of a data field, wherein each respective value of the data field is substantially a respective integer multiple of a single base value.

In some implementations, the first ranking criterion scores each respective data visualization according to one or more aesthetic qualities of the respective data visualization as rendered using values of one or more of the user-selected fields. In some implementations, the aesthetic qualities include the aspect ratio of the rendered data visualizations. In some implementations, the aesthetic qualities include measuring an extent to which entire rendered data visualizations can be displayed on a user screen at one time in a human readable format.

In some implementations, the first ranking criterion scores each respective data visualization according to visual encodings of one or more of the user-selected data fields. In some implementations, visual encoding of a user-selected data field comprises assigning a size, shape, or color to visual marks according to values of the user-selected data field.

In some implementations, each of the data visualizations has a unique view type that specifies how it is rendered. In some implementations, each of the data visualizations has a view type selected from the group consisting of text table, bar chart, scatter plot, line graph, and map. In some implementations, the first ranking criterion scores each respective data visualization according to the view type of the respective data visualization and the user-selected data fields. In some implementations, the set of ranking criteria is hierarchical, comprising a first set of criteria that ranks view types based on the user-selected data fields, and a respective view-specific set of criteria that ranks individual data visualizations for the respective view type based on the user-selected fields.

In some implementations, the method further includes identifying a plurality of alternative data visualizations based on one or more modifications to the set of user selected data fields, and for each of the plurality of alternative data visualizations, computing a score based on the set of ranking criteria. In some implementations, the first ranked list includes the plurality of data visualizations and the plurality of alternative data visualization, and the first ranked list is ordered according to the computed scores of the data visualizations and the computed scores of the alternative data visualizations. In some implementations, the method further includes creating a second ranked list of the alternative data visualizations, where the second ranked list is ordered according to the computed scores of the alternative data visualizations. The first and second ranked lists are presented to the user. In some implementations, the modifications include adding one or more additional data fields to the set of data fields. In some implementations, the modifications include removing one or more data fields from the set of data fields. In some implementations, the modifications include replacing a first user selected data field with a different data field that is hierarchically narrower than the first user selected data field. In some implementations, the modifications include replacing a first user selected data field with a different data field that is hierarchically broader than the first user selected data field. In some implementations, the modifications include applying a filter to the user selected data fields, wherein the filter was not selected by the user. In some implementations, the modifications include modifying a user selected filter.

In accordance with some implementations, a method executes at a computing device with one or more processors and memory to generate and rank a set of potential data visualizations. The method receives user selection of a set of data fields from a set of data and generates a plurality of data visualization options. Each data visualization option associates each of the user-selected data fields with a respective predefined visual specification feature. For each of the generated data visualization options, the computing device calculates a score based on a set of ranking criteria. A first ranking criterion of the set of ranking criteria is based on values of one or more of the user-selected data fields in the set of data. The computing device creates a ranked list of the data visualization options, where the ranked list is ordered according to the computed scores of the data visualization options. The data visualization options in the ranked list are presenting to the user. In some instances, the user makes a selection from the ranked list, and the computing device displays a data visualization on the computing device corresponding to the user selection.

In some implementations, the computation of scores for one or more of the data visualizations uses historical data of data visualizations previously created for the set of data. For example, the historical usage of the set of data may favor certain types of data visualizations or certain types of encodings. For example, an organization may use a specific color encoding for divisions or departments. As another example, users of the data set may prefer stacked bar charts. Historical usage data can identify features that are preferred by users of the data, as well as those features disfavored (e.g., if a certain numeric field has never been used for a size encoding, then it would probably not make a good recommendation). Historical information about usage can be particularly valuable when the usage is unusual for the set of data. Historical usage information can also be applied at a more abstract level, and creates "best practice" heuristics when historical usage information is not available for a specific data source.

In addition to historical data about how a particular data set has been used, some implementations use historical information about the data visualizations a specific user has selected. For example, if a certain user has favored line graphs for visualizations based on various data sources, then line graphs would be more highly recommended when appropriate. As another example, another user may consistently use color encodings, and thus use of color is a good suggestion. On the other hand, for a user who never (or rarely) uses color encodings, a color encoded data visualization would not be a good recommendation. Historical data can also identify preferences for certain data visualization variants. For example, a user may consistently create bar charts with horizontal bars, and thus when bar charts are ranked, horizontal bars would be ranked higher. The historical data used in the ranking of potential new data visualization can come from various sources. First there is historical data of data visualizations previously selected by the user. Second, there is historical data showing how a user ranked or compared previous data visualizations. For example, suppose the ranking system previously presented a user with a set of data visualization options for a data source. When the user selects a specific option, the user has implicitly ranked that option higher than the other options that were presented. Some implementations seek specific ranking feedback, particularly for new users. For example, if five data visualization options are presented, ask the user to rank them from 1 to 5. Whether ranking information is collected explicitly or implicitly, it can be used in future ranking calculations. In some implementations, a user's data visualization history is included in a user profile or set of user preferences. In some implementations, user preferences can be identified either through historical usage, from explicitly user selection, or both. In particular, a user can specify which types of data visualization or features are preferred or disfavored. Subsequent ranking can user the preferences to compute scores for one or more of the data visualizations.

In some implementations, the method further includes receiving user selection of a filter that applies to a first user selected data field, where the filter identifies a set of values for the data field and the data visualizations are based on limiting values of the data field to the set of values. In some implementations, the set of values is a finite set of discrete values. In some implementations, the set of values is an interval of numeric values.

In some implementations, a first data visualization of the data visualizations applies a filter to a user selected data field, thereby limiting the values of the user selected data field to a first set of values, where the filter is not selected by the user.

In some implementations, the method further includes receiving user specification of one or more visual layout properties for layout of a data visualization that includes the user selected data fields, where the set of ranking criteria includes a second ranking criterion that measures an extent to which a data visualization of the plurality of data visualizations is consistent with the user specified visual layout properties.

In some implementations, the method further includes receiving user specification of a single view type and the plurality of data visualizations are identified according to the user specified single view type.

BRIEF DESCRIPTION OF THE DRAWINGS

FIGS. 10A and 10B illustrate two maps that encode data in different ways.

FIG. 13 illustrates a screen showing a ranked list of data visualizations in accordance with some implementations.

FIG. 15 illustrates a data visualization ranking log in accordance with some implementations.

FIGS. 16A and 16B illustrate how quantitative data fields can be rearranged in accordance with some implementations.

Like reference numerals refer to corresponding parts throughout the drawings.

Figure 1:
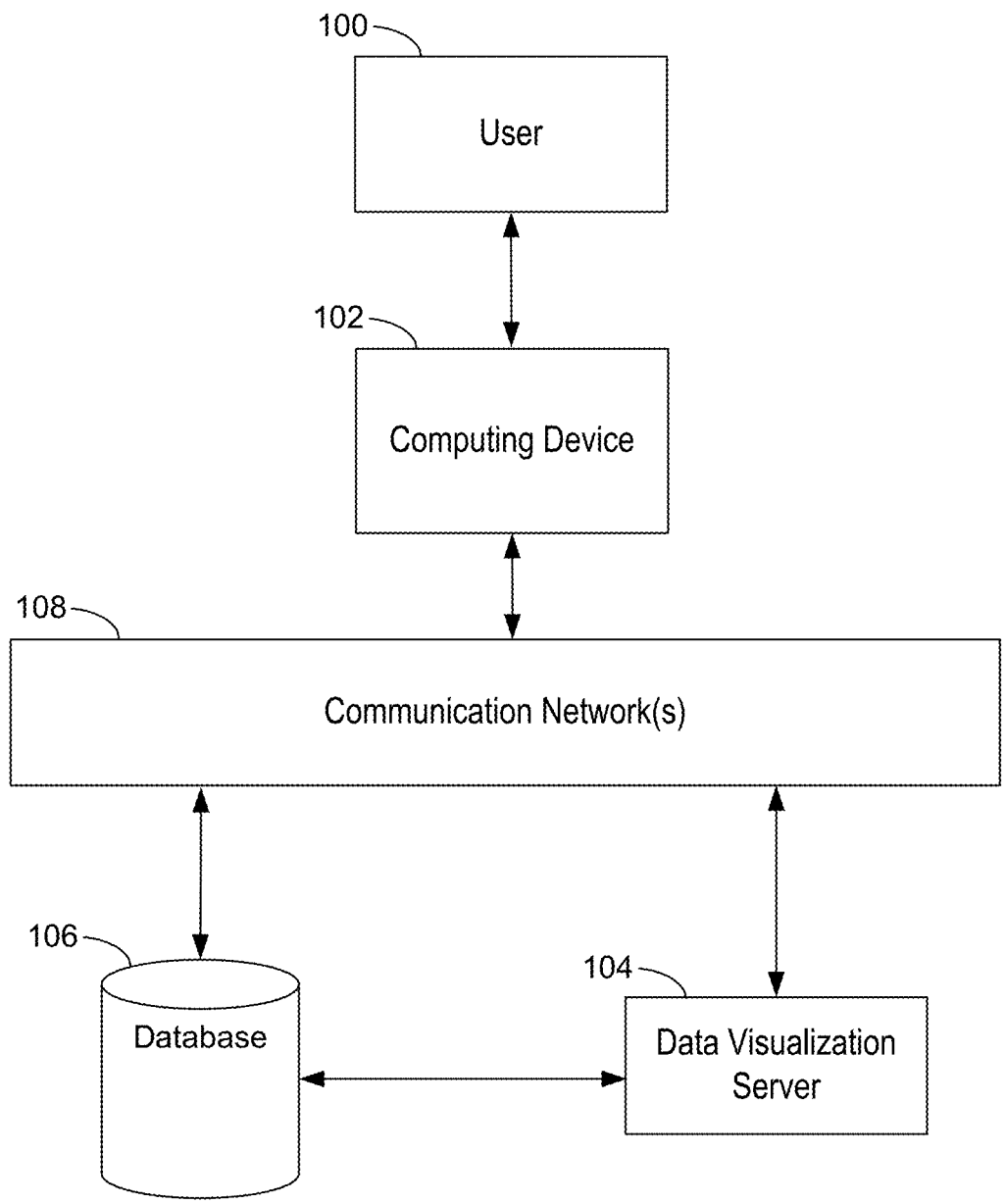
FIG. 1 illustrates a context for a data visualization ranking process in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Implementations of a data visualization ranking system typically have two phases. In the first phase ("generation"), the system constructs instances of view types that are appropriate visual representations for the selected set of data fields. In some implementations, alternative modified sets of data fields are used to build supplemental views (e.g., a superset or subset of the user-selected data fields). In the second phase ("evaluation"), the system ranks the data visualizations so that a smaller number of the best options are presented to the user. Presenting alternative views of data to analytic users facilitates their data exploration and increases the likelihood that they find relevant, useful views that help answer their data questions more quickly or effectively than constructing alternative data visualizations manually.

The generation phase typically follows one of three paths: (1) generate all possible views based on the selected set of data fields; (2) generate all possible views, then cull to a smaller set using a simplified evaluation process; or (3) generate a set of "representative" good views. Using all views may better guarantee finding the best option, but the cost of evaluating all options is typically too high based on the computing devices that are widely available.

For large data sets, some implementations have a two phase approach. In the first phase, identify a sample of the data from the data source (e.g., 5% or 10% of the rows), and proceed to identify a set of good data visualizations based on the sample. In the second phase, the full set of data is used, but the data visualization options are limited to the ones that scored sufficiently high in the first phase. One skilled in the art recognizes that there are various ways to select the sample data, such as a random sample, the first n rows for some positive integer n, or every nth row for some positive integer n.

When all possible visual representations of the selected set of data fields are evaluated, there is an exponential number of options for mapping each of the data fields to visual encodings. In addition, some of the encodings can accept multiple data fields (e.g., the data fields used to define the X-position and Y-position of graphical marks in the display), so there are additional permutations of the data fields for these encodings (e.g., the order of fields used to specify the X-position or Y-position of graphical marks). Each permutation produces a different data visualization based on the ordering of data fields. In some implementations, the complete set is generated, then subsequently culled. Because only the top options will be presented to the user, many data visualization options can be culled with only limited analysis. For example, a quantitative field with a negative value would not be appropriate for size encoding, so that feature is excluded. Similarly, the cardinality of an ordinal field influences how it can be used effectively, as described in examples below. For example, if the cardinality is too large, then it would not be a good choice for color encoding or as an innermost field that defines the X-positions and Y-positions of graphical marks.

Some implementations generate a limited set of good visual representations of the data fields to significantly reduce the number of possible data visualizations evaluated. In some implementations, this uses mapping rules based on data type semantics and effectiveness of certain visual encodings to identify appropriate view type representations. For example, a certain set of data fields may be best represented as a map chart or scatter plot diagram, so only these two view types are pursued (e.g., excluding bar charts, line charts, and text tables). Subsequently, specific instances of each selected view type are identified, typically by applying information visualization best practices.

A brute force generation process iterates over all possible mappings of the selected set of data fields onto all visual encodings (e.g., X-position, Y-position, color, size, shape, and level of detail). If there are m visual encodings and k selected data fields, there are $m^k$ such mappings. As noted above, some encodings can handle multiple data fields and produce different visual representations based on the order, so the actual number is higher than $m^k$. For example, the X-position can represent multiple fields (e.g., "dimensions") where the order of the data fields determines the nesting order of panes or partitions in the view. This large set of alternatives can be culled to produce a set of visualizations that represent best practices in information visualization and perception. Some of these best practices include applying principles of effectiveness in visual representation that favor mapping data fields of certain types to certain encodings. This process can eliminate some bad visual representations quickly. For example, a line chart without a temporal dimension is typically not useful. Another best practice that produces good views is to use low cardinality categorical dimensions for color and shape encodings because a user can easily distinguish a small number of different sizes or shapes. A "categorical" data field is a data field with a limited number of distinct values, which categorize the data. For example, a "gender" data field is a categorical data field that may be limited to the two values "Female" and "Male" or "F" and "M".

Some implementations use a constrained generation algorithm. These implementations use information visualization effectiveness principles that determine the set of view types that create appropriate visual representations of a particular set of data fields. Once specific view types are selected, good instances of each applicable view type are created. Applying a set of rules (e.g., codifying best practices in information visualization and graphic design), the system maps the data fields to visual encodings. This constrains the set of alternatives within each view type. For example, categorical data fields with small cardinality may be mapped to color or shape encodings.

Within a single view type, alternative data visualization instances are generated in several ways. In some instances, alternative views are generated by changing the order of data fields that define the X-positions and Y-positions of graphical marks, which affects not just the axes but also the level of breakdown in the creation of text tables and small multiples. In some instances, alternative views are generated by trying all good choices for color, shape, and size encodings. In some instances, alternative views are generated as view type variants (e.g., filled maps vs. symbol maps; bar charts that are stacked, horizontal, or vertical; etc.).

The disclosed ranking techniques can be applied regardless of how the possible data visualization are identified. In addition, some implementations use some ranking techniques in the generation phase (e.g., using a subset of the techniques that can be applied quickly to reduce the number of alternative data visualizations that proceed to the full evaluation phase). Some ranking systems implement a "progressive" or "hierarchical" process with multiple passes to triage the data visualization options piecemeal. In a progressive ranking process, a very high percentage of the options are eliminated in a first level cull based on simple criteria that can be applied quickly. Each subsequent culling uses more detailed information to identify the options that will progress to the next level. Some implementations have several progressive culling steps before the complete ranking is applied to a small subset of the originally identified options. In a progressive process, some implementations compute partial ranking of data at each level, and retain the partial ranking information for use on subsequent levels.

Disclosed ranking methods evaluate the collection of views based on the sets of data fields selected (either the set of data fields selected by the user, or a modified set of data fields, such as a reduced or expanded set). The views are scored based on a combination of factors. The factors include appropriateness to the data types. For example, if the set of data includes a geographic component, then a map view of the data is weighted more highly. The factors also include the visual structure presented by the view. For example, when there are multiple possible scatter plot views of the data, the one with a visual pattern such as clustering or correlation is weighted more highly. Techniques to identify visual patterns are described in more detail below, including in regard to FIGS. 9A-9C, 11A, and 11B. The factors also include the aesthetics of the visual layout. For example, data visualizations that fit entirely within the display or avoid overlapping labels are preferred. This is described in more detail below, including with regard to FIGS. 7A, 7B, 8A, and 8B. In addition, the factors include similarity to the user's previously created data visualizations. For example, what types of data visualizations has the user selected, in what contexts are those visualizations selected, what types of encodings (such as color, size, or shape) does the user prefer, and so on. The factors also include relevant user preferences, and in some implementations the aggregated preferences of one or more groups (e.g., the group of people working in the finance department in an organization, or the group of all users).

In some implementations, the ranking proceeds as a single step. In other implementations, each possible data visualization is first ranked within its view type (e.g., for the view type "bar chart," all of the bar charts are ranked against each other, whereas all scatter plot diagrams would be ranked against each other within the "scatter plot" view type). The views within each view type are ranked using criteria based on the properties of the view type, the selected data fields, and user properties (e.g., user history, user preferences, or aggregated history of multiple users). Finally, the system combines the ranked lists of view instances of different view types, applying criteria about the relative value of chart types for the data types in the user-selected set. For example, if the user-selected set of data fields includes a temporal field along with a quantitative field, a line chart is probably more useful than a text table view. A line chart is better at visualizing trends, clusters, and anomalies over time. In some implementations, the views exhibiting best practices and a notion of diversity of views are at the top.

The identified (or "generated") data views are scored in the evaluation phase using a variety of weighted criteria. One skilled in the art recognizes that the weighting of criteria can change over time based on feedback from users (explicit or implicit), the addition of new criteria, and so on. Further, the criteria identified herein are not intended to be exhaustive, and one of skill in the art recognizes that other similar criteria may be used. The criteria for evaluating identified data visualizations include statistical properties in the data that can be seen as visual patterns in the view (e.g., clumping, outliers, correlation, or monotonic graphs). The criteria for evaluating data visualizations also include aesthetic properties of the visual layout of the view. Of course only quantifiable aesthetic qualities are included in the evaluation process (e.g., aspect ratio). In addition, other user-specific criteria may be used. For example, a user may indicate a preference for certain types of encoding (e.g., a CFO may prefer to use specific color encodings for each of the company's four sales regions). In addition, if a user has previously worked with the same (or a similar) data set, the history of the previous data visualizations may indicate preferences. Prior usage of the same or similar data set is particularly relevant when the user selects some of the same data fields from the data set.

Disclosed ranking methods combine a number of ranking criteria based on aspects unique to each data visualization type. Some ranking systems implement a separate scoring function for each view type, with the scoring function tailored to the particular data characteristics that are visible. Below are five examples of view types and some simple use cases for each of these view types. Based on these examples, sample scoring functions are described that capture important aspects of the visualizations.

There are also some criteria that are generally applicable across all (or almost all) view types. Large charts are ineffective for visual data analysis when they require scroll bars to fit on a display device. Some implementations partially address this problem using automatic scaling, but scaling has limits (e.g., the text that is displayed cannot get too small). When only a portion of a visualization is visible, it takes longer for a user to search and find points of interest, to make visual comparisons, or to answer questions. Indeed, without a complete view, some of the benefits of a data visualization are lost. In addition, accuracy suffers because the user has to keep track of virtual reference points during scrolling actions that shift the viewport of analysis. Therefore, views that are larger than the canvas size are penalized. Some implementations also distinguish between horizontal scroll bars versus vertical scroll bars when they are necessary. Scrolling vertically is more comfortable for many users than scrolling horizontally, so some implementations penalize vertical scroll bars less than horizontal scroll bars.

Also, when a user has created a view explicitly, selecting a particular view type or encoding of certain data fields, the ranking process favors views that closely adhere to the user's original selections. For example, if the user has already selected a view type, then the selected view type has a preferential ranking. In addition, when the user has selected some visual encodings (e.g., color is used to represent different sales regions), there is a preference to retain those encodings.

Text Tables

Text tables are commonly used to view numeric values as text with high levels of precision. Two kinds of text tables are commonly constructed. One kind of text table displays details of each record or item on a single row. This is standard practice for accounting purposes and is the format used in typical spreadsheet programs. Each of the data dimensions is placed in a column, resulting in a table whose length is based on the number of items in the dataset and whose width is based on the number of dimensions in the data set. Within that format, the only variation is how the dimensions are ordered.

A second kind of text table is a crosstab, which summarizes categorical data that displays the frequency distribution of the categories. A crosstab can be created by a pivot operation in most spreadsheet programs. The categorical dimensions define the X-positions and Y-positions within a two-dimensional matrix. The intersection of row and column categorical values forms a cell that represents a summary for that combination of categorical values.

Certain observations pertain to both kinds of text tables and help identify ranking criteria for text tables. First, tables of textual data should facilitate reading at several levels. At the elementary level, text tables enable quick comprehension of numeric values displayed as visual marks. At the intermediate level, text tables enable perception of regularity and patterns in the data. At the global level, text tables enable grasping the whole visual representation. This facilitation of reading occurs when certain columns are colocated. For example, placing columns with similar data types (dates, text, numbers) together facilitates reading. Similarly, placing functionally dependent data dimensions (e.g., hierarchies) next to each other facilitates reading. In addition, placing semantically related columns together (e.g., sales and profit; ship date and order date) facilitates reading. Therefore, some ranking methods for text tables score text table views according to these rules. Implementations that cull or limit the set of possible data visualizations select the text tables that best adhere to these rules.

Tables of text can be visually scanned quickly for patterns of strings such as increasing or similar length strings across rows. Therefore, some ranking criteria take this into account. Implementations that cull or limit the set of possible data visualizations may order the quantitative dimensions by placing similar (e.g., correlated) dimensions next to each other to facilitate the visual comprehension of such quantitative data relationships.

Crosstabs that have a fewer number of items per pane are generally better than crosstabs that have a large number of items in each pane because the smaller number of items facilitates comparison across panes. Empirical evidence indicates that people are better at retaining (and comparing) chunks of approximately five data elements. Therefore, a categorical data field with a cardinality of about 5 is preferred at the innermost nesting level in a text table. Implementations that cull or limit the set of possible data visualizations may order the categorical data fields, placing a category with cardinality close to five as the innermost level of the text table.

Finally, text tables that grow vertically are easier for human understanding because they align with most traditional web, document, and table presentations. Scoring functions give a higher rank to text tables with a vertical aspect ratio than text tables with a horizontal aspect ratio. As noted earlier, text tables that can be built completely on a display screen without scroll bars are ranked even higher (although it is not always possible to avoid vertical scroll bars).

Bar Charts

Bar charts are commonly used for visual data representations. Bar charts are useful because people are good at making length comparisons and locating a position along a common scale.

Two of the criteria identified above for text tables apply to bar charts as well. Similar (correlated) quantitative dimensions are preferred colocated because it is visually easy to detect patterns of similar length bars. Also, the ordering of categorical dimensions favors placing a category with cardinality close to five as the innermost level of a bar chart.

Sorted bars visually highlight overall trends (e.g., long-tailed distributions) and draw attention to outliers (e.g., very large or very small values) when a quantitative data field is represented by bar length. In some cases, the categorical dimension representing the bars is of greater interest for look-up purposes, so sorting the bars (e.g., alphabetically) provides a more effective representation. Because these two sorting methods (by bar length or by a categorical dimension) each have different advantages, user preferences or prior data visualizations may affect the ranking. For example, other users of the same data fields may have shown a preference for one or the other sorting method.

Horizontal bar lengths can be compared easily across quantitative dimensions that are arranged vertically. The converse is true when looking at vertical bars. Some scoring functions prefer a vertical aspect ratio when horizontal bars are drawn and a horizontal aspect ratio when vertical bars are drawn.

Scatter Plots

In many cases, bivariate distributions are visually best represented as two dimensional point clouds, commonly referred to as scatter plots. A scatter plot illustrates the relationship between the two quantitative dimensions plotted against each other on the x and y axes.

Shapes in point clouds often correspond to interesting statistical properties in the data. A two-dimensional scatter plot of uniform random noise is the baseline case depicting no pattern at all. Scoring functions look for various interesting shapes in the scatter plots, such as clumps (clusters of points), monotonicity (positive or negative correlation), striation (presence of a variable taking on discrete values, such as integers), or outliers. Identifying shapes or structure within scatter plots is described in greater detail below. The presence of any such shapes in a scatter plot increases the score of the scatter plot. Some implementations use formulas or methods described in "Graph-Theoretic Scagnostics," L. Wilkinson et al., Proceedings of the IEEE Information Visualization 2005, pages 157-164

Scatter plots are meaningful when they contain more than a single point per pane. In particular, views with fewer than five points per pane are generally ineffective. Therefore, ineffective views are scored much lower, resulting in early culling. In implementations that generate only "good" views from the outset, such ineffective views are excluded.

Scatter plots have a different aspect ratio preference from other visual charts. In particular, roughly square aspect ratios are favorable for perceiving correlations between variables in scatter plots. Like other view types, scatter plot views that have no scroll bars are preferred.

Line Graphs

Line graphs (also called "line charts") are commonly used to represent quantitative data against a temporal variable. Line charts with only flat horizontal lines are the baseline cases that depict a lack of pattern. Thus, the rank of a line graph is based on showing some variability or trend. Examples include peaks or troughs in the trend lines, clusters of lines with similar trends, or outlier trend lines. Some implementations identify repeating patterns of peaks and/or troughs. Scoring functions quantify the amount of variability and extent of a trend.

Figure 12A:
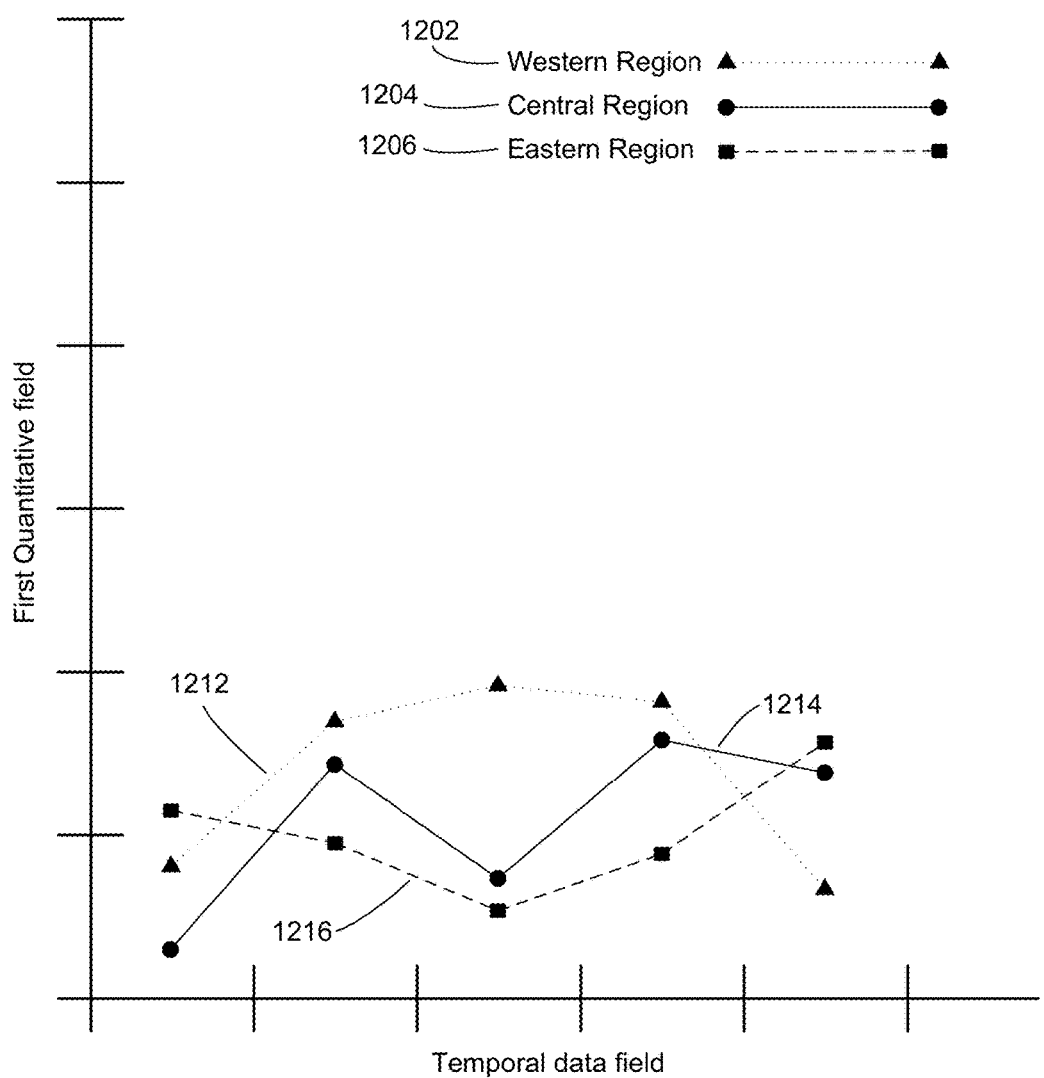
FIGS. 12A and 12B illustrate some structural patterns in line charts.
Figure 12B:
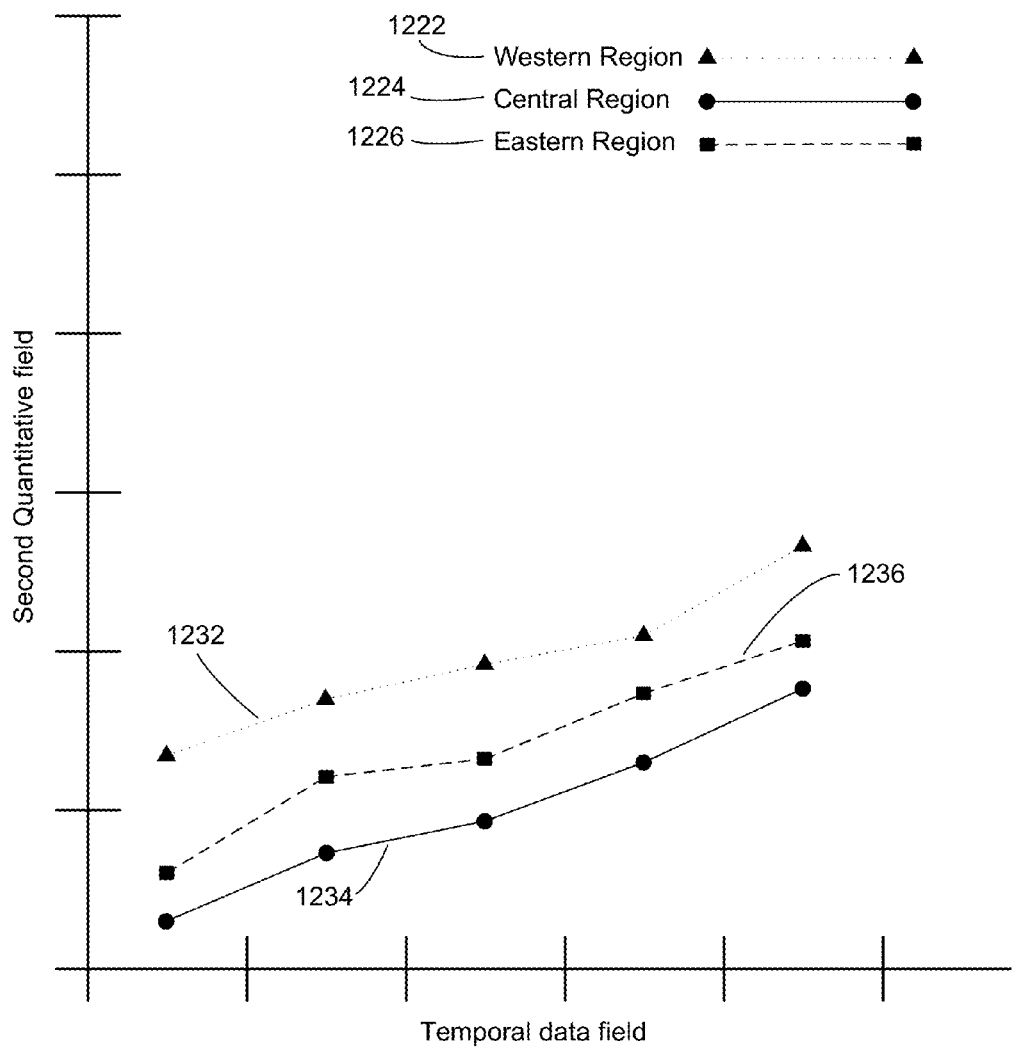

Line charts with too many lines that intersect, overlap, or are too closely spaced are harder to read. On the other hand, line charts with only a few lines more effectively display patterns and trends. Therefore, scoring functions rank more highly those views with fewer lines per pane. For example, when the lines correspond to a categorical data field, the score is related to the cardinality of the data field. In some implementations, a cardinality of 5 receives the highest score. Some implementations also measure the extent to which the lines cross each other or are spaced apart (e.g., even three lines can produce a poor data visualization if the lines are close together and crisscross each other frequently). FIGS. 12A and 12B below illustrate some of these features of line graphs.

Maps

Symbol maps are generally preferred over filled maps because people are better able to perceive size variation than color differences. In some implementations, a scoring function for maps ranks small multiples of filled maps in the same way as pie charts on maps. Both options reveal structure in the data for different analytical tasks, so in the absence of knowledge about the user's task, both types are useful. In some implementations, the pie charts have a small number of splitting categories. In particular, when the cardinality of the category forming the basis for the pie chart is large, the pie-map view is not as useful.

In addition, map views with vertical aspect ratios and views that do not have scroll bars are preferred. In some implementations, scoring functions look at the data distribution to determine how well particular visual encodings work for the selected data fields. Size is the most restrictive encoding. Encoding data based on size is roughly equivalent to applying a square root transform and representing the result. If the transform results in uniformly distributed data, then it is generally not a good measure to encode with size. Also, since the size is proportional to the data value, it is preferable to encode data with a range closer to zero for size encoding because it results in a bigger range of sizes. In some implementations, a numeric range for a measure is transformed (e.g., using a linear transformation) to make size encoding more useful.

Size encoding is generally not appropriate when a numeric field can take on negative values. For example, if a numeric field represents a company's monthly profit, there would be a problem if the company lost money during some months. In some instances, however, negative values can be avoided by a transformation, such as converting temperature readings on the Celsius scale to the Kelvin scale.

Color is a very flexible encoding method because it can represent measures regardless of range, including ranges that straddle zero. Color encoding may not be particularly useful for highly skewed data because few values are represented by the highest intensity and all the other values are flattened to the lower intensities (or vice versa). On the other hand, such an encoding may draw attention to outliers in the data, which may be of interest to the user. Previous feedback from the user (or a cohort of users) may indicate whether such an encoding is desirable or not. Color can also represent categorical variables with small cardinality. In some implementations, color encoding for categorical variables with a cardinality of ten or less is considered good (i.e., ranked high), but the scoring decreases as the cardinality increases beyond ten. When there are too many colors, they become difficult to discriminate.

Shape is perceptually hard to discern when there are more than ten distinct shapes plotted in a view. However, when the shapes are distinctive or there is a small number of them, shape can be an effective way of communicating additional information.

The ranking criteria identified above for text tables, bar charts, scatter plots, line graphs, and maps are not exhaustive, and are expected to vary over time as further empirical data is collected about what types of data visualizations are useful. In addition, implementations apply similar criteria to other types of data visualizations, such as treemaps, network diagrams, bubble plots, and so on. Further, the weighting of the criteria varies based on user preferences, feedback from individual users, and aggregated feedback.

In some implementations, the scores within each view type are combined to form a single overall ranking. In some implementations, merging the ranked lists of views of different types involves a number of different considerations that are combined. The considerations include favoring map views when the set of data fields contains a geographic field and not more than two measures. In general, maps can encode a maximum of two measures, one measure corresponding to the size of the geographically positioned symbols and one measure corresponding to the color of those symbols. Line charts are favored when the set of data fields contains a temporal field. A line chart naturally represents the continuity of time, making it easier to see trends, consistent patterns, and outlying behavior. Bar charts are favored over scatter plots when more than two measures are selected because it is easier to see the overall trend of multiple measures aligned together and make relative comparisons on the values across the measures. A scatter plot is favored when exactly two measures are selected along with any number of other fields, because it is generally the best visual representation to understand the bivariate data relationship between the two measures. Large views are almost always disfavored, including large text tables with a large number of empty cells or large bar charts that require scrolling on the height and width for exploration. Also disfavored are small multiples of maps or scatter plots in which each pane is small, which makes the whole display difficult to read.

In some implementations, in addition to the views that use exactly the set of data fields selected by the user, additional alternative views are identified based on modified sets of data fields. In some implementations, the set of alternative views is presented to the user separately. Within the set of alternative views, the ranking has an additional factor, which is the extent to which the modified set of data fields differs from the original user-selected set of data fields. The greater the differences, the lower the weight, regardless of how good the data visualization is (even a "great" data visualization is not useful if it is not what the user wants).

In some implementations, all of the views are ranked together and presented to the user in a single list. In this case, merging the two lists has some additional factors. In general, there is a preference for the best views that include the exact set of data fields selected by the user. Large views are down weighted. This includes large tables, complex views, or large groups of small multiples, even if the large views include the exact set of user-selected data fields. Large or complex views that require scroll bars for navigation or represent a large set of data fields sacrifice their analytic value at the expense of representing all the data. In some instances, different views of subsets of the data are more meaningful (e.g., applying a filter). Some implementations favor views that use a subset of the data fields when the number of user selected data fields exceeds some threshold. Conversely, some implementations favor views with a superset of the user-selected data fields when the number of user-selected data fields is less than some threshold.

FIG. 1 illustrates the context in which some implementations operate. A user 100 interacts with a computing device 102, such as a desktop computer, a laptop computer, a tablet computer, a mobile computing device, or a virtual machine running on such a device. An example computing device 102 is described below with respect to FIG. 2, including various software programs or modules that execute on the device 102. In some implementations, the computing device 102 includes one or more data sources 236 and a data visualization application 222 that the user 100 uses to create data visualizations from the data sources. That is, some implementations can provide data visualization to a user without connecting to external data sources or programs over a network.

However, in some cases, the computing device 102 connects over one or more communications networks 108 to external databases 106 and/or a data visualization server 104. The communication networks 108 may include local area networks and/or wide area networks, such as the Internet. A data visualization server 104 is described in more detail with respect to FIG. 3. In particular, some implementations provide a data visualization web application 320 that runs wholly or partially within a web browser 220 on the computing device 102. In some implementations, data visualization functionality is provided by both a local application 222 and certain functions provided by the server 104. For example, the server 104 may be used for resource intensive operations.

Figure 2:
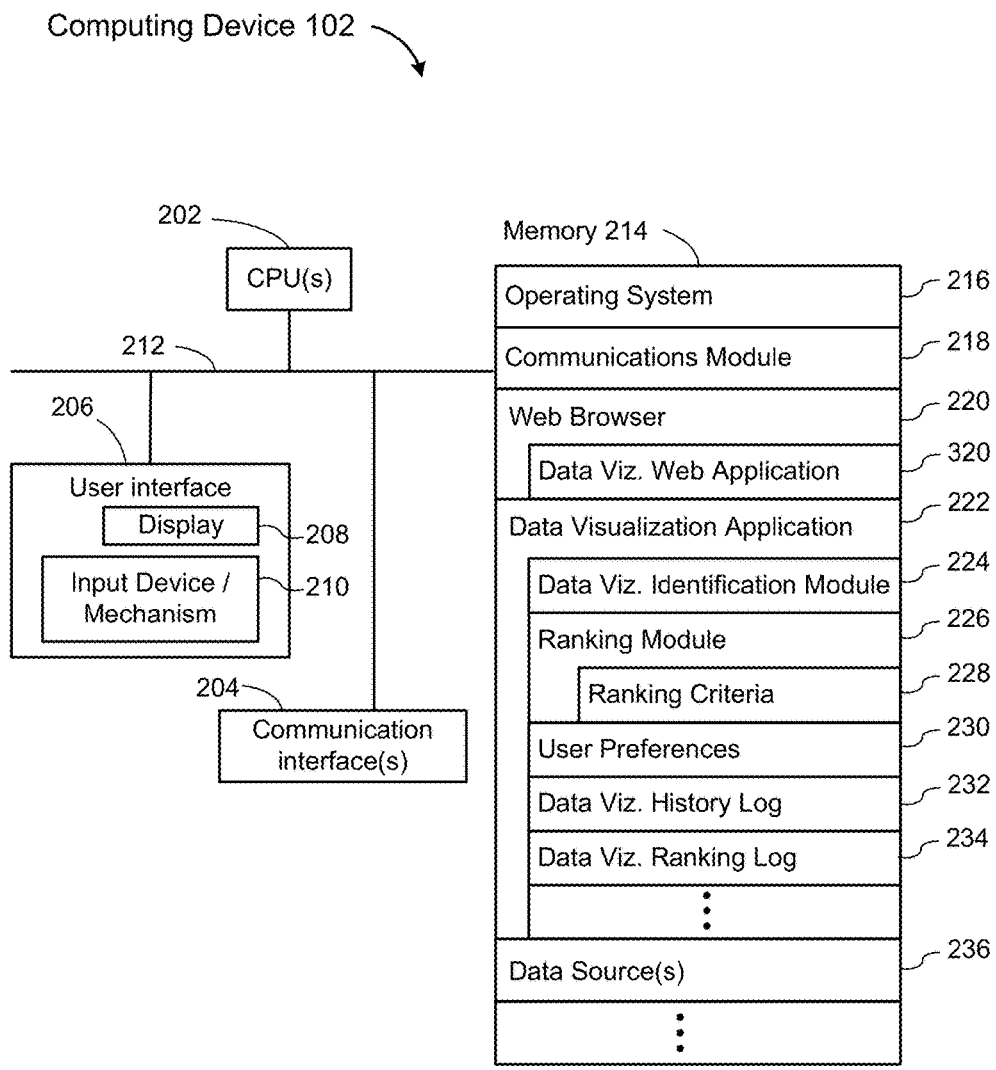
FIG. 2 is a block diagram of a computing device in accordance with some implementations.
Figure 14:
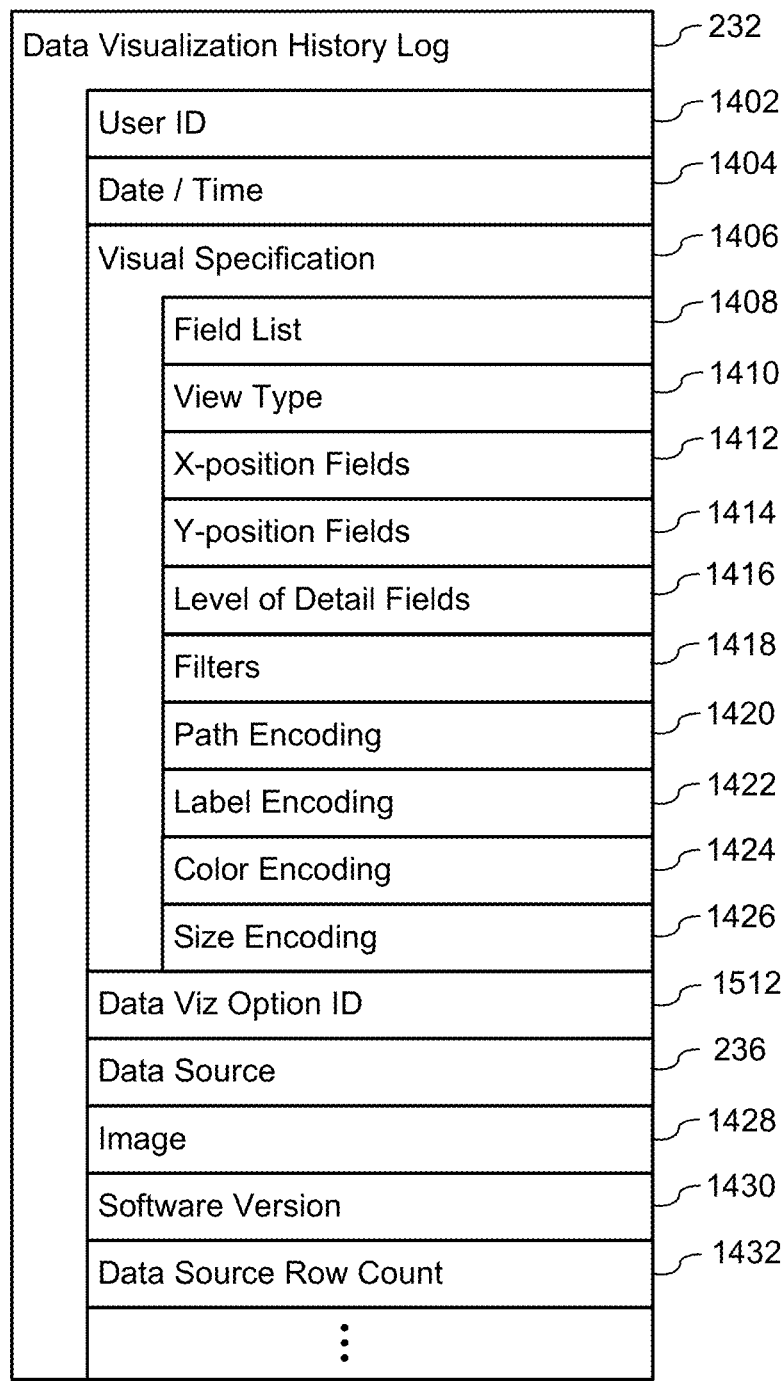
FIG. 14 illustrates a data visualization history log in accordance with some implementations.

FIG. 2 is a block diagram illustrating a computing device 102 that a user uses to create and display data visualizations in accordance with some implementations. A computing device 102 typically includes one or more processing units/cores (CPUs/GPUs) 202 for executing modules, programs, and/or instructions stored in memory 214 and thereby performing processing operations; one or more network or other communications interfaces 204; memory 214; and one or more communication buses 212 for interconnecting these components. The communication buses 212 may include circuitry that interconnects and controls communications between system components. A computing device 102 includes a user interface 206 comprising a display device 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, memory 214 includes high-speed random access memory, such as DRAM, SRAM, DDR RAM, or other random access solid state memory devices. In some implementations, memory 214 includes non-volatile memory, such as one or more magnetic disk storage devices, optical disk storage devices, flash memory devices, or other non-volatile solid state storage devices. Optionally, memory 214 includes one or more storage devices remotely located from the CPU(s)/GPUs 202. Memory 214, or alternately the non-volatile memory device(s) within memory 214, comprises a computer readable storage medium. In some implementations, memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the computing device 102 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application 320 provided by a data visualization server 104 (e.g., by receiving appropriate web pages from the server 104 as needed). In some implementations, a data visualization web application 320 is an alternative to storing a data visualization application 222 locally;
- a data visualization application 222, which enables users to construct data visualizations from various data sources. The data visualization application 222 retrieves data from a data source 236, then generates and displays the retrieved information in one or more data visualizations. In some instances, the data visualization application invokes other modules (either on the computing device 102 or at a data visualization server 104) to identify a set of good data visualizations based on the user's selection of data fields, as described in more detail below;

the data visualization application 222 includes a data visualization identification module 224, which uses a set of data fields selected by the user, and identifies or generates a set of possible data visualizations based on the set of selected fields;

the data visualization application 222 includes a ranking module 226, which takes a set of possible data visualizations for a set of data fields, and ranks the possible data visualizations according to a set of ranking criteria 228. This process is described in more detail below;

in some implementations, the data visualization application 222 stores user preferences 230, which may be used by the identification module 224, the ranking module 226, or for other aspects of the data visualization application 222. The user preferences may include preferences that are explicitly stated and/or preferences that are inferred based on prior usage. The preferences may specify what types of data visualizations are preferred, the preferred data visualization types based on the data types of the selected data fields, preferences for visual encodings (such as size, shape, or color), weighting factors for the various ranking criteria (e.g., inferred by prior selections), and so on. Some implementations also provide for group preferences, such as preferences for a financial group or preferences for a marketing or sales group. Some implementations also identify the aggregate preferences of all users ("the wisdom of the herd"). Some implementations allow both individual and group preferences. Some implementations enable multiple levels of user preferences. For example, a user may specify general preferences as well as preferences for a specific data source or specific fields within a data source. For example, a user may have a specific preferred set of shape, size, or color encodings for the product lines within a company;

in some implementations, the data visualization application 222 stores data in a history log 232 for each data visualization created by the user 100. In some implementations the history log 232 is used to directly or indirectly identify future data visualizations for the user and/or for other users. In some implementations, a history log 232 is stored at a server 104 in addition to or instead of a history log 232 stored on the computing device 102. An example history log 232 is illustrated in FIG. 14;

in some implementations, the ranking module 226 stores data in a ranking log 234 for each data visualization option evaluated for a user. In some implementations the ranking log 234 is used to evaluate and adapt the ranking process in order to provide each user with better options based on previous selections. An example ranking log 234 is illustrated in FIG. 15; and one or more data sources 236, which have data that may be used and displayed by the data visualization application 222. Data sources 236 can be formatted in many different ways, such as spreadsheets, XML files, flat files, CSV files, text files, desktop database files, or relational databases. Typically the data sources 236 are used by other applications as well (e.g., a spreadsheet application).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 214 may store a subset of the modules and data structures identified above. Furthermore, memory 214 may store additional modules or data structures not described above.

Although FIG. 2 shows a computing device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
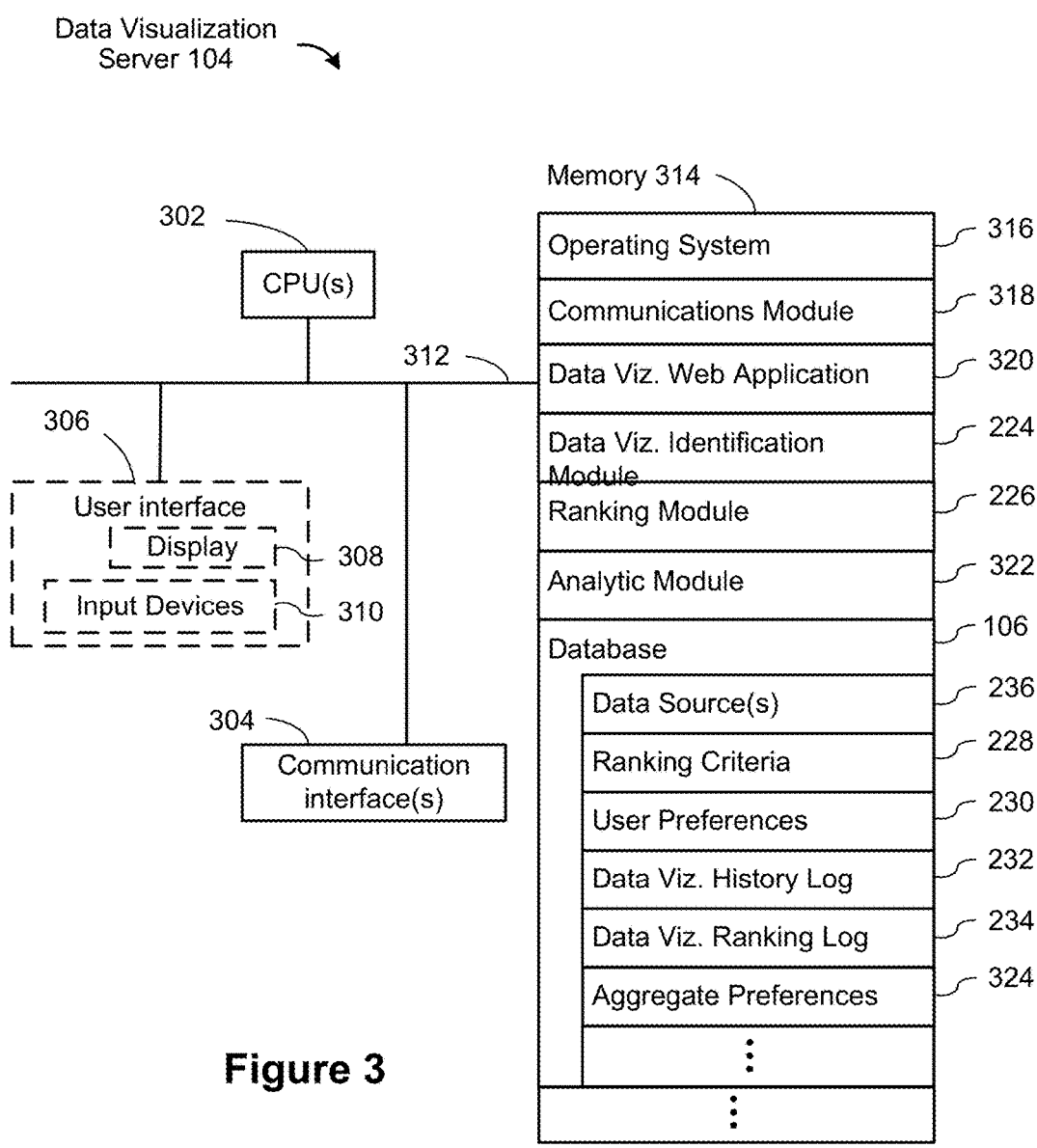
FIG. 3 is a block diagram of a data visualization server in accordance with some implementations.

FIG. 3 is a block diagram illustrating a data visualization server 104, in accordance with some implementations. A data visualization server 104 may host one or more databases 106 or may provide various executable applications or modules. A server 104 typically includes one or more processing units (CPUs/GPUs) 302, one or more network interfaces 304, memory 314, and one or more communication buses 312 for interconnecting these components. In some implementations, the server 104 includes a user interface 306, which includes a display device 308 and one or more input devices 310, such as a keyboard and a mouse.

Memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 314 may optionally include one or more storage devices remotely located from the CPU(s)/GPUs 302. Memory 314, or alternately the non-volatile memory device(s) within memory 314, includes a non-transitory computer readable storage medium. In some implementations, memory 314 or the computer readable storage medium of memory 314 stores the following programs, modules, and data structures, or a subset thereof:

an operating system 316, which includes procedures for handling various basic system services and for performing hardware dependent tasks;

a network communication module 318, which is used for connecting the server 104 to other computers via the one or more communication network interfaces 304 (wired or wireless) and one or more communication networks 108, such as the Internet, other wide area networks, local area networks, metropolitan area networks, and so on;

a data visualization web application 320, which may be downloaded and executed by a web browser 220 on a user's computing device 102. In general, a data visualization web application 320 has the same functionality as a desktop data visualization application 222, but provides the flexibility of access from any device at any location with network connectivity, and does not require installation and maintenance;

a data visualization identification module 224, which may be invoked by either the data visualization application 222 or the data visualization web application 320. The identification module was described above with respect to FIG. 2, and is described in more detail below;

a ranking module 226, which may be invoked by either the data visualization application 222 or the data visualization web application 320. The ranking module was described above with respect to FIG. 2, and is described in more detail below;

an analytic module 322, which analyzes the data visualization history log 232 (either for a single user or multiple users). In some implementations, the analytic module 322 infers user preferences 230 based on the data in the history log (e.g., what types of data visualizations the user prefers, what visual encodings the user prefers, and so on). In some implementations, the analytic module uses history log data 232 from multiple users to infer aggregate preferences 324. In some instances, the aggregate preferences are for a well-defined group of individuals, such as the employees in a company's finance department. In some instances, the aggregate preferences pertain to specific data fields from a specific data source 236 (e.g., encode certain data fields in a specific way). In some instances, the analytic module 322 identifies aggregate preferences 324 on a more global level, such as a preference to use a map data visualization when the selected data fields include a geographic location. In some instances, the analytic module 322 identifies preferences based on the data types of the data fields (e.g., if two numeric fields, one date field, and one categorical field are selected, what types of data visualizations are preferred). In some implementations, machine learning (e.g., a neural network) is used to infer global preferences;

one or more databases 106, which store data sources 236 and other information used by the data visualization application 222 or data visualization web application 320;

in some implementations, the database(s) 106 stores the ranking criteria 228 that are used by the ranking module 226. Examples of ranking criteria 228 and how they are applied and combined are described in more detail herein. In some implementations, the ranking criteria 228 and/or the weighting of the ranking criteria is updated over time by the analytic module 322 as additional data about actual usage is collected and analyzed;

in some implementations, the database(s) 106 store user preferences 230, which was described in more detail above with respect to FIG. 2;

the database(s) 106 store a history log 232, which specifies the data visualizations actually selected by users. Each history log entry includes a user identifier, a timestamp of when the data visualization was created, a list of the data fields used in the data visualization, the type of the data visualization (sometimes referred to as a "view type" or a "chart type"), and how each of the data fields was used in the data visualization. In some implementations, an image and/or a thumbnail image of the data visualization is also stored. Some implementations store additional information about created data visualizations, such as the name and location of the data source, the number of rows from the data source that were included in the data visualization, version of the data visualization software, and so on. For security and/or data privacy reasons, some implementations modify, limit, and/or encrypt certain data before storage in the log 232 (e.g., some implementations anonymize the data). A history log 232 is illustrated below in FIG. 14;

in some implementations, the ranking module 226 stores data in a ranking log 234 for each data visualization option evaluated for a user. In some implementations the ranking log 234 is used to evaluate and adapt the ranking process in order to provide each user with better options based on previous selections. An example ranking log 234 is illustrated in FIG. 15; and in some implementations, the database(s) 106 store aggregate preferences 324, which are inferred by the analytic module 322, as described above.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 314 may store a subset of the modules and data structures identified above. Furthermore, memory 314 may store additional modules or data structures not described above.

Although FIG. 3 shows a server 104, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 104 may be stored on a computing device 102. In some implementations, the functionality and/or data may be allocated between a computing device 102 and one or more servers 104. Furthermore, one of skill in the art recognizes that FIG. 3 need not represent a single physical device. In many implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

Figure 4:
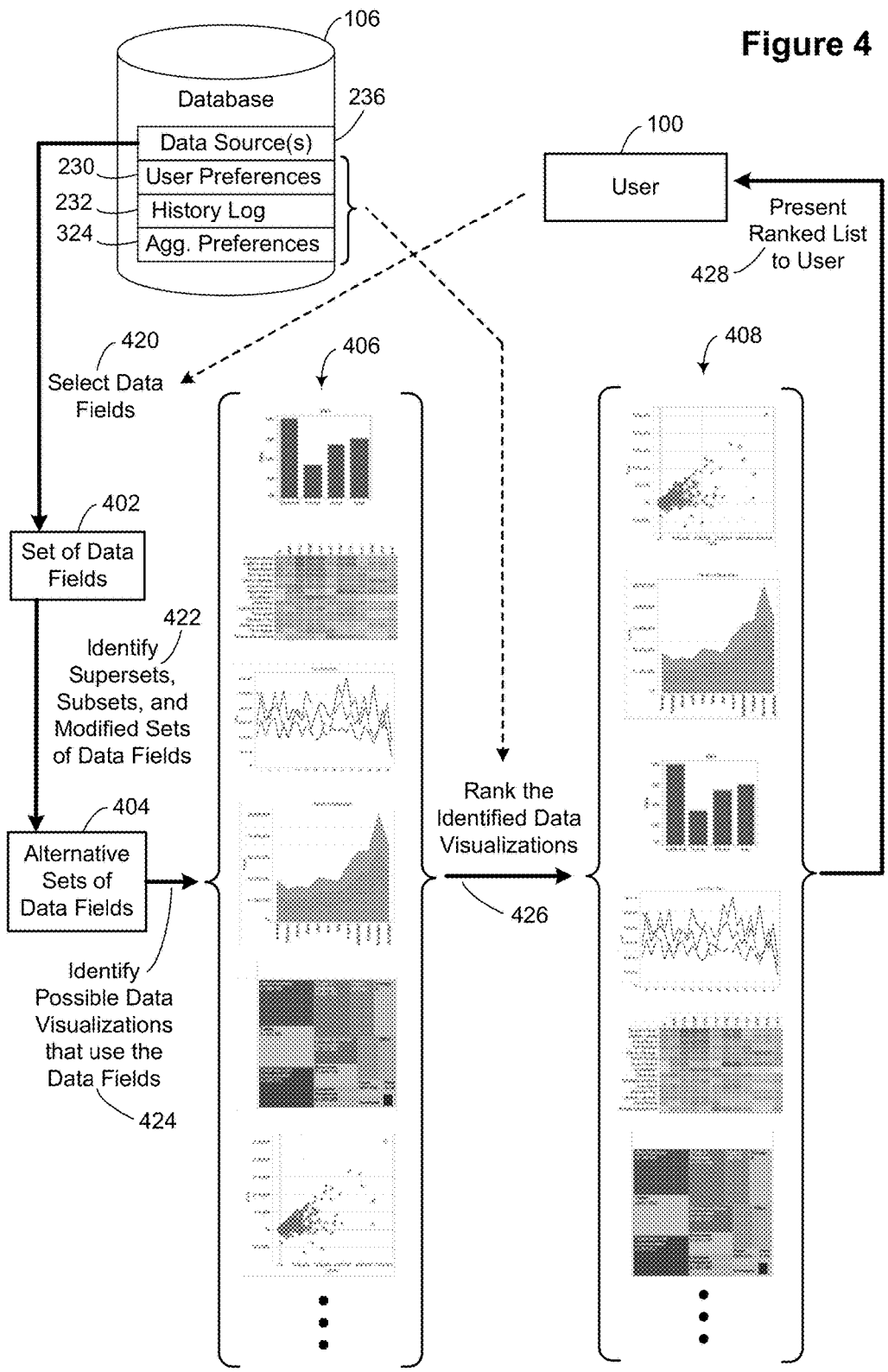
FIG. 4 illustrates the overall process flow for identifying and ranking data visualizations in accordance with some implementations.

FIG. 4 illustrates a process flow for identifying and ranking data visualizations in accordance with some implementations. In this example, the data source 236 as well as the user preferences 230, history log 232, and aggregate preferences 324 are stored in a database 106, which may be accessed over a network 108 or stored locally on a computing device 102 of the user 100. The user 100 selects (420) a set of data fields 402 from the data source(s) 236. The user wants to create a data visualization that includes these fields.

In some implementations, the data visualization identification module 224 takes the selected set of data fields 402, and identifies (422) alternative modified sets of data fields 404. The modified sets include supersets of the selected fields 402, subsets of the selected fields, sets of fields in which different filters are applied, sets in which one or more fields is replaced by another field (such as a hierarchically broader or narrower field), and so on. In some instances, when supersets or subsets are selected, the selection is based on semantic relatedness of the fields. For example, a superset may include an additional field that is related to the other fields. In another example, a field may be removed because it is not semantically related to the other fields. In practice, the alternative sets of data fields 404 are typically closely related to the original set of data fields 402 selected by the user because the goal is to create data visualizations that display what the user wants. This process is described in more detail below with respect to FIGS. 6A and 6B.

For each set of data fields, the data visualization identification module 224 identifies (424) possible data visualizations 406 to display the data fields in the set. In some implementations, all possibilities are identified. In some implementations, all possibilities are initially identified, but many are culled based on simple evaluation criteria. This avoids applying the full evaluation process to a large number of possible data visualizations, which is generally useful because many of the options can be quickly dismissed as not being as good as other options. In some implementations, the identification module 224 operates multiple threads in parallel. For example, some implementations use a separate thread for each of the basic view types. In some implementations, the identification process is further subdivided in order to identify all the options more quickly. In some implementations, the parallel processing uses map-reduce technology, and may be combined with the ranking phase.

The ranking module 226 ranks (426) the identified data visualizations 406 to form a ranked list 408. In some implementations, the ranked list 408 includes only a small number of top ranked entries (e.g., the top five or ten recommended data visualizations). In some implementations, the ranking module 226 ranks all of the possible data visualizations 406 after all of the options have been identified. In some implementations, the ranking module 226 ranks each data visualization as it is identified. In particular, when the identification process 424 operates in parallel, the ranking process 426 operates in parallel as well. In some implementations, the scores used for ranking comprise two scores: a first score based on comparing data visualizations within a specified view type, and a second score based on the view type itself. In these implementations, the first score represents how well the proposed data visualization stacks up against other visualizations of the same type (taking into account the specific data fields selected). The second score represents how well a certain view type is able to represent the selected fields (e.g., a map generally represents data well when there is a geographic component).

For the final rankings, all of the data is used (subject to any applied filters). However, in earlier stages of the process, some implementations compute a preliminary ranking based on a subset of the data (i.e., less than all of the rows from the data source). For a very large data source, a preliminary ranking may be based on a small subset of the rows, such as 1% or 5%. Some implementations use a random sample or other sampling technique.

As described herein, various criteria may be used to compute the scores, and each criterion may be assigned a distinct weight in the overall scoring process. In some implementations, the weighting is linear, such as $s=w_1 c_1 + w_2 c_2 + \ldots + w_n c_n$, where s is the overall score, $c_1, c_2, \ldots, c_n$ are the criteria, and $w_1, w_2, \ldots, w_n$ are the weights for the corresponding criteria. In some implementations, the weights are adjusted over time based on actual user selection of data visualizations. In some implementations, the weights are adjusted or adapted to individual user preferences or the preferences of a cohort group of users. In some implementations, the weighting of the criteria is non-linear. Each criterion may be based on several factors, such as the values of multiple data fields. In some implementations, some criteria apply to all of the possible data visualizations 406, whereas other criteria are applicable to only data visualizations of certain view types. This is also described with respect to FIG. 5.

Once the data visualizations are ranked (426), the ranked data visualizations are presented (428) to the user. A sample presentation is illustrated in FIG. 13. Some implementations limit the number of data visualizations presented (428) to the user 100. In some implementations, the number presented is a user configurable parameter. In some implementations, the presentation screen includes a button or other visual control to see additional options. For example, in some implementations, the top five data visualizations are presented to the user. If the user wants to see additional options, the user may select the "More" button to see the data visualizations ranked 6-10. Pressing the button additional times displays further options that were ranked even lower.

Figure 5:
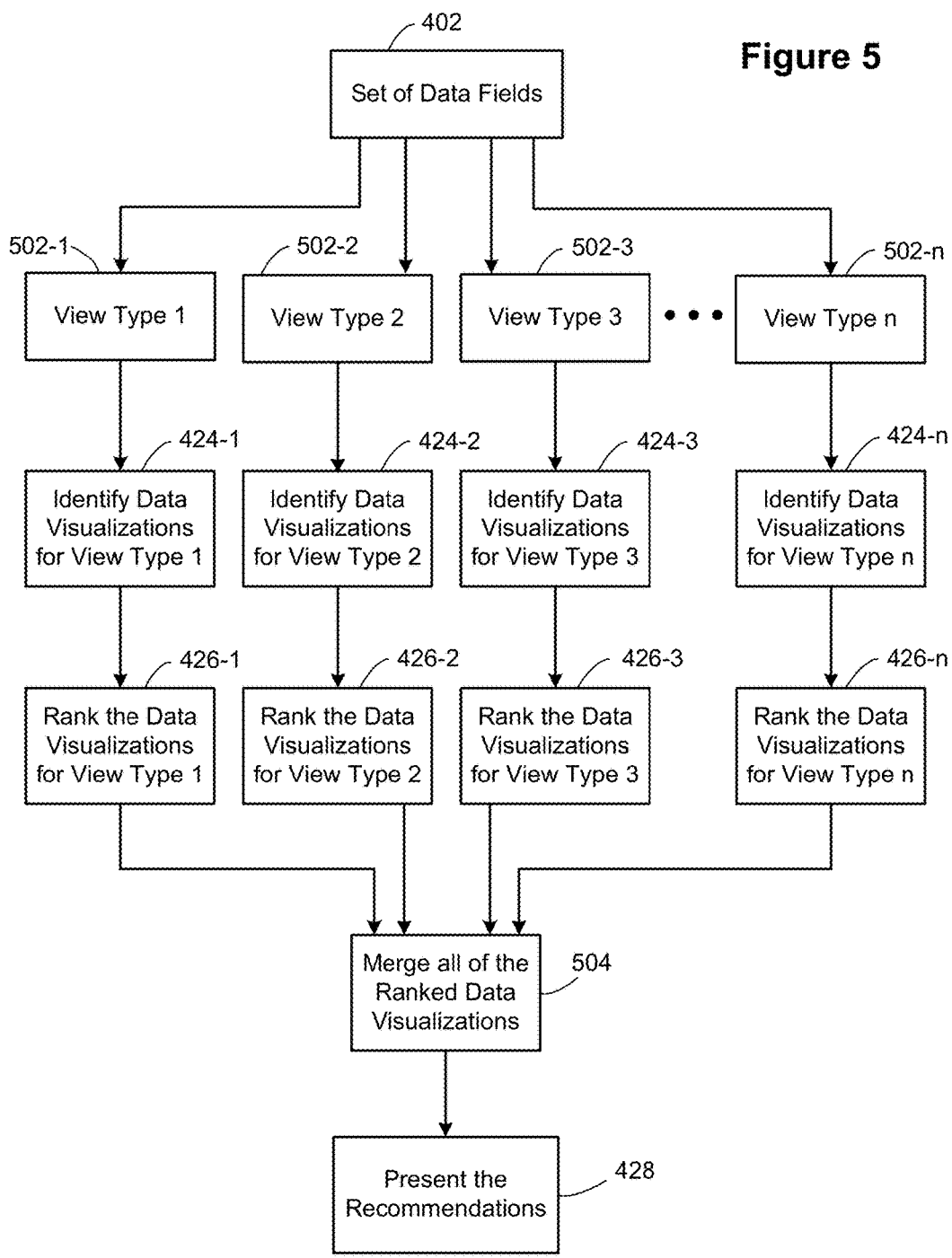
FIG. 5 illustrates a process flow for ranking data visualizations in accordance with some implementations.

FIG. 5 illustrates a process where the data visualizations are identified and evaluated for each view type separately, then merged together at the end. Some implementations use map-reduce technology for this process to reduce the overall time. However, the processing for each view type can occur serially (e.g., when there are insufficient resources for parallel processing). In this illustration, the process starts with a single set of data fields 402, but the same processes could be applied to multiple alternative sets of data fields 404 simultaneously. For example, some implementations assign a distinct execution thread to each (view type, data field set) combination, and perform a merge at the end. In other implementations, a thread is assigned to each view type, and within that view type all of the alternative sets of data fields 404 are considered together (e.g., serially).

Within a data visualization application 222 (or web application 320), there is a fixed set of supported view types 502. (Of course a new version of the software may support additional view types.) In FIG. 5, there are n view types, labeled as view types 502-1, 502-2, 502-3, . . . , 502-n, where n is a positive integer. In typical implementations, n is an integer between five and ten. Within each of these view types, the identification module 224 identifies (424) a set of data visualizations with that view type. In this illustration there are n distinct view types, so there are n distinct identification processes, each running an instance of the identification module 224 (i.e., processes 424-1, 424-2, 424-3, . . . , 424-n). In some implementations, the identification module 224 comprises a set of programs, procedures, or methods, with a distinct program (or procedure or method) for each of the view types. In some implementations, the identification phase is top down: identify all options, then cull the ones that can be easily recognized as not good. Other implementations use a bottom up approach, generating only the options that are considered sufficiently good.

Once the possible data visualizations within a view type are identified, the ranking module 226 ranks (426) them against each other. Some implementations use a scoring function, and the data visualizations with the highest scores are ranked the highest. Because each view type has specific advantages and disadvantages, the ranking module typically has a distinct scoring function for each of the view types. As noted with respect to FIG. 4, a scoring function is based on a set of weighted criteria. Some of the criteria are shared across multiple view types, but even when criteria are shared, they may be weighted differently for different view types. For example, the presence or absence of scroll bars is a criterion that generally applies to all view types, but for text tables there is a greater tolerance for vertical scroll bars. In addition, sometimes user preferences or user history affects the weighting of criteria. For example, a user who is very comfortable with large spreadsheets may be less bothered by horizontal scroll bars in a data visualization, and thus the criterion to downgrade data visualizations with horizontal scroll bars may be weighted less or eliminated entirely. Some examples of the criteria the ranking module 226 uses are illustrated below in FIGS. 7A, 7B, 8A, 8B, 9A-9C, 10A, 10B, 11A, 11B, 12A, and 12B. In some implementations, the ranking process 426 culls all options with scores below a certain threshold level (which may be different for different view types).

Depending on the selected data fields 402, different types of data visualization are empirically better or worse at conveying the information from those data fields. Therefore, the overall score for a data visualization includes a portion that is based just on the view type. In some implementations, the scoring based on view type is included in the ranking process 426 for each view type, and thus the merge process 504 entails sorting all of the data visualizations based on their overall scores. In other implementations, the scores for view type are accounted for in the merge process, which is sometimes non-linear (e.g., more complex than just adding a fixed number to each score based on the view type of each data visualization). Furthermore, the merging process may occur after the scoring within each view type (as illustrated), or as a continuous process. For example, if all of the threads are executing on a single physical device, some implementations maintain the single ranked list 408 in memory or other data storage at that device. However, in a map-reduce implementation that uses multiple distinct physical devices, implementations typically store individual ranked lists locally for each view type and merge 504 at the end.

In implementations that include alternative modified sets of data fields 404, there can be additional merging. In some implementations, all of the data visualizations are considered together, and the views with highest overall rank are displayed to the user in a single ranked list 408. In some implementations, these additional data visualizations are identified (424) and ranked (426) together with the data visualizations based on the exact set of data fields 402 selected by the user. The alternatives are downgraded according to the extent of modification (e.g., having one criterion that measures the amount of modification from the base set 402, and including this criterion in each scoring function). In other implementations, these alternatives are processed on separate threads, and merged together (504) at the end, with downgraded scores based on altering the set of user-selected data fields. The ranked list 408 of recommendations is presented (428) to the user.

In other implementations, the identified possible data visualizations that use exactly the set of data fields selected by the user are displayed 428 in one list (e.g., one window), and a second list displays the top ranked data visualizations where the set of data fields has been modified in at least one way.

Figures 6A, 6B:
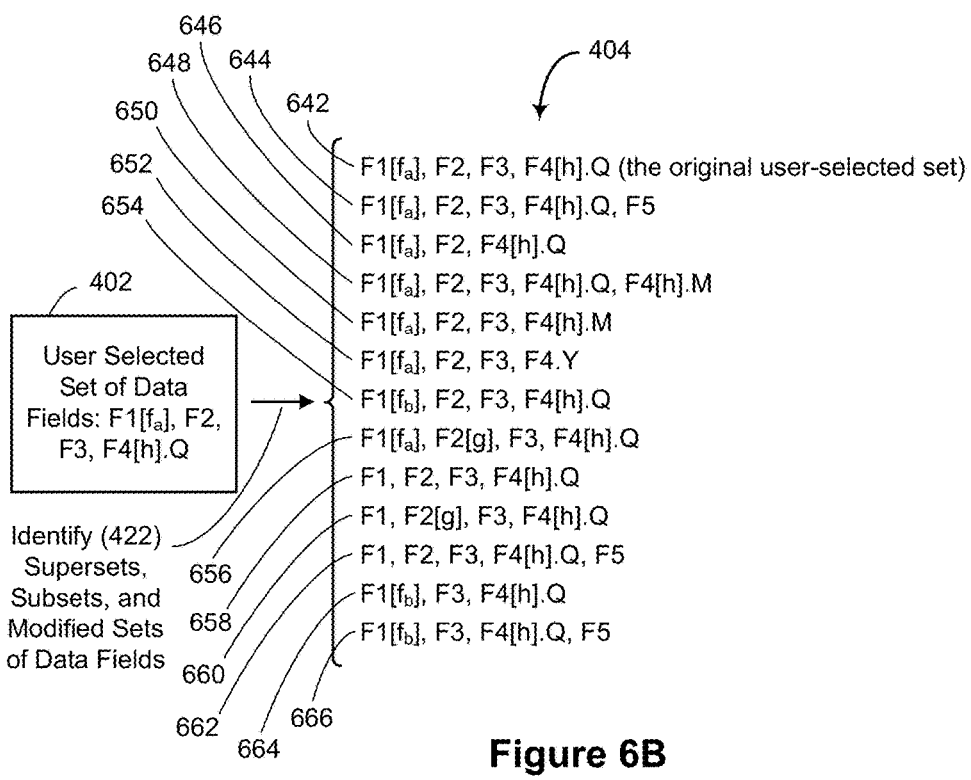
FIGS. 6A and 6B illustrates various ways that a user-selected set of data fields may be modified in order to expand the set of possible data visualizations.

FIGS. 6A and 6B illustrate ways in which a user selected set of data fields 402 can be modified to form an alternative set of data fields. Because the user has specifically selected a set of data fields 402, most implementations limit the modifications (e.g., replacing the selected set of fields with a different set of fields would be a "modification," but would not represent what the user is seeking).

FIG. 6A identifies a set of fields that are included in various sets of fields in FIG. 6B. Field F1 602 is a simple ordinal field, which is typically a character field with a small set of distinct values. For example, F1 may represent sales regions or product lines. The notation [f] after a field name indicates that the filter f is applied to the field. For example, F1[$f_a$] 604 indicates that the field F1 has been limited by filter $f_a$. In practice, filters can involve a combination of fields or apply to an aggregate value, but in FIGS. 6A and 6B the examples are limited to filters that apply to non-aggregated single fields. The field F1[$f_b$] 606 is the field F1 limited by filter $F_b$. For example, if F1 is a field that represents product lines, filter $f_a$ and $f_b$ could limit the set of product lines (e.g., product lines in the U.S. or product lines for paper products).

Fields F2 608 and F3 612 are quantitative fields which can take on a continuous range of numeric values (limited by the precision of the data type). Field F2[g] 610 is the field F2 limited by the filter g. Field F4 614 is a date field, such as an order date. Field F4[h] 616 is the field F4 limited by the filter h. For example, if F4 is an order date field, the filter h may limit the data to orders in 2015. F4[h].Q 618 and F4[h].M 620 indicate the same date field F4 limited by the filter h, but converted to a quarter or month. For example, if F4[h] is an order date field limited to dates in 2015, then F4[h].Q specifies the quarter for each order date (e.g., one of the values 1, 2, 3, or 4). For F4[h].M, the data is converted to a month (e.g., a number between 1 and 12 or the name of the corresponding month). F4.Y 622 is similar, but does not apply a filter and converts the date data to a year. Finally, F5 624 is another data field of any type.

In FIG. 6B, the user selected data fields 402 are F1[$f_a$], F2, F3, and F4[h].Q. The identification module 224 identifies (422) alternative sets of data fields 404 that are similar to the set of data fields selected by the user. Thirteen sample sets are illustrated, including the set {F1[$f_a$], F2, F3, F4[h].Q} 642 selected by the user. The set {F1[$f_a$], F2, F3, F4[h].Q, F5} 644 is a superset, including the additional field F5 624. The set {F1[$f_a$], F2, F4[h].Q} 646 is a subset, with the field F3 612 removed.

The set {F1[$f_a$], F2, F3, F4[h].Q, F4[h].M} 648 is also a superset, but with a specific structure. The set 648 includes both F4[h].Q and F4[h].M, providing both the quarter and the month corresponding to the date field F4. The set {F1[$f_a$], F2, F3, F4[h].M} 650 is similar to the original set 642, but has replaced the quarter with the month. This set of data fields would display the same data, but at a finer level of granularity. The set {F1[$f_a$], F2, F3, F4.Y} 652 is also similar to the original set 642, but has replaced the quarter with the year. In this example set 652, the filter h has also been removed. A data visualization with this set of fields would display the data at a coarser level of granularity (by year rather than by quarter).

The set {F1[$f_b$], F2, F3, F4[h].Q} 654 is the same set of fields as the original set 642, but with a different filter $f_b$ applied to the field F1. Depending on $f_a$ and $f_b$, data visualizations using the two different filters may display more data, less data, or just different portions of the data. The set {F1[$f_a$], F2[g], F3, F4[h].Q} 656 has the same set of fields as the original set 642, but has added a filter g for the field F2. The set {F1, F2, F3, F4[h].Q} 658 has the same set of fields as the original set 642, but has removed the filter $f_a$ from the field F1. The set {F1, F2[g], F3, F4[h].Q} 660 has the same set of fields as the previous example set 658, but has added the filter g for the field F2.

Each of the last three example sets has two or more changes from the original set 642. The set {F1, F2, F3, F4[h].Q, F5} 662 has added the field F5 and removed the filter $f_a$ from field F1. The set {F1[$f_b$], F3, F4[h].Q} 664 has removed the field F2 and switched from filter $f_a$ to filter $f_b$ for field F1. Finally, the set {F1[$f_b$], F3, F4[h].Q, F5} 666 has removed the field F2, added the field F5, and switched from filter $f_a$ to filter $f_b$ for field F1. Because of the three changes to the set of data fields, it would be downgraded substantially.

The various example sets in FIG. 6B illustrate some of the ways that a set of data fields may be modified to create alternative data visualizations. Some implementations downgrade the ultimate rankings differently depending on the type of modification and what the set was originally. For example, if a user has selected many data fields, adding additional fields would be heavily downgraded, whereas removing fields to form a subset may be downgraded only slightly. Conversely, if the user has selected only a small number of fields, then adding more fields may be useful, particularly if the added fields are semantically related to the selected fields. Implementations typically limit the number of modification that will be considered, both because of the deviation from what the user has requested as well as the high cost of generating and evaluating many more options. In some implementations, the limit is two modifications.

Figure 7A:
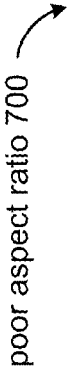
FIGS. 7A and 7B illustrate two alternative data visualizations that have different aspect ratios.
Figure 7B:
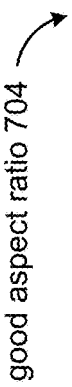

FIGS. 7A and 7B illustrate the preference for data visualizations that fit entirely within the display. FIG. 7A is a text table with a poor aspect ratio 700. The table is sparsely populated and requires a horizontal scroll bar 702 in order to see all of the data. In contrast, the text table in FIG. 7B has a good aspect ratio 704, which fits entirely within the display. It has a denser display, which is generally not problematic for a text table. Even if FIG. 7B required a vertical scroll bar (not pictured), it would be preferable to the horizontal scroll bar 702 in FIG. 7A.

Figure 8A:
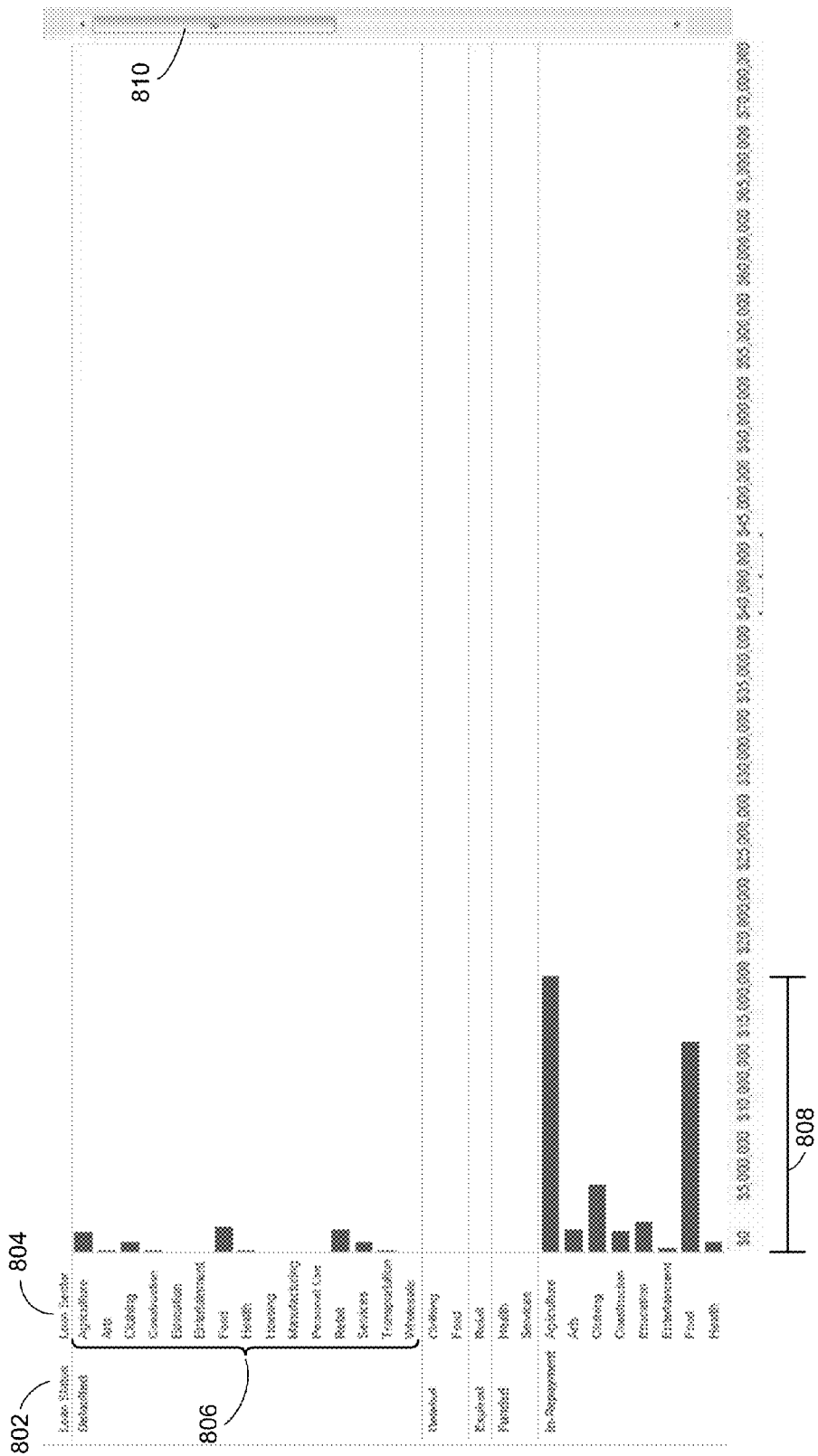
FIGS. 8A and 8B illustrate two alternative bar graphs with different aesthetic properties.
Figure 8B:
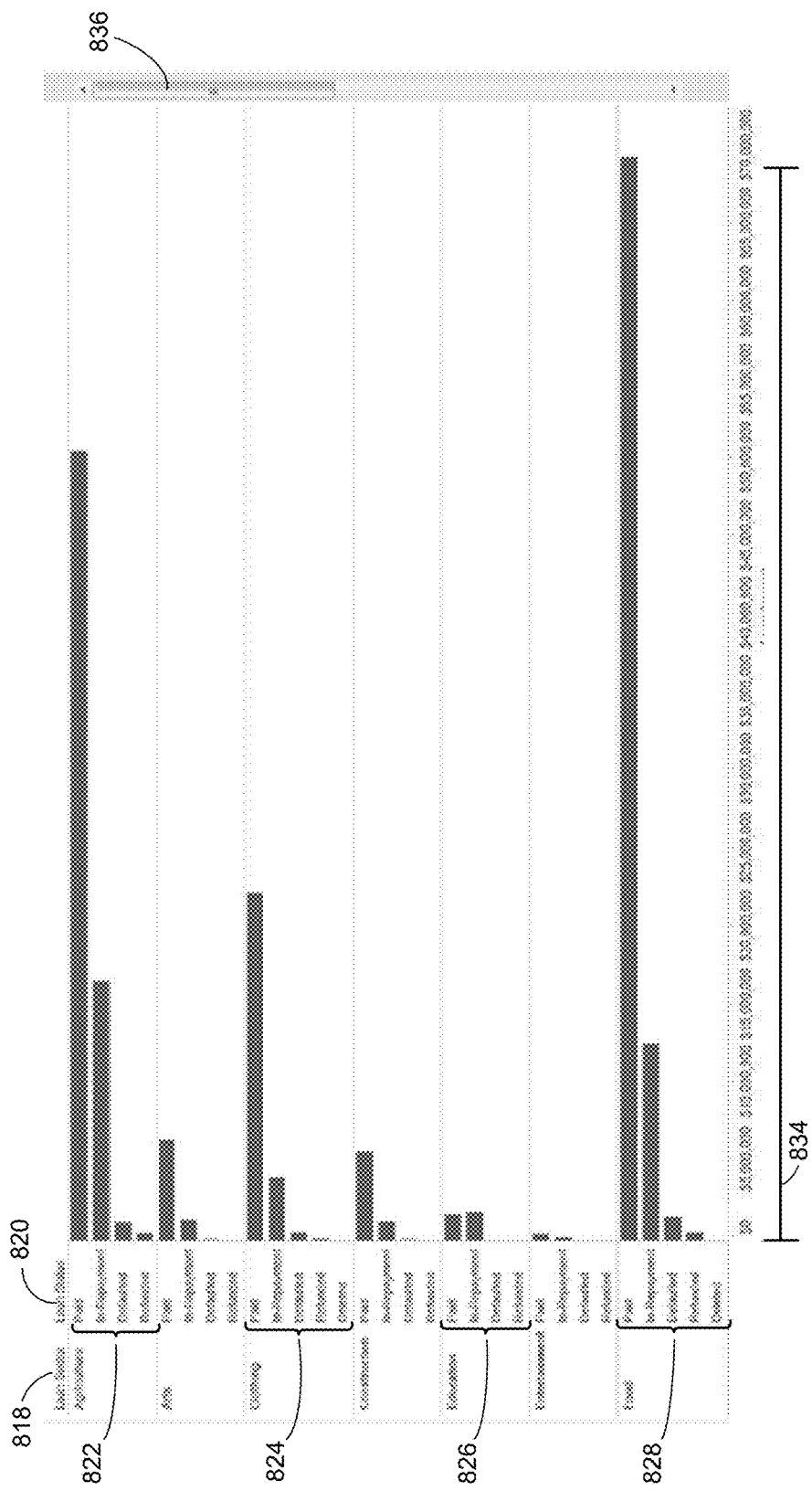

FIGS. 8A and 8B illustrate two alternative bar graphs and some criteria for evaluating them. In FIGS. 8A and 8B, the rows are defined by the pair of fields Loan Status and Loan Sector, but the order of these two fields is different. In FIG. 8A, the Loan Status 802 is the outermost field and the Loan Sector 804 is the innermost field. With this arrangement, some of the panes have a large number of rows, such as the first pane 806 with 15 rows for different loan sectors. In FIG. 8B, with the Loan Sector 818 as the outermost field and the Loan Status 820 as the innermost field, each pane has four or five rows, as indicated by the identified panes 822, 824, 826, and 828. Visually a user can readily grasp and remember the data in a pane with four or five rows, but trying to grasp and remember fifteen rows in the single pane 806 is not easy. Empirical evidence shows that a data visualization with panes having about five elements is better for users, so one criterion for bar graphs is to score the potential bar graphs based on the number of rows in the innermost level of nesting. See, e.g., "The Magical Number Seven, Plus or Minus Two: Some Limits on our Capacity for Processing Information," George A Miller, The Psychological Review, 1956, vol. 63, pp. 81-97.

In addition, the bar graph in FIG. 8A fails to use the horizontal space. The longest bar is only as long as the measuring line 808, leaving a substantial amount of white space in the graph. On the other hand, the bar graph in FIG. 8B uses the full extent of the available horizontal space as indicated by the measuring line 834. Some implementations include criteria that measure the extent to which data visualizations use the available space.

The examples in FIGS. 8A and 8B include vertical scroll bars 810 and 836. Because they both include scroll bars, it does not change the relative ranking of the data visualizations in these figures. An alternative bar graph that does not include vertical scroll bars might be scored even higher than the bar graph in FIG. 8B.

Figure 9A:
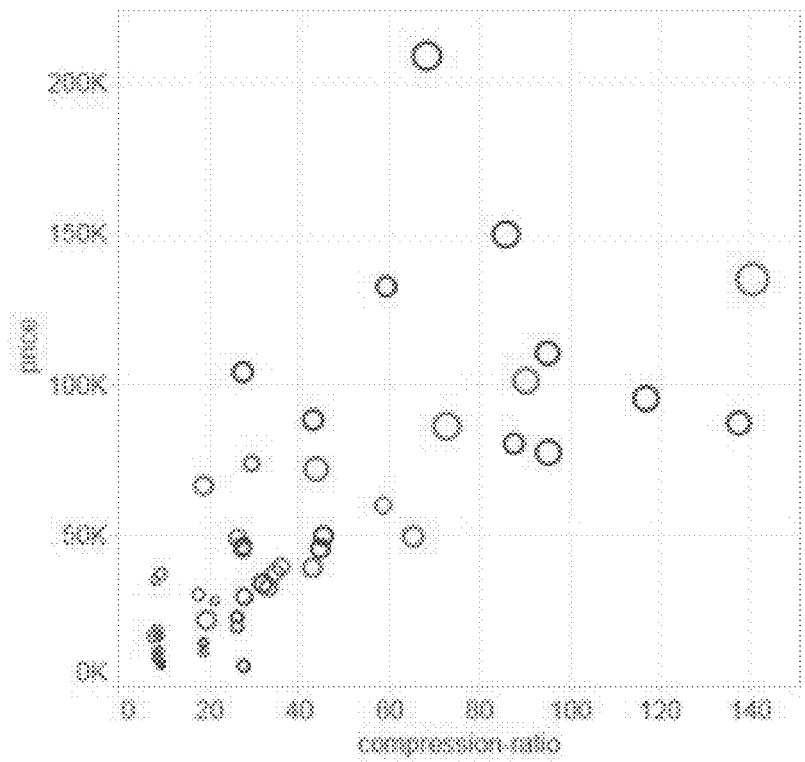
FIGS. 9A, 9B, and 9C illustrate three scatter plots using various combinations of two numeric variables.
Figure 9B:
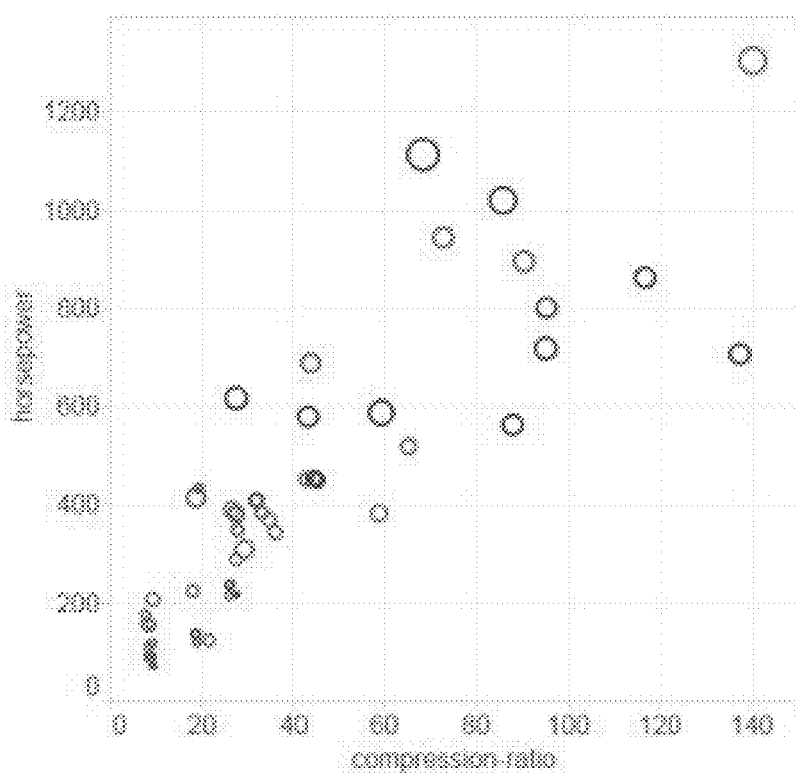
Figure 9C:
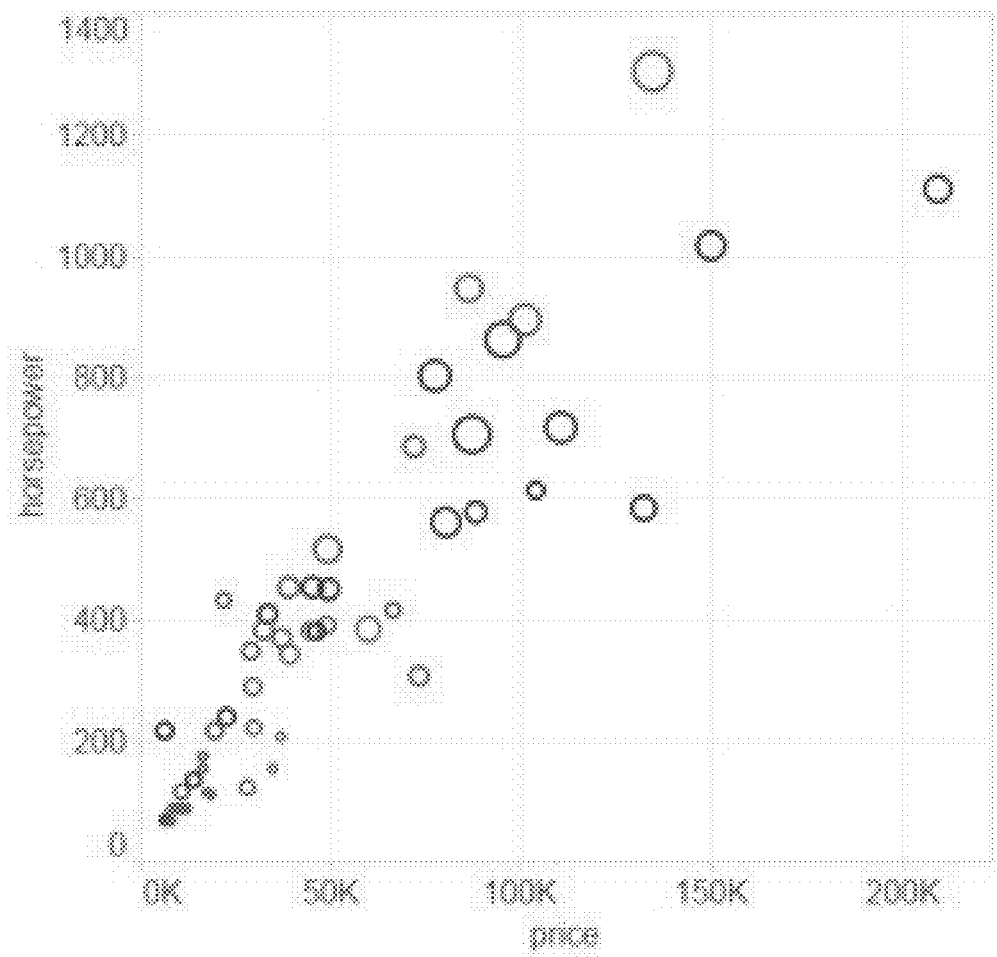

FIGS. 9A, 9B, and 9C are scatter plots that compare three measurable characteristics of cars: price, the compression ratio of the engine, and the horsepower of the engine. If a user selected all three of these data fields, which would be the best scatter plot to recommend? A quick answer is probably FIG. 9C because it appears to show the greatest correlation between variables. FIG. 9A shows the least correlation. If only one of these could be selected, then using FIG. 9C would show the correlation, and the compression ratio could be encoded in the marks (e.g., by the size of the marks).

In some implementations, when there are multiple similar options such as these, a combined data visualization may be created. In fact, such a combined data visualization could be more useful than any one individually because it seems to show that price is somewhat correlated to horsepower (FIG. 9C), but price is not very correlated with compression ratio.

Figure 10B:
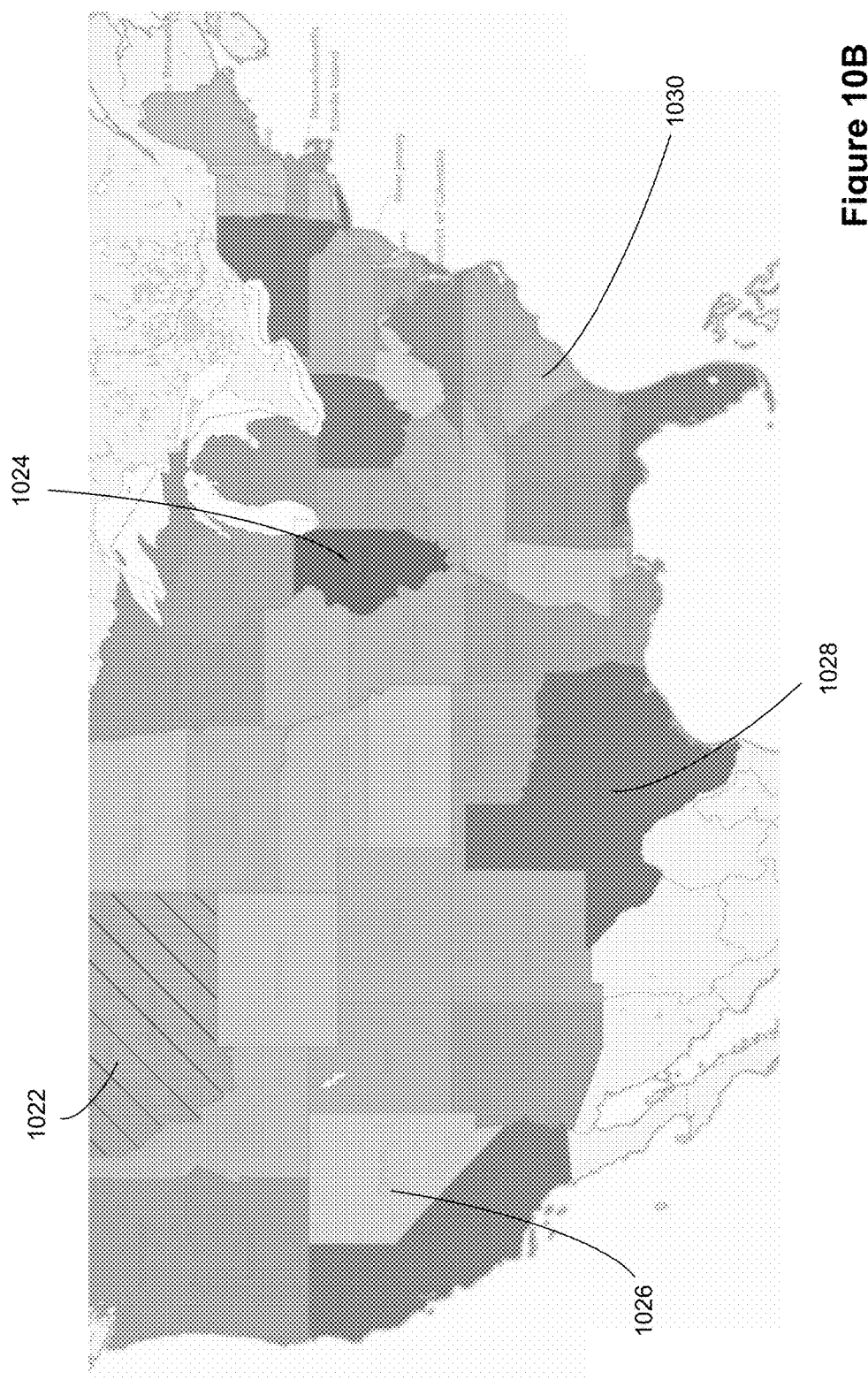

FIGS. 10A and 10B illustrate two different maps that illustrate some numeric variable for each of the states in the United States. FIG. 10A is sometimes referred to as a symbol map and FIG. 10B is sometimes referred to as a filled map. In the map of FIG. 10A, the numeric variable is encoded as the size of the circle displayed in each state. It is relatively easy to see that circle 1004 in Illinois is large, the circle 1008 in Texas is fairly large, the circle 1010 in South Carolina is small, and the circle 1006 in Nevada is very small. But what about Montana 1002, where there does not appear to be a circle at all? The numeric variable is actually negative for Montana, so there is no straightforward way for a circle with a positive size to represent a negative value.

FIG. 10B provides a map where each state is filled with a color based on the same numeric variable used in FIG. 10A. Unlike size, colors can be used effectively to display any ranges of numbers, including negative values. In the original color version of FIG. 10B, Montana 1022 is colored with a pink shade, whereas all of the other states with positive values are colored with some shade of green, making it very easy to recognize the outlier. In this black & white rendering, a line pattern has been added for Montana. (Some implementations use fill patterns when color is not available.)

Although color facilitates rendering negative values, the color fill may not be as visually clear when there is no inherent correlation between color and the magnitude of a numeric variable. Here, a user 100 who is familiar with the color encoding can recognize that Illinois 1024 has the highest value, that Texas 1026 has a large value, South Carolina 1030 has a smaller value, and that Nevada 1026 has a relatively very small value. In this example, the score for the visualization in FIG. 10B is higher than the visualization in FIG. 10A because of the ability to encode negative values. However, if the numeric variable was always positive (e.g., population), then FIG. 10A might have a higher score.

Figure 11A:
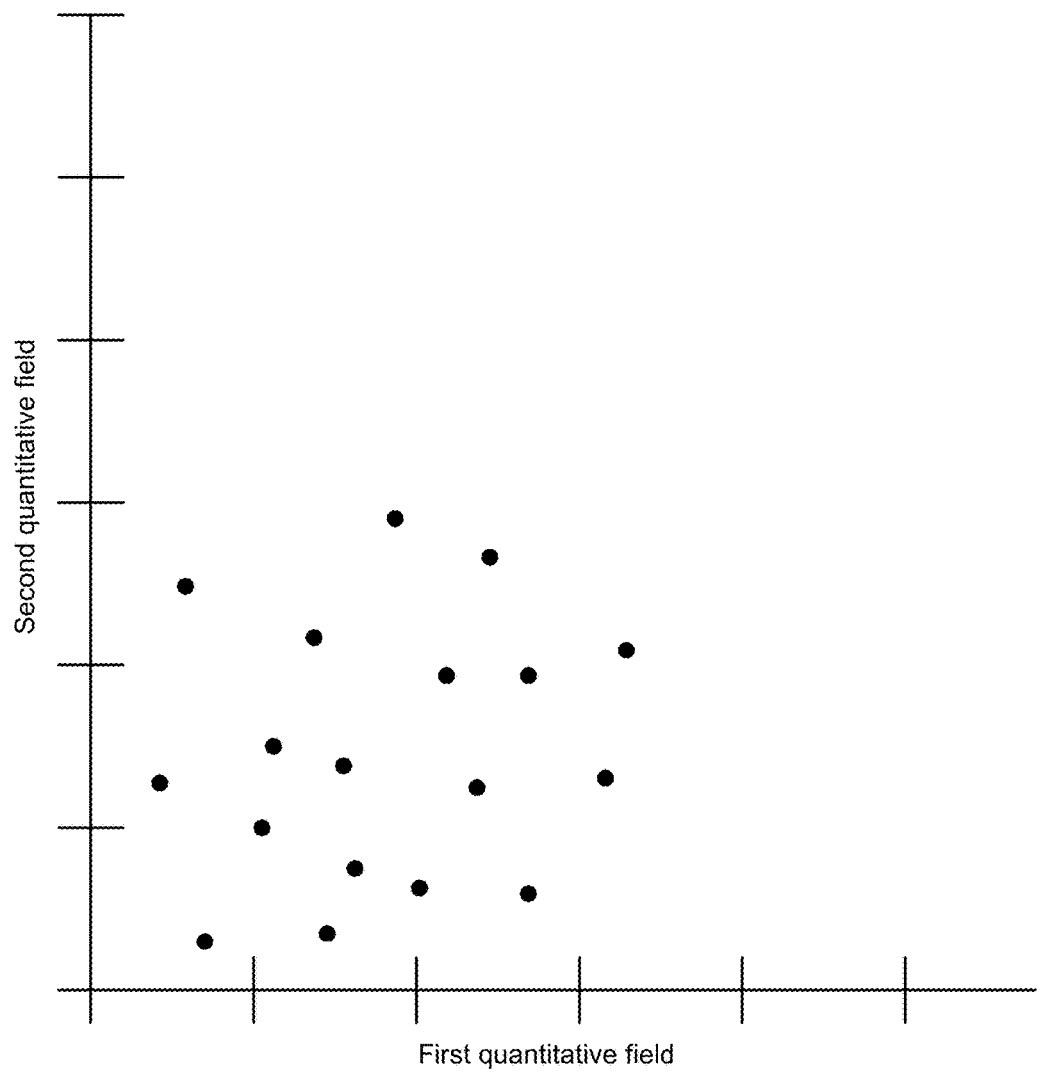
FIGS. 11A and 11B illustrate clustering and outliers in scatter plot diagrams.
Figure 11B:
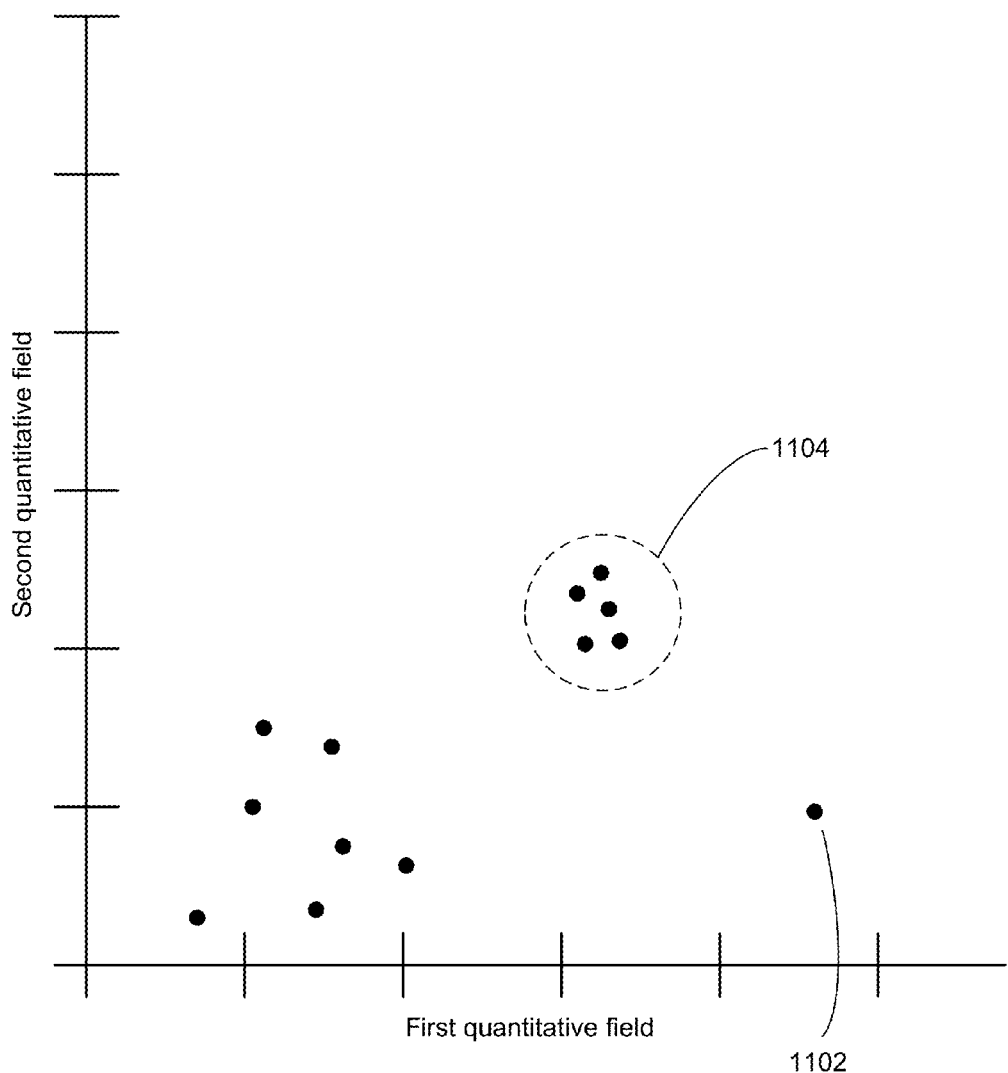

FIGS. 11A and 11B show scatter plot diagrams. In FIG. 11A, there is no discernible pattern (e.g., no clustering, outliers, striation, or monotonicity), so it would receive a low score. On the other hand, FIG. 11B illustrates two statistical features. First, there is an outlier 1102, which is highly visible in this view. (Of course it would be up to an analyst to determine whether the outlier is due to an important consideration, a fluke, or a problem with the data.) FIG. 11B also includes a clump or cluster 1104, which is a group of points that are close to each other but distant from other points in the scatter plot. Because of the outlier 1102 and the cluster 1104, the data visualization in FIG. 11B would be scored more highly than the data visualization in FIG. 11A. In some implementations, the data visualization would score even higher if there were multiple clusters. Techniques to identify clumps, outliers, and other features in scatter plots are described in more detail below.

For scatter plots, implementations consider other graphic features as well. For example, some implementations consider whether the plotted points show a monotonic trend, whether the plotted points show a correlation between the data fields on the axes (e.g., linear, quadratic, or exponential), and whether the plotted points take on discrete values for either data field (e.g., the y-values are all approximately integer multiples of a base value b).

FIGS. 12A and 12B illustrate two line graphs of data for three regions. Typically, line graphs are appropriate when one of the data fields is temporal (e.g., a date, a time of day, or the number of milliseconds after a starting time in a scientific experiment). In FIG. 12A, the line 1212 for the western region 1202 initially increases, stays about the same, then decreases substantially. The line 1214 for the central region 1204 jumps up and back down for each time interval. Finally, for the eastern region 1206, the line 1216 slowly goes down, but then goes back up. None of the lines 1212, 1214, or 1216 has a consistent trend, and there is no consistency between the lines for the three regions. The line graph in FIG. 12A would therefore have a low score.

On the other hand, the line chart in FIG. 12B has at least two visible features. First, the lines 1232, 1234, and 1236 for each of the regions 1222, 1224, and 1226 are monotonically increasing. Second, the lines 1232, 1234, and 1236 are trending in approximately the same way as each other. This correlation between the lines is a useful feature. For these reasons, the line graph in FIG. 12B would be scored more highly than the line graph in FIG. 12A.

One skilled in the art recognizes that monotonicity can be evaluated in various ways. For example, some implementations use Spearman's rank correlation coefficient to measure monotonicity. The raw data $(X_1, Y_1), (X_2, Y_2), \ldots, (X_n, Y_n)$ is converted to two sets of ranks $\{x_1, x_2, \ldots, x_n\}$ and $\{y_1, y_2, \ldots, y_n\}$, where the ranks are the integers 1, 2, ..., n. $x_1$ is the rank of $X_1$, $x_2$ is the rank of $X_2$, and so on. If $\bar{x}$ is the mean of the ranks $x_1, x_2, \ldots, x_n$, and $\bar{y}$ is the mean of the ranks $y_1, y_2, \ldots, y_n$, then the Spearman rank correlation coefficient $\rho$ is given by the formula:

$$MonotonicityMeasure = \rho = \frac{\sum_i (x_i - \bar{x})(y_i - \bar{y})}{\sqrt{\sum_i (x_i - \bar{x})^2 \sum_i (y_i - \bar{y})^2}}$$

where the index i ranges from 1 to n in each sum. Some implementations take the absolute value of this calculation to that monotonically decreasing relations have a positive value for the monotonicity measure.

To compute monotonicity, some implementations compare the total number of consecutive pairs of points where the y-coordinate of the second point is either greater than the y-coordinate of the first point, equal to the y-coordinate of the first point, or less than the y-coordinate of the first point. In some implementations, monotonicity values at or close to 1 are the only ones considered interesting, so smaller values are set to zero. For example, if the computed MonotonicityMeasure is less than 0.75, then set it to zero. The monotonicity measures for all of the lines in a line graph can be combined in various ways, such as summing, averaging, or taking the maximum.

Even when lines in a graph are not monotonic, it can be useful to identify when two or more of the lines within the graph have similar shapes by having consistent trends. For example, two lines may generally go up and down together, such as stock prices for multiple stocks in the same sector.

Some implementations compute the trending consistency between two lines in a way similar to computing monotonicity. For example, if $(x_1, y_1)$ and $(x_2, y_2)$ are two consecutive points on a first line, and $(x_1, y_1')$ and $(x_2, y_2')$ are corresponding consecutive points on a second line, then the two lines are trending in the same way between $x_1$ and $x_2$ when $$\frac{y_2 - y_1}{y_2' - y_1'} > 0$$

By counting the number of consecutive points where the two lines are trending in the same way versus trending in opposite directions, the trending consistency can be measured like monotonicity, as illustrated above. When there are too many lines and/or too many points, the computational cost of comparing all the lines may be too high. Trending consistency may be particularly interesting when there are several lines with the same consistency, as illustrated in FIG. 12B.

FIG. 13 shows an example presentation of the ranked list 408 of top ranked data visualizations. Some implementations include the rank 1302 in the display. However, some implementations omit the rank field because the recommended data visualizations are displayed in rank order. Some implementations include a preview 1304 for each of the data visualizations. In some implementations, the previews are thumbnail images of the actual data visualizations. In some implementations, the presentation includes a view type column 1306, which specifies the view type for each of the recommended options.

In some implementations, the presentation includes a description column 1308, which provides additional notes about each of the recommended data visualizations. For each presented option, the description 1310 may specify which data fields specify the X-positions of graphical marks, which data fields specify the Y-positions of graphical marks, which fields are used for color, shape, or size encodings, which filters are applied, and so on. The description 1310 may also specify any modifications to the set of data fields 402 (e.g., data fields that were added or removed).

FIG. 14 illustrates a data visualization history log 232, which tracks data visualizations selected by one or more users. The data visualizations in the log 232 can be constructed entirely by the user, constructed by an automated process and selected by the user, or a hybrid construction (e.g., initially generated automatically and subsequently modified by the user).

When a log 232 supports more than a single user, the log 232 typically includes a user ID 1402 that uniquely identifies the user. In some implementations, the user ID 1402 is an email address, a network ID, or a user selected ID that is used by the data visualization application 222 or web application 320. In some implementations, the date or date/time 1404 of the user selection is tracked in the log 232.

For each data visualization selected, the log 232 tracks details about the visual specification 1406, which includes various parameters of the data visualization. The visual specification identifies the list of fields 1408 that are included in the data visualization. Some of the fields are data fields taken directly from a data source 236, but other fields are computed based on one or more data fields. For example, a year or quarter field may be computed from a date field representing an order date. Implementations typically group data visualizations into a small number of distinct view types, such as text tables, bar charts, line charts, maps, and scatter plots. The view type 1410 of a data visualization is stored in the log 232. In some implementations, some of the basic view types have some variations that are classified as subtypes. For these implementations, the subtype is typically stored in the log 232 as well.

Data visualizations are typically based on a Cartesian layout with rows and columns. One or more of the fields in the field list 1408 are included in the X-position fields 1412 and one or more of the fields in the field list 1408 are included in the Y-position fields 1414. The order of the fields within the X-position fields 1412 and within the Y-position fields 1414 is important because the order specifies the hierarchical structure. This was illustrated above with respect to FIGS. 7A, 7B, 8A, and 8B. In some instances, the data from the data source 236 is aggregated. For aggregated data, the level of detail 1416 specifies the grouping. The fields in the level of detail 1416 are similar to the GROUP BY fields in an SQL query.

In some instances, a data visualization uses one or more filter 1418, which are stored in the log 232. The filters limit the rows from the data source 236 that are selected for visualization. For example, transaction data may be filtered to a specific date range. Filters are similar to WHERE clauses in an SQL query.

Data visualizations can use various types of encodings to communicate additional information. For some view types (e.g., a line chart), a field can be used to specify path encoding 1420, which orders the data in the display according to the path encoding field 1420. For example, consider a line chart that correlates revenue and profit, with revenue used to specify the x-position. By default, the line graph orders the data from lowest to highest revenue. However, a person might prefer to see the same data sorted by date, which can be accomplished by using the appropriate date field for path encoding.

A label encoding 1422 specifies labels that are associated with graphical marks in the data visualizations. A color encoding can assign a color to each graphical mark based on the value in an encoding field. The color encoding 1424 is saved in the log 232. Finally, the size of visual marks can be set according to a quantitative field designated for size encoding. The size encoding 1426 is stored in the log 232. Each of the encoding types 1420, 1422, 1424, and 1426 may use a single field, but none is required. In some instances, two or more of the encoding options are used for a single data visualization.

In some implementations, when data visualization options are generated and presented to a user, each of the options has an associated unique identifier 1512, as illustrated in FIG. 15 below. In some of these implementations, when a user selects one of those options, the data visualization option ID 1512 is stored in the history log 232, and acts as a link between the history log 232 (what the user selected) and the ranking log 234 (what was presented to the user).

Some implementations store additional information about each data visualization selected by a user. Some implementations store an identifier of the data source 236, which may be expressed in various ways depending on the data source type. For example, a spreadsheet may be specified by a full network path name, and possibly an indicator of a specific sheet name or number within the spreadsheet. For an SQL database, the data source may be specified by a set of parameters, including the server, database, and a table or view. Some implementations provide for data blending from two or more data sources, so the log entry for a data source 236 may be a more complex expression.

Some implementations store an image 1428 of the data visualization, which may be a full resolution image, a thumbnail image, or other compressed image, and may be stored in varying formats (e.g., JPEG, TIFF, PNG, PDF). Some implementations track the software version 1430 that was active at the time the data visualization was created. This may be useful later to identify software bugs, to track changes in the software over time, for statistical analysis of software usage, and so on.

Some implementations store additional pieces of data, which may be used later to analyze and improve the ranking process for the individual user or analyze and improve the software. In some implementations, this includes the count 1432 of rows that were selected from the data source. Some implementations track the amount of time required to perform the operations (e.g., the amount of time to retrieve the data).

In addition to the history log 232 of data visualization actually selected by the user, some implementations include a data visualization ranking log 234 as illustrated in FIG. 15, which tracks the data visualization options that were generated and presented to the user. When the ranking log 234 supports multiple distinct users, the ranking log 234 typically includes a user ID 1502 that specifies the user for whom the options were generated. In addition, a date or date/time entry 1504 stores when the options were generated. Some implementations also store the amount of time used to generate the options, how many processors were used, and other generation parameters.

Data visualization options are generated based on one or more user-selected fields 1506 and zero or more user-selected filters 1508. The generation and ranking process creates one or more data visualization options 1510 that use the user-selected fields 1506 and user-selected filters 1508 (although some of the data visualization options may modify the set of fields and/or the set of filters). In some implementations, each data visualization option has an assigned unique data visualization option ID 1512. Each data visualization option has an associated rank 1514, which is stored in the ranking log 234. Note that the rank 1514 is the computed rank at the time the option is presented to the user. If the same data visualization option is presented to the user in a subsequent ranking process, the rank may be different, even if based on the same user-selected fields 1506 and same user-selected filters 1508. For example, as more feedback is collected from the user, the weighting of the ranking criteria may be adjusted, or the user may specify explicit changes to user preferences.

Some implementations store partial scores 1516 and associated weights 1518, as well as other intermediate calculations 1520 that were used by the ranking process. Examples of partial scores 1516 and intermediate calculation 1520 are provided below, including DataScore, LayoutScore, SimilarityScore, VisualChunking, Sparsity, AspectRatio, ScrollPenalty, PearsonsCorrelation, ClumpyMeasure, StriationMeasure, OutlyingMeasure, MonotonicityMeasure, and VariabilityScore. This data can be used to improve the ranking process in the future. For example, alternative weights can be tested to identify rankings that more closely match what the user actually selected. By having this raw data, various machine learning algorithms can be applied.

Some implementations store whether each data visualization option was selected by the user 1522. In some implementations, selection by the user is indicated by the history log 232, using the data visualization option ID 1512. Some implementations use both ways to show which data visualization options have been selected by the user.

Each data visualization option has a visual specification 1524, which is analogous to the visual specification 1406 described above for the history log 232. In particular, the field list 1526, the view type 1528, X-position fields 1530, Y-position fields 1532, level of detail fields 1534, filters 1536, path encoding 1538, label encoding 1540, color encoding 1542, and size encoding 1544 have the same meanings as corresponding named entries in the history log 232, which were described above.

FIGS. 16A and 16B illustrates how columns in a data visualization may be rearranged to convey information better. In this example, the raw data comes the FAA, and represents wildlife strikes (typically birds) by airplanes at or near airports (see http://wildlife.faa.gov/). The data is grouped by the amount of damage to the plane (None, Minor, Medium, Substantial, or Destroyed). Within these groupings, four different quantitative data fields are evaluated. The first data field is the total cost for each strike, which is displayed in the Cost Total $ pane 1602. A second data field is the number of airplanes damaged, which is shown in the Number Damaged pane 1604. The Number of Strikes pane 1606 shows the total number of wildlife strikes in each of the five groupings. Finally, the Number of People Injured pane 1608 shows the total number of people who were injuring as a result of the wildlife strikes.

As seen in the Number of Strikes pane 1606, the majority of strikes result in no damage. The number of strikes that result in a destroyed plane is so small that it does not even register on the bar graph.

When displaying multiple measures side-by-side as in FIGS. 16A and 16B, a user may better comprehend and retain the information when correlated data fields are placed next to each other. In FIG. 16A, pane 1606 does not correlate well with either of the panes 1604 or 1608, and pane 1604 does not correlate well with pane 1602. FIG. 16B illustrates an arrangement that has greater total correlation between adjacent measures. In particular, pane 1608 correlates fairly well with pane 1602, and the pane 1606 that does not correlate with any of the other three data fields is placed on the far right so that it is adjacent to only one other pane.

Some implementations measure correlation between quantitative fields using Pearson's correlation. For example, if $Q_1$, $Q_2$, $Q_3$, and $Q_4$ are the quantitative fields corresponding to panes 1602, 1604, 1606, and 1608, then the total correlation for the data visualization in FIG. 16A is $|corr(Q_1, Q_2)|+|corr(Q_2, Q_3)|+|corr(Q_3, Q_4)|$. In FIG. 16B, the total correlation is $|corr(Q_1, Q_4)|+|corr(Q_4, Q_2)|+|corr(Q_2, Q_3)|$. In this sample formula, the absolute value is used so that negatively correlated quantitative data fields add to the overall correlation.

FIGS. 17A-17C, 18A-18D, and 19A-19D illustrate various aspects of processes that implementations use to generate and rank data visualization options. The aspects illustrated in these three flow charts may be combined in various ways.

Figure 17A:
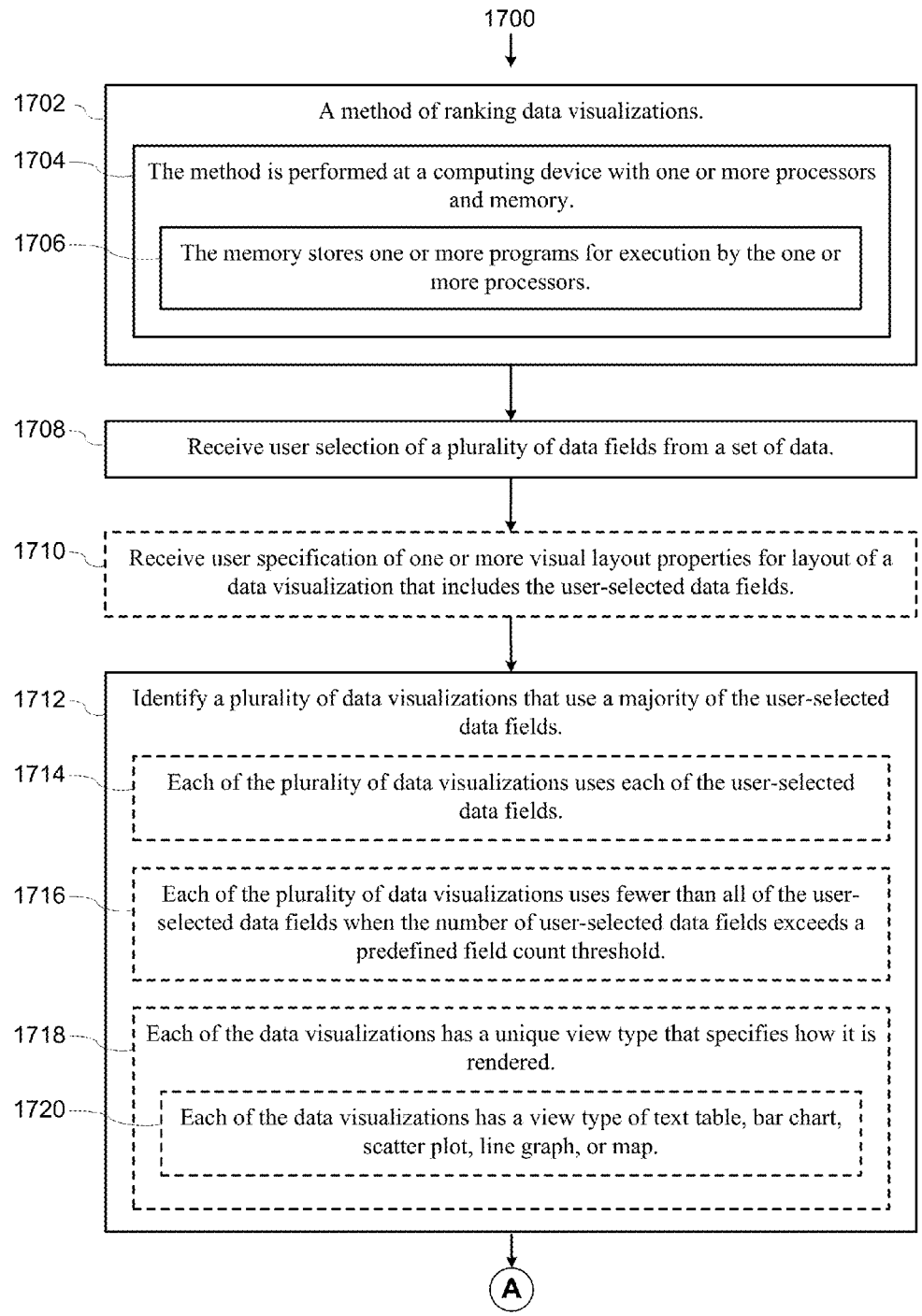
FIGS. 17A-17C provide a flowchart of a process, performed at a computing device, for generating and ranking data visualizations in accordance with some implementations.
Figure 17B:
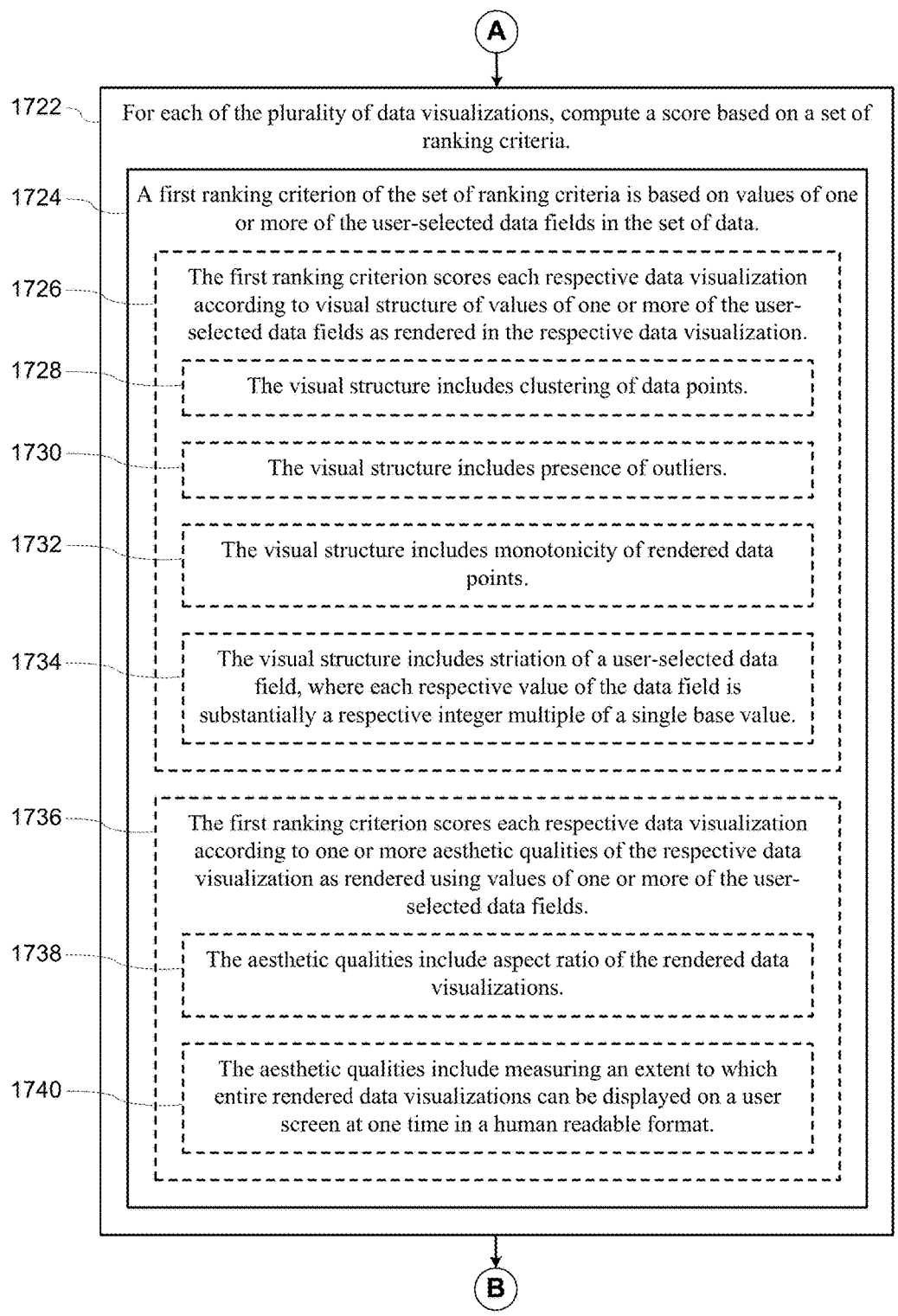
Figure 17C:
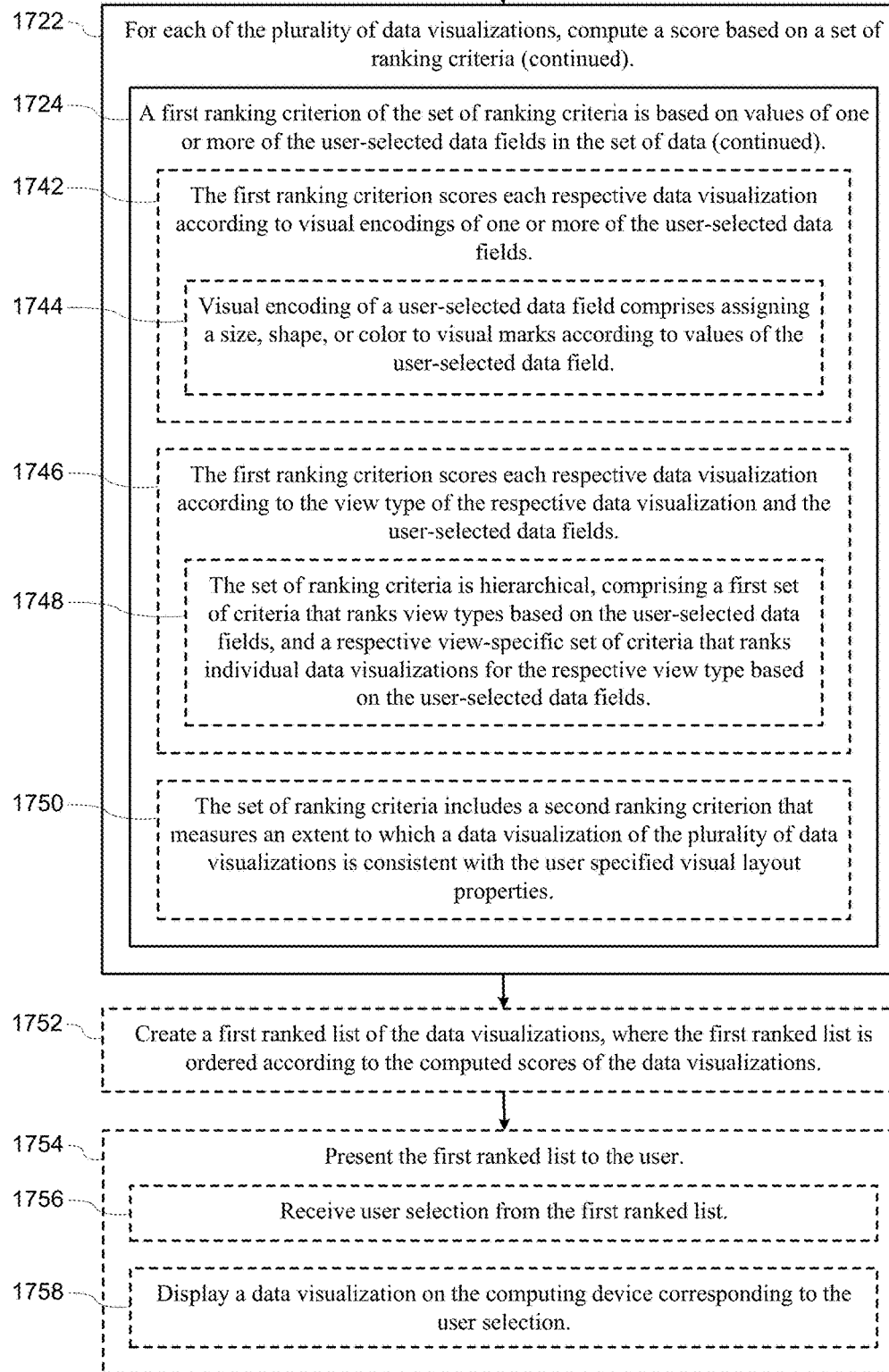
Figure 18A:
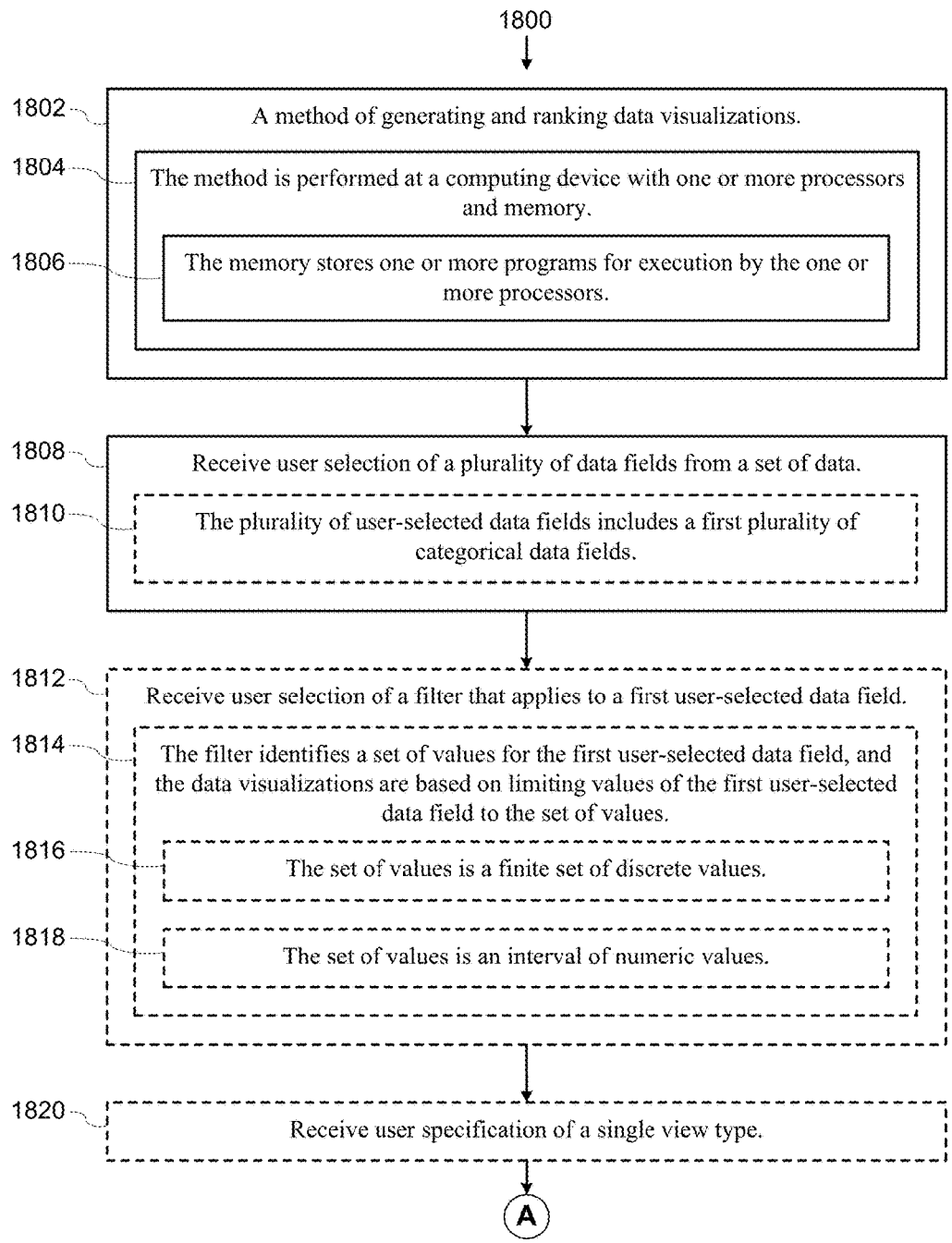
FIGS. 18A-18D provide a flowchart of another process, performed at a computing device, for generating and ranking data visualizations in accordance with some implementations. Some implementations combine the process in FIGS. 18A-18D with the process in FIGS. 17A-17C.
Figure 18B:
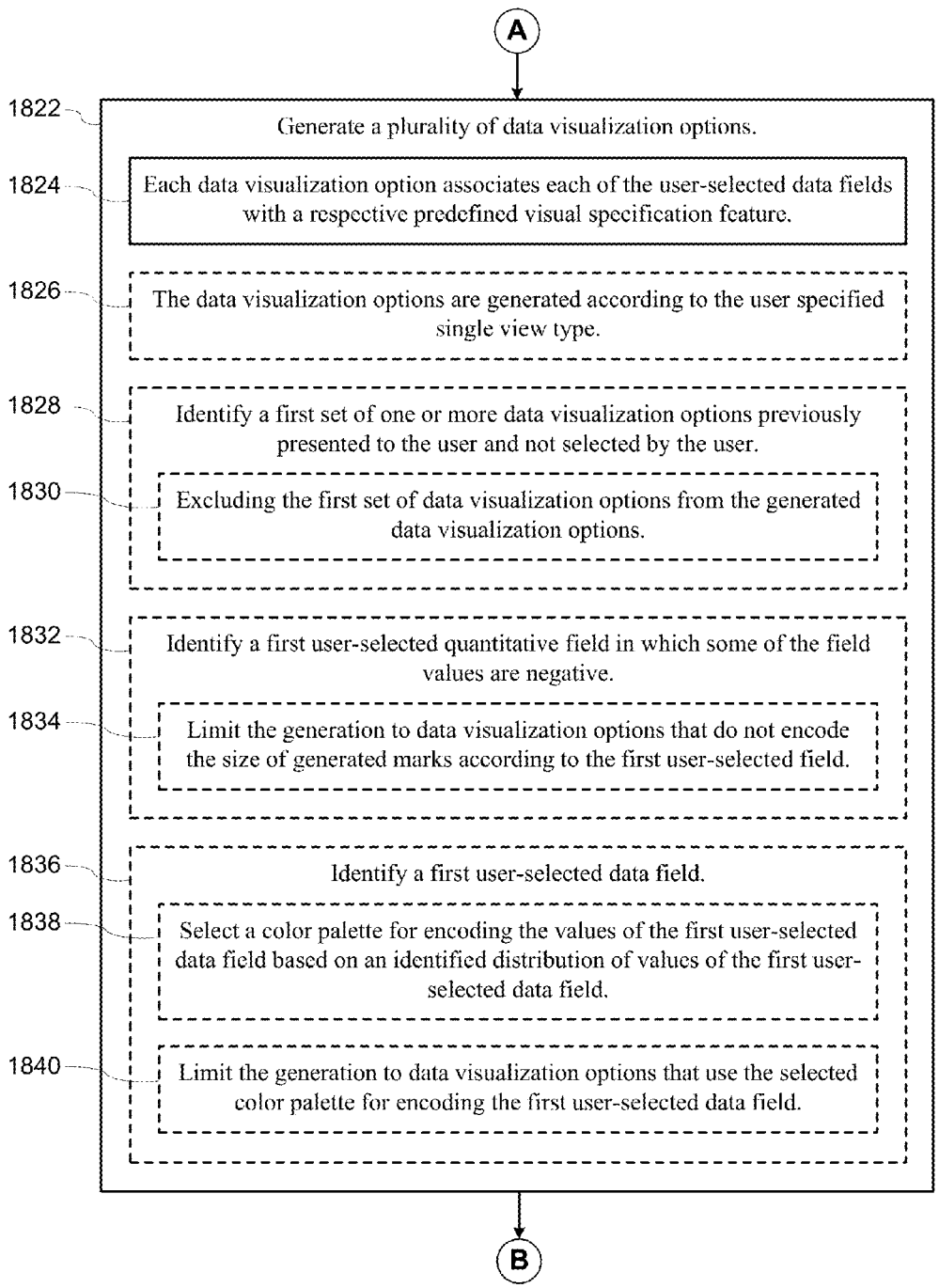
Figure 18C:
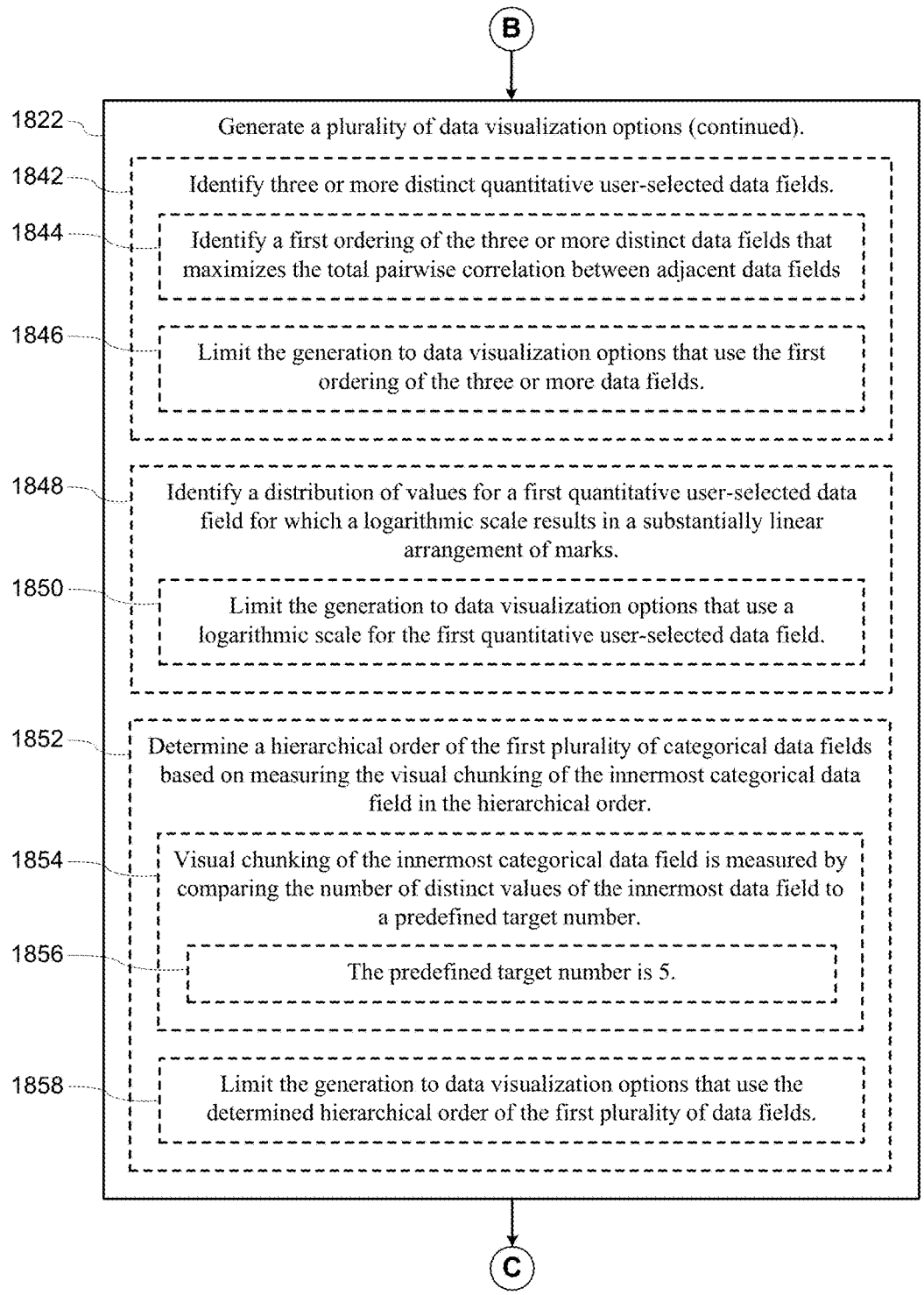
Figure 18D:
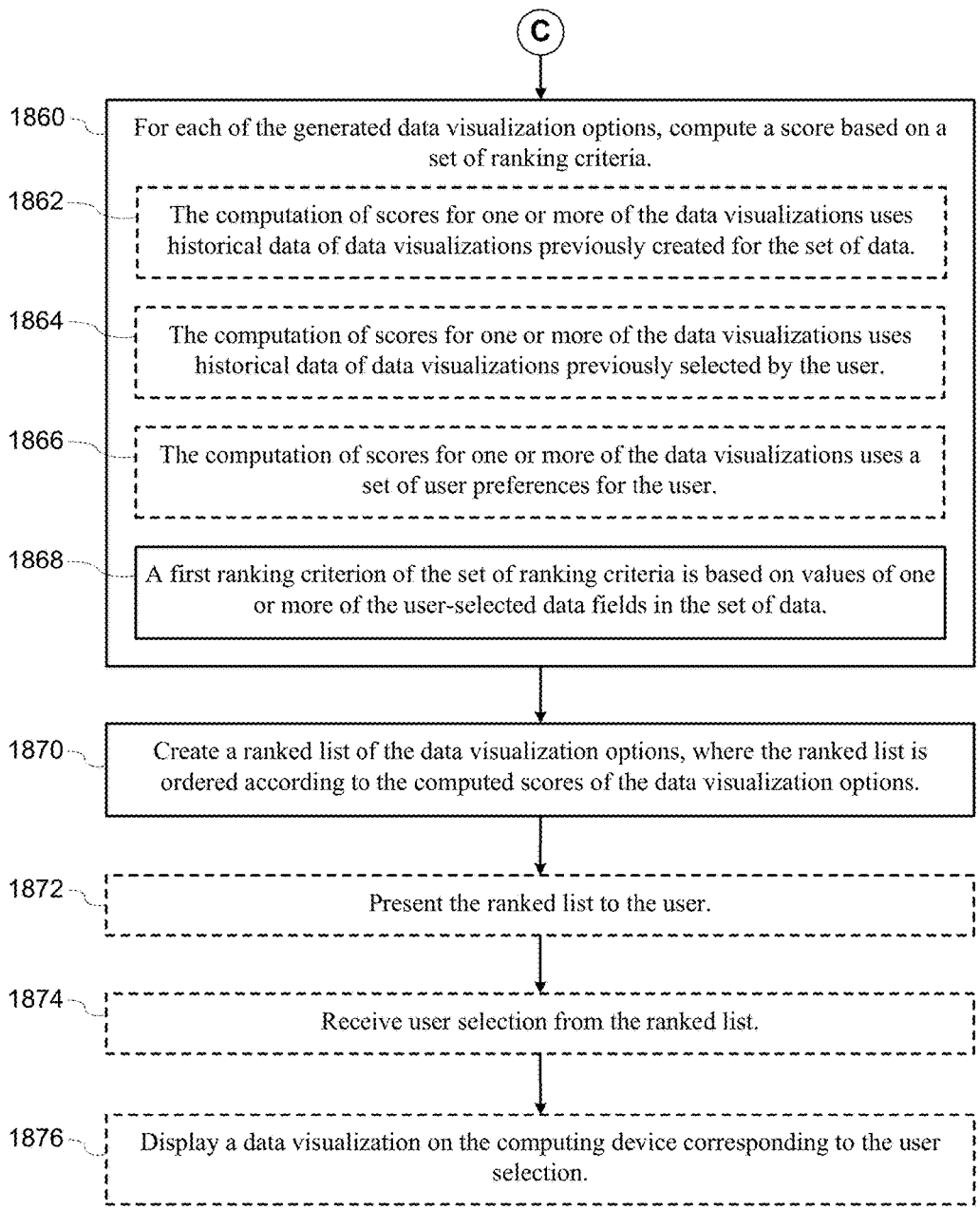
Figure 19A:
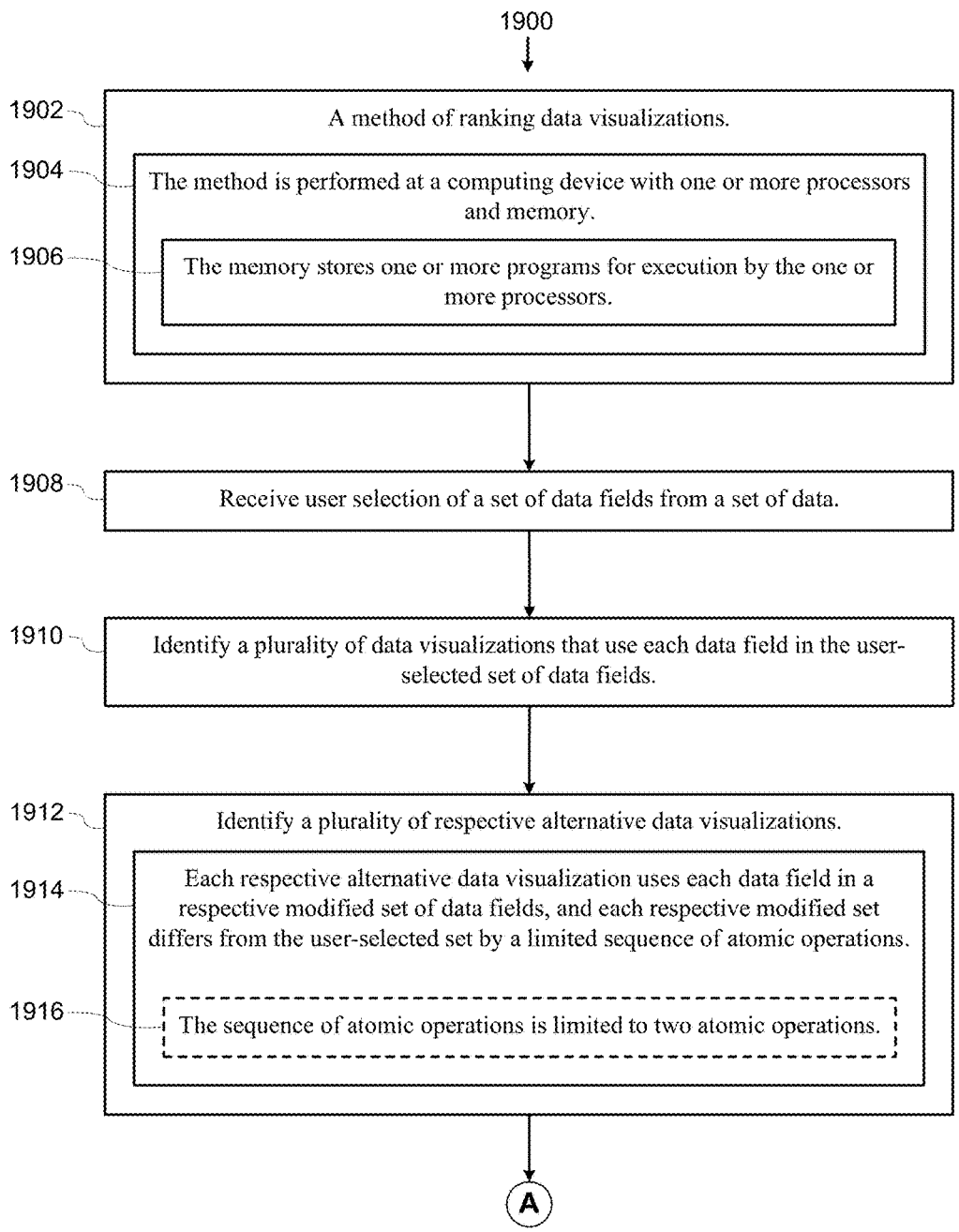
FIGS. 19A-19D provide a flowchart of another process, performed at a computing device, for generating and ranking data visualizations in accordance with some implementations. Some implementations combine the process in FIGS. 19A-19D with the processes in FIGS. 17A-17C and/or 18A-18D.
Figure 19B:
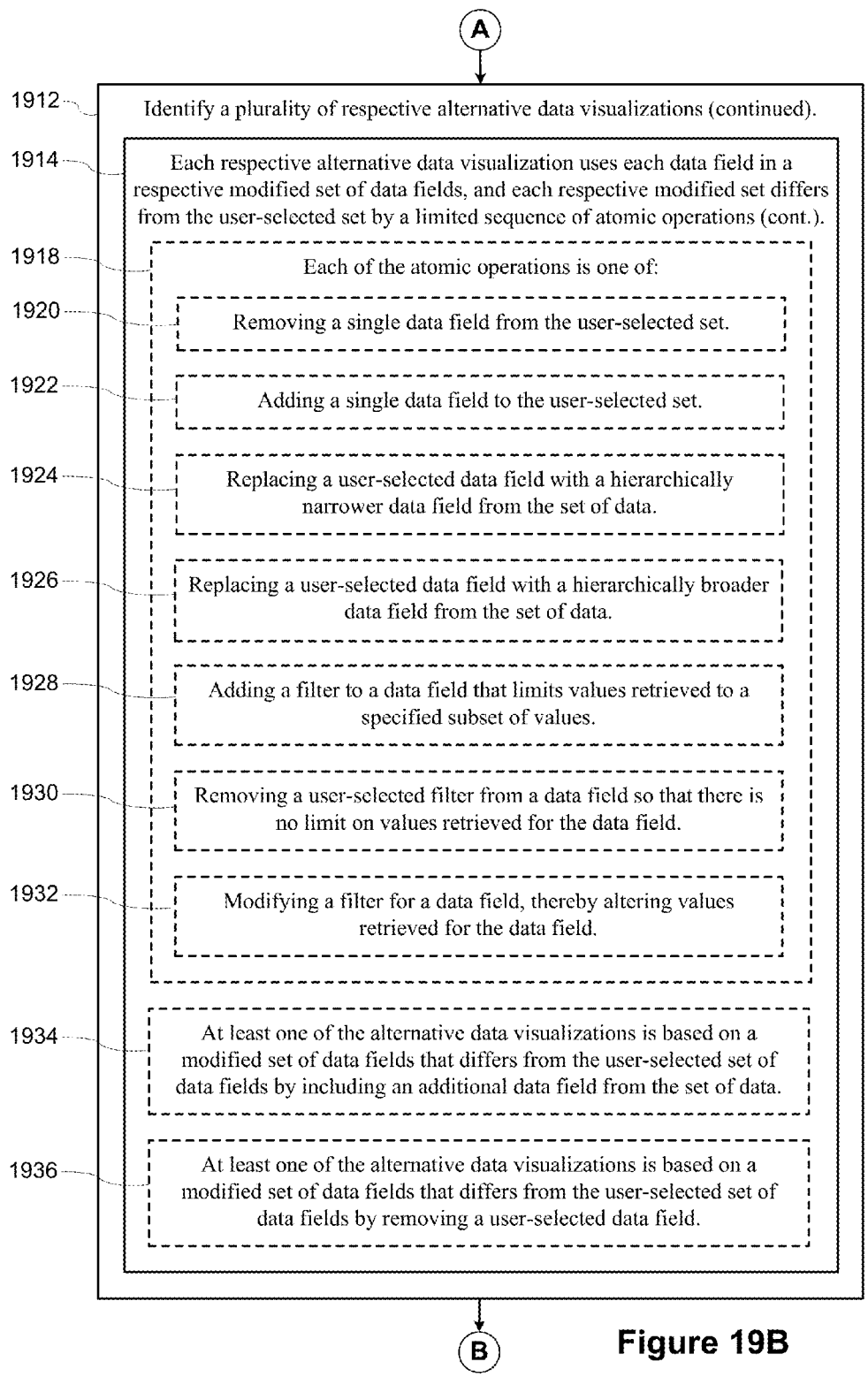
Figure 19C:
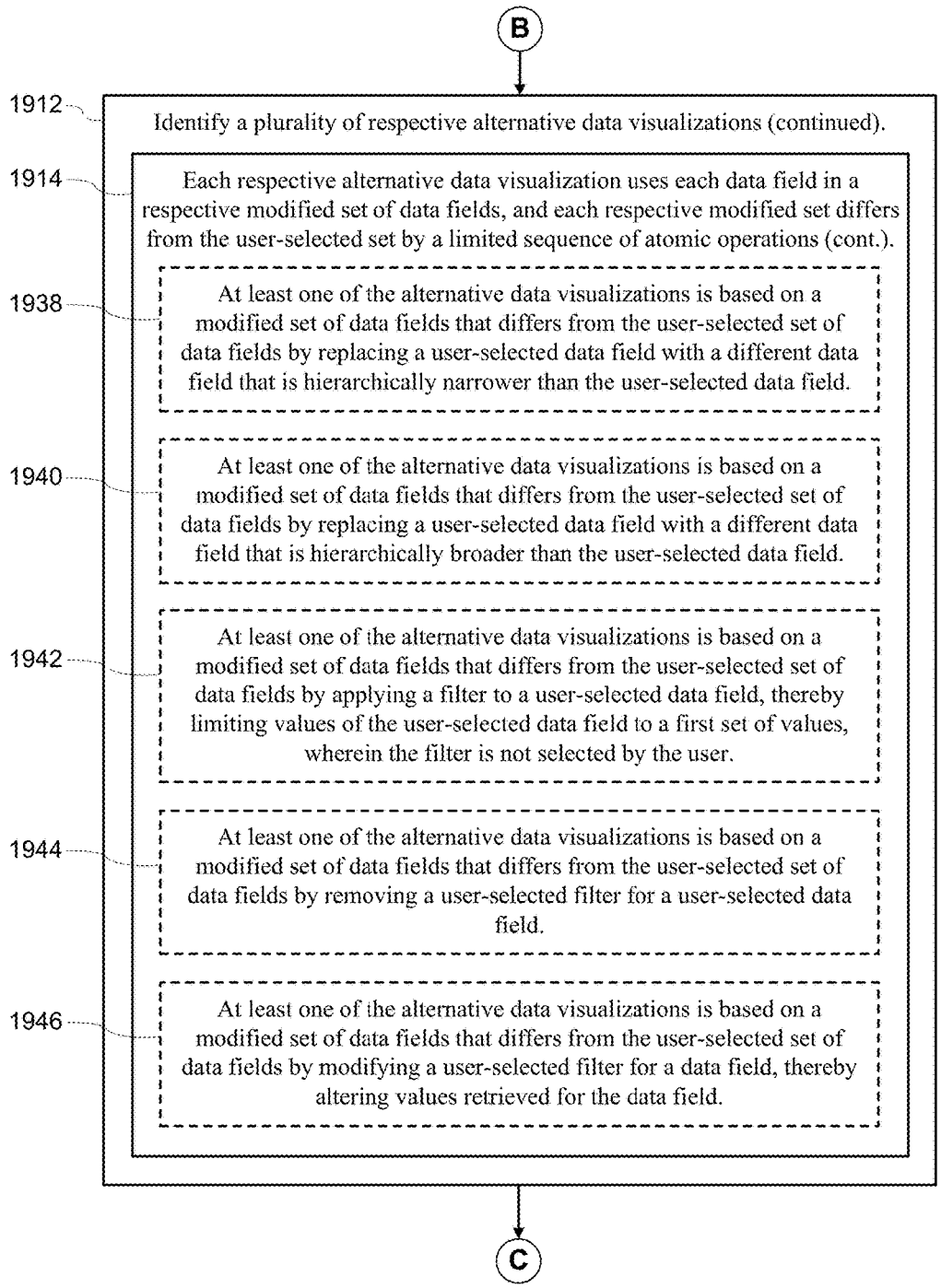
Figure 19D:
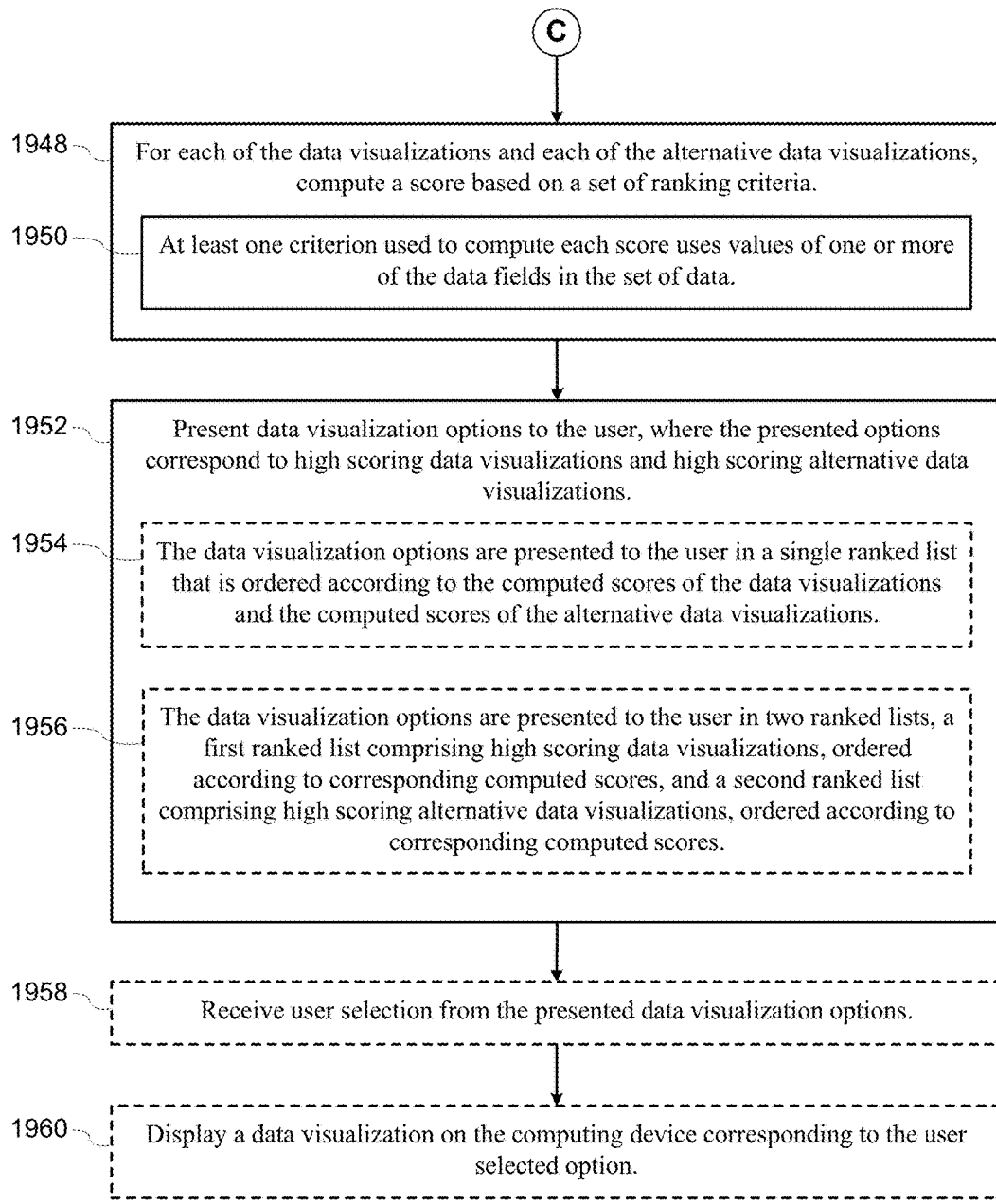

FIGS. 17A-17C provide a flowchart of a process 1700, performed (1704) at a computing device 102, for ranking data visualizations (1702) in accordance with some implementations. The computing device 102 has (1704) one or more processors and memory, and the memory stores (1706) one or more programs for execution by the one or more processors. In this flowchart, solid rectangles identify processes or elements that are generally required, whereas dashed rectangles identify processed or elements that appear in some implementations.

The user selects a plurality of data fields from a data source 236, and the computing device receives (1708) that selection. The data source 236 may be a SQL database, a spreadsheet, an XML file, a desktop database, a flat file, a CSV file, or other organized data source. Some implementations support combined or blended data sources, with data from two or more distinct sources. The data fields may be raw fields from the data source (i.e., the data field exists in the data source), may be computed from one or more raw fields (e.g., computing a month, quarter, or year from a date field in the data source), or may be calculated metrics computed based on raw data fields, such as a running total or year over year percentage growth.

In some instances, the user has already specified one or more visual layout properties, and the device 102 receives (1710) or stores (1710) the user specifications. For example, a user may have already constructed a data visualization using a set of data fields. The user may now seek alternative ways to visualize the same set of data (e.g., using an alternative type of data visualization, such as a bar graph instead of a text table). As described in more detail below, some implementations use the visual layout properties specified by the user to tailor the data visualization options that will be presented to the user.

The data visualization identification module 226 then identifies (1712) a plurality of data visualizations that use a majority of the user-selected data fields. In some instances, each of the plurality of data visualizations uses (1714) each of the user-selected data fields. Because the user has identified specific data fields for inclusion in a data visualization, options that use all of those data fields are generally preferred. However, when the user selects a large number of data fields, the complexity of evaluating all of the data visualization options increases exponentially, and the importance of each individual data field diminishes. In fact, if the number of selected fields is too large (e.g., exceeding a predefined threshold), each of the plurality of data visualizations uses (1716) fewer than all of the user-selected data fields. As illustrated in more detail below with respect to FIGS. 19A-19D, the identification module generally identifies some data visualization options that use exactly the data fields selected by the user and some data visualization options that use slightly modified sets of data fields.

In some implementations, each of the data visualizations has (1718) a unique view type that specifies how it is rendered. The "view type" is also referred to as a "chart type" or a "mark type" in some circumstances. In some implementations, the view types of the data visualizations are (1720) "text table," "bar chart," scatter plot," "line graph," or "map." Some implementations support additional view types, and/or subdivide these view types further (e.g., bar charts may be subdivided into stacked bar charts and unstacked bar charts). As described in more detail below, some implementations use the view types in the ranking process because different view types may have different ranking criteria.

For each of the plurality of data visualizations, the ranking module 226 computes (1722) a score based on a set of ranking criteria. The ranking module 226 uses the data values from the user-selected data fields in the ranking process so that the ranking is specific to the data set actually used. In particular, there may be characteristics of a specific data set that make certain data visualization options better (or worse) than would be expected based on general rules that use the data types of the selected data fields.

At least a first ranking criterion is (1724) based on values of one or more of the user-selected data fields in the set of data. In some implementations, the first ranking criterion scores (1726) each respective data visualization according to visual structure of values of one or more of the user-selected data fields as rendered in the respective data visualization. For example, in some instances, the visual structure includes (1728) clustering of data points. Specific techniques for measuring clustering in a scatter plot are described below, but generally identify circumstances in which groups of points are relatively close to each other but distant from other groups.

In some instances, the visual structure includes (1730) the presence of outliers. Some specific techniques for identifying outliers are described below. In some instances, the visual structure includes (1732) monotonicity of rendered data points. Monotonicity may appear in various view types, including scatter plots, line graphs, and bar charts. To be strictly monotone, the rendered data points must be strictly increasing, strictly decreasing, strictly non-decreasing, or strictly non-increasing (corresponding to the inequality operators >, ≥, <, and ≤). Of course the data points may not be perfectly monotone, so implementations typically measure the monotonicity (e.g., the data points strictly increasing except for one outlier).

In some instances, the visual structure includes (1734) striation of a user-selected data field. A set of data points is identified as striated when a high percentage of the respective values of a data field are (1734) substantially an integer multiple of a single base value. For example, a data field whose values are 1.02, 1.01, 2.99, 3.03, 2.00, 1.98 is striated because each of the values is approximately an integer multiple of 1. Of course the striated values do not have to be integers. For example, if the values of a data field are −2.24, −0.75, 0.51, 4.76, and 6.03, they are striated because each of these values is approximately an integer multiple of 0.25.

In some implementations, the first ranking criterion scores (1736) each respective data visualization according to one or more aesthetic qualities of the respective data visualization as rendered using values of one or more of the user-selected data fields. In some cases, the aesthetic qualities measure how well the data visualization conveys the data to the user (e.g., ease of understanding the data, ease of retaining the information, etc.). In some instances, the aesthetic qualities include (1738) the aspect ratio of the rendered data visualizations. This is described in more detail below.

In some implementations, the aesthetic qualities include (1740) measuring the extent to which entire rendered data visualizations can be displayed on a user screen at one time in a human readable format. When a data visualization is too large to fit on the screen, a user misses out on the holistic view, which makes it impossible to compare some portions of the display, and making it difficult to find all of the potentially interesting regions. In some cases the data visualization can be scaled to a smaller size so that it fits on the screen, but scaling is limited. A scaled graphic that is a blur is not particularly useful because the user would have to zoom in and zoom out in order to see the details. Displaying a data visualization in a human readable format means that a user can visualize and use the data without the use of a zoom feature in the user interface. (Even when zooming is not required, a person may still use a zoom feature to see the detail better.)

In some implementations, the first ranking criterion scores (1742) each respective data visualization according to visual encodings of one or more of the user-selected data fields. As described above with respect to FIG. 14, implementations support various visual encodings, including (1744) assigning a size, shape, or color to visual marks according to values of a user-selected data field. The visual encodings may also include path encoding, which can be used to sort the rows or columns in a data visualization. The evaluation criteria identify how effective the encodings communicate the data. Based on the range or distribution of values of a data field, certain encodings may be preferred or precluded. For example, if the range of values of a quantitative field includes negative values, size encoding is generally precluded. On the other hand, with a highly skewed distribution of quantitative values, a certain color palette may better convey the different values.

In some implementations, the first ranking criterion scores (1746) each respective data visualization according to the view type of the respective data visualization and the user-selected data fields. Different view types are better suited for display of different types of data, so the ranking process can evaluate each data visualization based on how well the view types conveys the data from the user-selected fields. For example, with two independent quantitative fields, a scatter plot is typically an appropriate data visualization. However, based on the specific data values for the data fields, a scatter plot may not be as effective as another view type.

In some implementations, the set of ranking criteria is (1748) hierarchical, comprising a first set of criteria that ranks view types based on the user-selected data fields, and a respective view-specific set of criteria that ranks individual data visualizations for the respective view type based on the user-selected data fields. These implementations take advantage of the fact that comparing (i.e., ranking) multiple data visualizations of the same view type uses different criteria from comparing data visualizations with different view types. In some implementations, the criteria for ranking data visualizations within a single view type use the field values for one or more of the data fields, whereas the criteria that compare across different view types are based on general rules about the data types of the user-selected data fields. Other implementations use the field values to evaluate across view types. Implementations typically compute a composite score for each data visualization based on many different criteria, with each ranking criterion assigned an appropriate weight. Some implementations adjust the weights of the ranking criteria over time based on which data visualizations are actually selected by the user.

In some implementations, the set of ranking criteria includes (1750) a second ranking criterion that measures the extent to which a data visualization option is consistent with the user specified visual layout properties. As noted above, the user may specify some visual layout properties before the identification module 224 or ranking module 226 even begin. Some of the visual layout properties are described above with respect to FIGS. 14 and 15. See the visual specification 1406 in FIG. 14 and visual specification 1524 in FIG. 15. When the user has specified certain visual layout properties, data visualizations that adhere to the user selections are ranked higher than other data visualization options that deviate from the user selections.

Typically, the ranking module 226 creates (1752) a ranked list of the data visualization options, where the ranked list is ordered according to the computed scores of the data visualizations. The ranked list is then presented (1754) to the user. If the user selects (1756) one of the options from the ranked list, the data visualization application 222 displays (1758) the corresponding data visualization on the computing device 102.

As illustrated in FIG. 15, some implementations store information about the ranked data visualizations, including what data fields were selected by the user, the visual specification 1524 for each of the data visualization options, as well as other intermediate data that was used to calculate each of the rankings.

FIGS. 18A-18D provide a flowchart of a process 1800, performed (1804) at a computing device 102, for generating and ranking data visualizations (1802) in accordance with some implementations. The computing device 102 has (1804) one or more processors and memory, and the memory stores (1806) one or more programs for execution by the one or more processors. In this flowchart, solid rectangles identify processes or elements that are generally required, whereas dashed rectangles identify processed or elements that appear in some implementations.

The user selects a plurality of data fields from a data source 236, and the computing device receives (1808) that selection. The data source 236 may be a SQL database, a spreadsheet, an XML file, a desktop database, a flat file, a CSV file, or other organized data source. Some implementations support combined or blended data sources, with data from two or more distinct sources. The data fields may be raw fields from the data source (i.e., the data field exists in the data source) or may be computed from one or more raw fields (e.g., computing a month, quarter, or year from a date field in the data source). In some implementations, the plurality of user-selected fields includes (1810) a plurality of categorical data fields. A "categorical" data field is a data field with a limited number of distinct values, which categorize the data. For example, a "gender" data field is a categorical data field that may be limited to the two values "Female" and "Male" or "F" and "M". The set of user-selected data fields typically includes one or more quantitative fields as well.

In some instances, the user selects (1812) a filter that applies to a first user-selected field, which is received (1812) by the data visualization application 222 or 320. A filter identifies (1814) a set of values for the first user-selected data field, and the data visualizations are based on limiting values of the first user-selected data field to the set of values. For example, a quantitative field with range 0-1000 could be filtered (i.e., limited) to the range 100-200. In this case, the set of values is (1818) an interval of numeric values. As another example, a categorical data field whose values are "N," "S," "E," and "W" could be filtered to include only rows with field value="N" or "S." In this case, the set of values is (1816) a finite set of discrete values.

In some instances, the user specifies (1820) a single view type, which is received (1820) by the data visualization application 222 or 320. In this case, the data visualization identification module 224 will limit the considered data visualizations to the single specified view type.

After the user specifies the set of data fields, the data visualization identification module 224 generates (identifies) (1822) a plurality of data visualization options. Each data visualization option associates (1824) each of the user-selected data fields with a respective predefined visual specification feature. Exemplary visual specification features are described above with respect to FIG. 14 (visual specification 1406) and FIG. 15 (visual specification 1524). When the user has selected a single view type, the data visualization options are generated (1826) according to the user-specified single view type. For example, if the user specifies "line graph" as the view type, then all of the generated data visualization options are line graphs.

In some implementations, the data visualization identification module 224 finds (1828) a first set of one or more data visualization options previously presented to the user and not selected by the user. In some of these implementations, the data visualization identification module 224 excludes (1830) the first set of data visualization options from the generated data visualization options. That is, if they were previously presented and not selected, the user may not want to see the same options again. In other implementations, previously presented data visualizations that were not selected are downgraded, but may still be presented to the user if they are identified as sufficiently good. In this case, some implementations continue to downgrade an option further when an option is presented and not selected a subsequent time.

In some instances, the data visualization identification module 224 identifies (1832) a first user-selected quantitative field in which some of the field values are negative. Such a quantitative field is generally not suitable for size encoding (unless an appropriate transformation were applied). Therefore, implementations typically limit (1834) the generation to data visualization options that do not encode the size of generated marks according to the first user-selected field.

In some instances, the data visualization identification module 224 identifies (1836) a first user-selected field that has a specific distribution of data values (e.g., uniformly distributed, skewed, bimodal, etc.), and selects (1838) a color palette for encoding the values of that data field based on the specific distribution of values for that data field. For example, a simple color gradient may be effective for a uniform distribution of data values, but might not be effective to illustrate other distributions. For a skewed or bimodal distribution of values, using visually distinct colors for different value ranges, or stepped color ranges may be more effective to convey the value distribution. Once a specific color palette has been selected based on the specific distribution of values, implementations typically limit (1840) the generation to data visualization options that use the selected color palette for encoding the first user-selected data field.

In some instances, the data visualization identification module 224 identifies (1842) three or more distinct quantitative user-selected data fields. In some data visualizations, these quantitative fields are placed adjacent to each other, as illustrated in FIGS. 16A and 16B above. As explained with respect to FIGS. 16A and 16B, some implementations identify (1844) an ordering of the three or more distinct data fields that maximizes the total pairwise correlation between adjacent data fields. When this occurs, implementations limit (1846) the generation to data visualization options that use the first ordering of the three or more data fields.

In some implementations, the data visualization identification module 224 identifies (1848) a distribution of values for a first quantitative user-selected data field for which a logarithmic scale results in a substantially linear arrangement of marks. For example, in a scatter plot with two quantitative fields, one of the fields may be approximately a polynomial function of the other data field. In this case, using a logarithmic scale on both axes would result in a set of points that is substantially linear (e.g., not more than 5% variation from a line). When this occurs, implementations typically limit (1850) the generation to data visualization options that use a logarithmic scale for the first quantitative user-selected data field.

Some implementations evaluate data visualizations based on "visual chunking." This was illustrated above with respect to FIGS. 8A and 8B. In FIG. 8A, with Loan Sector 804 as the innermost field for the rows, the chunks are fairly large, as indicated by the grouping 806. However, by switching to Loan Status 820 as the innermost field in FIG. 8B, each of the chunks has four or five elements, as illustrated by the groupings 822, 824, 826, and 828. FIG. 8B illustrates better visual chunking, and is thus preferred.

Some implementations identify data visualizations with better visual chunking by determining (1852) a hierarchical order of the first plurality of categorical data fields based on measuring the visual chunking of the innermost categorical data field in the hierarchical order. In particular, visual chunking of the innermost categorical data field is measured (1854) by comparing the number of distinct values of the innermost data field to a predefined target number. In some implementations, the target number is 5. When a specific hierarchical order of the categorical fields has been identified, implementations typically limit (1858) the generation to data visualization options that use the determined hierarchical order of the first plurality of data fields.

After the set of data visualizations has been identified, the ranking module 226 compute (1860) a score for each of the generated data visualization options based on a set of ranking criteria. In some implementations, the computation of scores for one or more of the data visualizations uses (1862) historical data of data visualizations previously created for the set of data. For example, the ranking module may use data from a history log 232 and/or ranking log 234. The historical data may include visualization created for other users that use the same or similar data fields. For example, a new person in a finance department for a company can take advantage of prior work by other individuals in the department because the data visualization application 222 or 320 has stored their prior selections in the history log 232 and/or ranking log. In particular, the logs store the visual specifications 1406 and 1524, and thus future ranking (or generation) processes can upgrade the visual layout features from the visual specifications 1406 or 1524 that were previous selected by users.

In some implementations, the computation of scores for one or more of the data visualizations uses (1864) historical data of data visualizations previously selected by the user. This can include historical data for data visualizations based on different data sets or different data fields. For example, a specific user may have preferences for certain types of data visualizations (e.g., specific view types) or certain types of encodings (e.g., a preference for color encoding versus size encoding), and these preferences (as indicated by past selections) may apply across varying data sets.

In some implementations, the computation of scores for one or more of the data visualizations uses (1866) a set of user preferences for the user. As noted above, prior user selections may establish a user's preferences. In addition, some implementations allow a user to specify preferences explicitly. An explicit user preference is particularly relevant when the user's history is consistent with those preferences.

At least one of the ranking criteria is (1868) based on values of one or more of the user-selected data fields in the set of data. This was described in more detail above with respect to FIGS. 17A-17C.

The data visualization application 222 or 320 then creates (1870) a ranked list of the data visualization options, where the ranked list is ordered according to the computed scores of the data visualization options. Typically, the ranked list is presented (1872) to the user, the user selects (1872) from the ranked list, and a data visualization corresponding to the user selection is displayed (1876) on the user's computing device 102.

FIGS. 19A-19D provide a flowchart of a process 1900, performed (1904) at a computing device 102, for ranking data visualizations (1902) in accordance with some implementations. The computing device 102 has (1904) one or more processors and memory, and the memory stores (1906) one or more programs for execution by the one or more processors. In this flowchart, solid rectangles identify processes or elements that are generally required, whereas dashed rectangles identify processed or elements that appear in some implementations.

The data visualization application 222 or 320 receives (1908) user selection of a set of data fields from a set of data, and identifies (1910) a plurality of data visualizations that use each data field in the user-selected set of data fields. This has been described in some detail with respect to FIGS. 17A-17C and 18A-18D.

In addition to the data visualizations based on exactly the set of data fields selected by the user, some implementations identify (1912) a plurality of alternative data visualizations as well. Each respective alternative data visualization uses (1914) each data field in a respective modified set of data fields. The modified sets of data fields do not differ too much from the original set of data fields select by the user because the goal is to identify data visualization options that are responsive to the user's request. In particular, each respective modified set differs (1914) from the user-selected set by a limited sequence of atomic operations. In some implementations, the sequence of atomic operations is limited (1916) to two atomic operations.

In some implementations, each of the atomic operations is (1918) one of:
  removing (1920) a single data field from the user-selected set;
  adding (1922) a single data field to the user-selected set;
  replacing (1924) a user-selected field with a hierarchically narrower data field from the set of data;
  replacing (1926) a user-selected field with a hierarchically broader data field from the set of data;
  adding (1928) a filter to a data field that limits values retrieved to a specified subset of values;
  removing (1930) a user-selected filter from a data field so that there is no limit on values retrieved for the data field; or
  modifying (1932) a filter for a data field, thereby altering values retrieved for the data field.

These atomic operations were described in more detail above with respect to FIGS. 6A and 6B.

In some instances, at least one of the alternative data visualizations is (1934) based on a modified set of data fields that differs from the user-selected set of data fields by including an additional data field from the set of data. Adding an additional data field is more common when the user-selected set of data fields is small. For the modified set, the same generation and ranking techniques described above in FIGS. 17A-17C and 18A-18D apply.

In some instances, at least one of the alternative data visualizations is (1936) based on a modified set of data fields that differs from the user-selected set of data fields by removing a user-selected data field. Removing a data field is more common when the user specifies a large set of data fields. In some implementations, when the set of user-selected data fields is too large, only subsets are considered in the generation process. For the modified set, the same generation and ranking techniques described above in FIGS. 17A-17C and 18A-18D apply.

In some instances, At least one of the alternative data visualizations is (1938) based on a modified set of data fields that differs from the user-selected set of data fields by replacing a user-selected data field with a different data field that is hierarchically narrower than the user-selected data field. When using date fields, a user may have specifies using year, whereas providing data by quarter or month may be more useful. As another example, the user may have requested data for product lines, and it may be useful to break down each product line into individual products. For the modified set, the same generation and ranking techniques described above in FIGS. 17A-17C and 18A-18D apply.

In some instances, at least one of the alternative data visualizations is (1940) based on a modified set of data fields that differs from the user-selected set of data fields by replacing a user-selected data field with a different data field that is hierarchically broader than the user-selected data field. In this case, having detail at too narrow a level may present too much "noise," which may obscure other important information. Therefore, replacing a narrow field with a broader field may provide more information. For the modified set, the same generation and ranking techniques described above in FIGS. 17A-17C and 18A-18D apply.

In some cases, filters are applied to one or more data fields to limit the rows retrieved from the data source 236. In some instances, the modified set of data fields includes modifying the set of filters. In some instances, at least one of the alternative data visualizations is (1942) based on a modified set of data fields that differs from the user-selected set of data fields by applying a filter to a user-selected data field, thereby limiting values of the user-selected data field to a first set of values, wherein the filter is not selected by the user. In some instances, at least one of the alternative data visualizations is (1944) based on a modified set of data fields that differs from the user-selected set of data fields by removing a user-selected filter for a user-selected data field. In some instances, at least one of the alternative data visualizations is (1946) based on a modified set of data fields that differs from the user-selected set of data fields by modifying a user-selected filter for a data field, thereby altering values retrieved for the data field. In each of these instances, for the modified set, the same generation and ranking techniques described above in FIGS. 17A-17C and 18A-18D apply.

The ranking module 226 computes (1948) a score for each of the data visualizations and each of the alternative data visualizations based on a set of ranking criteria. Implementations typically include a ranking criterion that downgrades data visualization options based on modified sets, with the amount of downgrade related to the number of atomic operations needed to build the corresponding modified set. (Alternatively, upgrade the data visualizations that use an unmodified set.) The amount of downgrade also depends on the number of user-selected data fields and the specific operation. For example, if the user-selected set of fields is small, then an atomic operation to remove one of those user-specified data fields would be heavily downgraded, whereas an operation to add another field may have only a slight downgrade. In some instances, if the number of user-selected fields is very small, adding additional fields may not be downgraded at all, especially if the data field added is semantically related to one or more of the user-selected data fields. On the other hand, if the number of user selected fields is large, the downgrade would be small for removing one of the user-selected fields, but the downgrade would be substantial for adding another data field. When removing a data field, there is a preference for removing a field that is not semantically related to the other user-selected data fields.

For each set of data fields (the original set or a modified set), there is (1950) at least one ranking criterion that uses values of one or more fields in the set. Because the sets of data fields are different, the criteria that use data field values can be different.

After all of the data visualizations and alternative data visualizations are scored and ranked, the data visualization application 222 or 320 presents (1952) data visualization options to the user. The presented options correspond (1952) to high scoring data visualizations and high scoring alternative data visualizations. In general, only a small subset of the options is presented. In some implementations, the user interface includes a button or other object to see more options.

In some implementations, the data visualization options are presented (1954) to the user in a single ranked list that is ordered according to the computed scores of the data visualizations and the computed scores of the alternative data visualizations. In this case, all of the options are presented together, regardless of whether they are based on the original list of data fields selected by the user or a modified list of data fields. In some implementations, when all of the data visualization options are presented together, there is a visual indicator on the list so that the user knows whether each option is based on the original set of data fields or a modified set of data fields.

In some implementations, the data visualization options are presented (1956) to the user in two ranked lists. The first ranked list includes (1956) high scoring data visualizations, ordered according to corresponding computed scores. The second ranked list includes (1956) high scoring alternative data visualizations, ordered according to corresponding computed scores.

Typically, the user selects (1958) one of the presented data visualization options, and the data visualization application displays the corresponding data visualization on the computing device 102.

In some implementations, the generated list of options remains available to the user (e.g., though a menu or toolbar icon). In that way, if the user selects a first data visualization option and wants to evaluate another option, the user can go directly to the list rather than going through another generating/ranking process. In some implementations, the ranking log 234 includes all of the information needed to build each of the ranked data visualizations, and thus the list of ranked data visualizations can be redisplayed quickly without a generation or ranking process. In some implementations, a user can select an older ranked list (e.g, go back to a ranked list from last week).

Some implementations use available resources to pre-create ranked lists of data visualization options based on data fields a user is currently using (e.g., if the set of data fields in use has not been modified for a predefined amount of time, generate a set of data visualization options based on that set of data fields). This can be useful to provide a rapid response if a user does ask for data visualization options. In some implementations, pre-creating data visualization options use more complex generation or ranking algorithms because there is not a requirement respond quickly.

In some implementations, the scoring calculation for each identified data visualization has three components: a DataScore $S_D$, which is based on how well the data visualization displays statistical properties of the data fields; a LayoutScore $S_L$, which is based on the aesthetic qualities of the data visualization; and a SimilarityScore $S_S$, which is based on how closely the data visualization aligns with user selections. The SimilarityScore does not depend on the view type, but the DataScore and LayoutScore do depend on the view type. The total score T is then computed based on one or more of these three scores. In some implementations, the total score is $T=w_D S_D + w_L S_L + w_S S_S$, where the values $w_D$, $w_L$, and $w_S$ are the weights for each of the three partial scores. Typically $w_D > w_L > w_S$.

The weights are determined empirically based on actual selection by users. For example, in some implementations, a history log 232 STORES details about the data visualization options that are presented to the user, including the partial scores that were used in the ranking. The log also stores which data visualizations the user selects. Using this data, weights can be selected to produce rankings that align as close as possible with the user selections. For example, some implementations use an iterative process that adjusts the weights by small amounts in each step. Some implementations define a function F that is a function of the three weights, where F measures the differences between the computed rankings and the ranking as identified by the user. In each iteration, the process estimates the partial derivatives with respect to the weights, and adjusts the weights accordingly to optimize the function F (i.e., find weights where F is a minimum).

In some implementations, the SimilarityScore $S_S$ is just the number of matched data fields divided by the total number of selected data fields. A matched data field is one where the usage of the data field in the identified data visualization is the same as the usage already selected by the user. For example, if the user has specified field F1 for color encoding, then there is a match when an identified data visualization uses the Field F1 for color encoding. A "perfect" score of 1.0 occurs when the user has specified the usage (e.g., encoding) for all of the selected data fields, and the identified data visualization uses all of the fields in that same way. Note that the SimilarityScore $S_S$ does not incorporate the view type of the data visualization, and it is possible to have multiple view types use the selected data fields in the same way. For example, a user may have constructed a bar graph to visualize certain data, but later wonders if there are alternative better ways to visualize the data. Other view types that preserve the user's selections are preferred, and the preference is accomplished by the SimilarityScore $S_S$.

As noted above, the DataScore and LayoutScore depend on the view type. In some implementations, the scores are computed as illustrated below.

Text Tables

In some implementations, the ordering of categorical data fields is evaluated to favor placing a category with cardinality close to five as the innermost level of the chart. This leverages the fact that people are better able to retain and compare chunks of five (±2) data elements. One way to quantify this criterion computes:

VisualChunking=1−abs(Cardinality(innermostDimension)−5)/5

In addition, some implementations prefer text tables that are densely filled, which avoids the distraction of sparsely populated cells. One way to quantify this criterion computes:

Sparsity=(number of empty cells)/(total number of cells in the table)

Some implementations combine these two criteria by subtracting, because effective text tables typically have low Sparsity. That is:

DataScore=VisualChunking−Sparsity

Aesthetically, some implementations prefer tables that display completely on the screen. One way to quantify this is whether there are scrollbars in the view. Some implementations differentiate between vertical scroll bars and horizontal scroll bars. In addition, some implementations prefer a table whose visible area has a vertical aspect ratio (i.e., height/width>1.0). In some implementations, the LayoutScore is computed as:

```
if (horizontal scroll bar and vertical scroll bar)
    ScrollPenalty = Value₁
else if (horizontal scroll bar only)
    ScrollPenalty = Value₂
else if (vertical scroll bar only)
    ScrollPenalty = Value₃
else
    ScrollPenalty = 0.00
end if
LayoutScore = AspectRatio − ScrollPenalty
```

Bar Charts

In some implementations, bar charts (also known as bar graphs) share some of the same criteria used by text tables. The ordering of categories is evaluated to favor placing a category with cardinality close to five as the innermost level of the chart. As with text tables, some implementations compute this as:

VisualChunking=1−abs(Cardinality(innermostDimension)−5)/5

In some implementations, the DataScore for a bar chart is based on just this criterion, so DataScore=VisualChunking.

Similar to text tables, bar charts that fit completely within the display score more highly. When scroll bars are necessary to display the data, scroll bars that are perpendicular to the bars in the chart are preferable (e.g., vertical scroll bars when the bars in the chart are horizontal). Even when there are no scroll bars, the preferred aspect ratio depends on the orientation of the bars in the chart. Specifically, a vertical aspect ratio is better with horizontal bars and a horizontal aspect ratio is better with vertical bars. In some implementations, the LayoutScore for a bar graph is computed as:

```
if (horizontal scroll bar and vertical scroll bar)
    ScrollPenalty = Value₁
else if (horizontal bars in chart and vertical scroll bar)
    ScrollPenalty = Value₂
else if (horizontal bars in chart and horizontal scroll bar)
    ScrollPenalty = Value₃
else if (vertical bars in chart and vertical scroll bar)
    ScrollPenalty = Value₄
else if (vertical bars in chart and horizontal scroll bar)
    ScrollPenalty = Value₅
else
    ScrollPenalty = 0.00
end if
if (vertical bars in chart)
    LayoutScore = ( 1 / AspectRatio ) − ScrollPenalty
else
    LayoutScore = AspectRatio − ScrollPenalty
end if
```

In some implementations, the lengths of the bars in a bar chart are always scaled by the size of the display, so it would not be possible to have scroll bars in the same orientation as the bars in the chart.

Scatter Plots

A primary objective of a scatter plot is to identify interesting properties of the data based on visual patterns or shapes in the display. These patterns and shapes include clumps (clusters), monotonicity (positive or negative correlation), striation (presence of a discrete or integer variable), and outliers. Some implementations partition the underlying data into multiple panes and compute a score for each visible scatter plot chart. The scores for each pane are combined (e.g., by summing) for an overall score. In some implementations, a monotonicity score uses Pearson correlation computed over all of the points in the data set. In some implementations, scores for striation, dumpiness, and outliers are computed using a minimum spanning tree over the set of points in the data set. Some implementations use Prim's algorithm to construct the minimum spanning tree.

Some implementations use the following formula to compute Pearson's Correlation for a scatter plot:

$$PearsonsCorrelation = r_{xy} = \frac{\sum_{i=1}^{n}(x_i - \bar{x})(y_i - \bar{y})}{(n-1)s_x s_y}$$

where $\bar{x}$ is the mean of x, $\bar{y}$ is the mean of y, $s_x$ is the sample standard deviation of x, and $s_y$ is the sample standard deviation of y.

In some implementations, the measure of dumpiness uses the formula:

$$ClumpyMeasure = \max_j \left[1 - \max_k \left(\frac{\text{length}(k)}{\text{length}(j)}\right)\right]$$

where j ranges over the set of edges in the constructed minimum spanning tree and k ranges over edges in each runt set derived from the edge j. For an edge j, the runt sets are formed by removing all edges from the minimum spanning tree that have a length at least as large as the length of edge j. The edge j has two endpoints, and each of the runt sets consists of the remaining edges that are connected to one of those endpoints. Because the larger edges are removed, length(k)<length(j) for each edge k in the runt sets.

In some implementations, striation of a scatter plot is measured as:

$$StriationMeasure = \frac{1}{\|T_2\|} \sum_{v \in T_2} |\cos(\theta_v)|$$

where $T_2$ is the set of all vertices of degree 2 in a minimal spanning tree T, $\|T_2\|$ is the cardinality of $T_2$, and $\theta_v$ is the angle formed at the vertex v using the other two vertices connected to the vertex v. In particular, when a scatter plot is heavily striated, the minimal spanning tree typically includes many points that are collinear, and thus the angles $\theta_v$ are frequently 0 degrees or 180 degrees, in which case $|\cos(\theta_v)|=1$.

Some implementations use a minimum spanning tree to calculate a measure of outliers in a scatter plot as well. Within a minimum spanning tree, let $q_{25}$ be the length of an edge in the minimum spanning tree at the 25th percentile and $q_{75}$ be the length of an edge in the minimum spanning tree at the 75th percentile. Then, let $\omega=q_{75}+1.5(q_{75}-q_{25})$. In some implementations, a point in a scatter plot is considered an outlier when it has degree 1 in the minimum spanning tree and the length of the one edge from the point is greater than $\omega$. Some implementations count the number of outliers, typically computed relative to the total number of points in the scatter plot, and weighted appropriately. For example, in some implementations, the outliers are measured as:

$$OutlyingMeasure = a \cdot \frac{\text{(number of outliers)}}{\text{(total number of points)}}$$

where a is a scaling factor.

Some implementations compute a measure of outliers as the ratio of the edge length from outliers to the total edge length. Specifically:

$$OutlyingMeasure = \frac{\text{length}(T_{outliers})}{\text{length}(T)}$$

where $T_{outliers}$ is the set of edges connecting outliers to the rest of the minimum spanning tree.

Some implementations use alternative formulas for the various features that may be present in a scatter plot, and some implementations account for additional features such as shape (e.g., convex, skinny, stringy, or straight), trend (e.g., monotonic), density (e.g., skewed or clumpy), or coherence. Some of these implementations use formulas or methods described in "Graph-Theoretic Scagnostics," L. Wilkinson et al., Proceedings of the IEEE Information Visualization 2005, pages 157-164, which is incorporated by reference herein in its entirety. Some implementations combine the individual feature measures as: DataScore=3·abs(PearsonsCorrelation)+2·ClumpyMeasure+StriationMeasure+OutlyingMeasure.

Aesthetically, scatter plots that fit completely on the screen are preferred. In addition, an overall square display is preferred (i.e., aspect ratio of 1). In some implementations, a LayoutScore is computed as:

```
if (scroll bars)
    ScrollPenalty = Value₁
else
    ScrollPenalty = 0.00
end if
if (AspectRatio > 1)
    LayoutScore = − ScrollPenalty − (AspectRatio − 1)
else
    LayoutScore = − ScrollPenalty − ((1 / AspectRatio) − 1)
end if
```

Note that in this example, the best possible layout score is zero.

Line Charts

Some implementations use simple measures of variability and overplotting in order to compute a DataScore for line charts. In some cases, using more complex formulas would be too time consuming. In some circumstances, line charts with high variability (e.g., spikes and troughs) are preferred (e.g., more interesting). However, in other circumstances, variability is disfavored. In some implementations, users may establish a line graph variability preference, or a variability preference may be inferred for specific data sets or data fields based on prior usage.

Some implementations measure variability of a line graph by forming a straight line through the first and last point in sequence (typically time), then summing up the differences between each intermediate point and the straight line. Some implementations use a partitioned result set to evaluate each visible line chart and the variability scores for all the panes are added to compute an overall score. Some implementation use linear regression to fit the best line for each pane, then compare trends and variability based on those lines.

Some implementations compute an "overplotting" score, which penalizes data visualizations that include too many lines. In some implementations, the penalty is the excess over a specified threshold, such as five or ten. In some implementations, the penalty is the cardinality of the data field dimension that breaks up the view. Some implementations compute a more precise score using an image space histogram (e.g., using 2D binning of the image space).

Some implementations compute a VariabilityScore as:

$$VariabilityScore = \sum_{1}^{n-1} |y_i - (mx_i + b)|$$

where $m=(y_n-y_0)/(x_n-x_0)$ is the slope of the line between the first and last points on the line chart, and $b=y_0-mx_0$ is the y-intercept of the line. Some implementations use other methods, such as linear regression, to identify the best line, then compute the variability score as above, but using all of the points on the line chart (including the first and last points).

As noted above, implementations use various formulas to compute an OverplottingScore. In some implementations, the OverplottingScore is just the total number of lines on the line chart, or the excess over a threshold number. Some implementations then combine these two scores using DataScore=VariabilityScore−OverplottingScore.

Like other view types, line charts that can be built completely on the screen are preferred. In addition, a vertical aspect ratio is preferable for line charts. In some implementations, a LayoutScore is computed as:

```
if (scroll bars)
    ScrollPenalty = Value₁
else
    ScrollPenalty = 0.00
end if
LayoutScore = AspectRatio − ScrollPenalty
```

Maps

Some implementations generate small multiples of filled maps as well as pie charts on maps. While both methods reveal structure in the data for different analytical tasks, filled maps are generally more effective than pie-maps when there is no prior knowledge of the user's task. Established preferences or historical information for the data fields selected can alter the default scoring. As usual, maps that fit on the screen and vertical aspect ratios are preferred. Some implementations compute the LayoutScore as:

```
if (scroll bars)
    ScrollPenalty = Value₁
else
    ScrollPenalty = 0.00
end if
LayoutScore = AspectRatio − ScrollPenalty
```

In some implementations, all computations to evaluate the views (e.g., to compute a DataScore and a LayoutScore) are done on the result set. That is, data values for the selected data fields are queried from the data source and no additional queries are used. Both the generation phase and the ranking phase require some computations on items in the result set. Some computations in the ranking phase may require a partitioned data set. Ordering of categories breaking down the view creates different sets of data points in each pane, which can produce data visualizations that are ranked differently (see, e.g., FIGS. 8A and 8B above).

In some implementations, the generation phase uses different builder or culling procedures for each of the different view types. For example, bar charts have different features than scatter plots. In some implementations, the generation phase uses simple techniques, such as changing the hierarchy of data fields used to specify the X-positions and Y-positions of graphical marks in potential data visualizations. For example, as illustrated above in FIGS. 8A and 8B, the selection of the innermost data field can make a cognitive difference for users.

In the generation phase, some implementations evaluate data visualization options that use small multiples (e.g., splitting the display into multiple panes, where each pane includes an appropriate subset of data). The small multiples are created by including additional data fields (e.g., categorical dimensions) in the definition of the X-positions and/or Y-positions.

For efficiency in the generation phase, some implementations perform certain common calculations first. For example, implementations typically compute the range of each measure (e.g., a quantitative data field) to determine whether it straddles zero. If so, the measure is inappropriate for encoding size. Implementations typically compute the spread of each measure to determine how the spread can be optimized visually on a display. For example, size encodings typically start the scale at zero. If the smallest value of a data field is too far from zero (relative to the spread of the variable), then the size variations would not be highly visible to the user. In that case, using a color encoding could be more effective because a full color spectrum can be aligned with the range of values of the data field.

Some implementations evaluate the distribution of values for each selected data field (e.g., skewed versus uniform) to determine best encodings. For example, some implementations select a color palette that is appropriate for the distribution (e.g., a simple linear color palette for a uniform distribution, but a sequence of stepped colors to emphasize the divergent values in a skewed distribution). Evaluating the distribution of values is also useful in scatter plots and maps when measures are encoded as the size of the marks. For example, encoding the size based on the log of the data values may be more appropriate when the values are growing exponentially or according to a polynomial power curve.

Some implementations order measures so that the overall correlation, including the correlation between adjacent pairs of data fields, is maximized. The ordering of data fields is particularly useful for text tables and bar charts, as illustrated above in FIGS. 16A and 16B.

Some implementations evaluate the order of rows or columns based on the values of a data field, and sort them accordingly (e.g., if the bars in a bar graph represent sales for each region, the bars may be ordered from least sales to greatest sales). In some implementations, when small multiples appear in separate panes, the panes may be ordered as well in order to better illustrate some characteristic of the data.

To limit the large number of potential data visualizations, some implementations track which data visualizations have been previously identified and thus prevent repetition. Some implementations use a ranking log 234, either by itself, or in conjunction with a data visualization history log 232, which were described above with respect to FIGS. 14 and 15. In some implementations, this prevents duplication within a single generation phase. In other implementations, some or all of the generated options are tracked so that they are omitted (or downgraded) in a later generation phase.

In some instances, a user has already constructed a data visualization based on a set of data, and has already selected how that data is used (e.g., what data fields specify X-positions and Y-positions of graphical marks, what data fields are used for color or size encoding, etc.). The user may then seek alternative visualizations of the same data, potentially with a different view type. In this situation, implementations typically track what the user previously selected and give greater weight to data visualization options that preserve as many of the user selections as possible. For example, if the user previously selected a certain data field for color encoding, then preserving that color encoding is preferred.

As noted above, some scoring aspects are shared across different view types. For example, preferences for fitting an entire data visualization on the screen and a vertical aspect ratio are commonly used. Computing these shared aspects at the outset increases efficiency by avoiding duplicate calculations. In addition, some of the view types prefer visual chunks that have cardinality near five, such as in tables and bar charts. Shared functionality is typically implemented in functions, procedures, or methods that can be used by the ranking functions for each view type.

Some ranking criteria require partitioning of the underlying data. For example, some implementations use partitioning to evaluate the "shape" of the data. In some implementations, data in each pane of a scatter plot view is used to compute the correlation, dumpiness, striation, and number of outliers, and combines the scores. Some implementations also partition the data to evaluate the variability of the data in a line chart. In each pane of a line chart, the ranking process computes the deviation from a simple linear fit.

Some implementations incorporate various mechanisms to ensure that the generation and ranking phases remain responsive even for very large data sets. Some implementations limit the full generation and ranking process to cases where there is a relatively small set of selected data fields (e.g., not exceeding a predefined threshold number of fields). When the selected number of data fields exceeds that threshold, some implementations display an informational message to the user. In some implementations, when there are too many fields, various subsets are selected and data visualizations are generated for those subsets. As noted earlier, subsets are typically selected based on semantic relatedness of the data fields in the subset. In some implementations, user preferences or historical selections of data visualizations are used to guide a more limited generation process. Some implementations use data visualization options that have been previously generated and ranked, even if not previously presented or selected. Some implementations set a time limit on how quickly the ranked list must be provided to the user, and present the list at that time based on whatever options have been evaluated. When a time limit is imposed, some implementations generate the options based on heuristics of what views are most likely to be the best and/or most likely to be selected by the user. That is, the more likely options are generated and evaluated first.

Because aggregated values from a result set depend on the level of detail of the user selected fields, implementations typically cannot precompute correlation or other scores on the raw data.

Some implementations provide multiple alternative views for a single view type. In some implementations, the alternative views are essentially subtypes of a basic view type, such as normal bars, stacked bars, and clustered bars within the bar graph view type.

Some implementations enable a user to select a single view type, and generate data visualization options within that one view type. In some implementations, the selected view type includes two or more subtypes. In some implementations, the user is presented with a palette of view type options and can select the desired view types (or all). In some implementations, a user may select specific subtypes as well (e.g., only bar charts that are stacked).

Some implementations expand or build on techniques described in U.S. Pat. No. 8,099,674, entitled "Computer Systems and Methods for Automatically Viewing Multidimensional Databases," which has been incorporated herein by reference in its entirety. Some implementations expand or build on techniques described in U.S. patent application Ser. No. 12/214,818, entitled "Methods and Systems of Automatically Generating Marks in a Graphical View," which has also been incorporated herein by reference in its entirety. Some implementations expand or build on techniques described in "Show Me: Automatic Presentation for Visual Analysis," Mackinlay, Jock, et al., IEEE Transactions on Visualization and Computer Graphics, Vol. 13, No. 6, November/December 2007, which is incorporated herein by reference in its entirety.

The terminology used in the description of the invention herein is for the purpose of describing particular implementations only and is not intended to be limiting of the invention. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description has focused on certain view types, but the same or similar techniques can be applied to many other view types as well, including highlight tables, heat maps, area charts, circle plots, treemaps, pie charts, bubble charts, Gantt charts, box plots, and bullet graphs.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of ranking data visualizations, comprising:
at a computing device having one or more processors and memory, wherein the memory stores one or more programs for execution by the one or more processors:
receiving user selection of a plurality of data fields from a set of data;
identifying a plurality of data visualizations that use a majority of the plurality of user-selected data fields;
for each of the plurality of data visualizations, computing a total score comprising a weighted sum of a respective plurality of scores determined using a set of scoring functions, wherein a first score of the respective plurality of scores is determined using a first scoring function of the set of scoring functions, which scores each data visualization based on statistical properties of a plurality of data values stored in one or more of the plurality of user-selected data fields in the set of data; and
creating a first ranked list of the plurality of data visualizations, wherein the first ranked list is ordered according to the computed total scores of the plurality of data visualizations.

2. The method of claim 1, wherein having the first scoring function of the set of scoring functions score each data visualization based on statistical properties of the plurality of data values stored in one or more of the plurality of user-selected data fields includes the first scoring function scoring each respective data visualization according to visual structure of the plurality of data values stored in one or more of the plurality of user-selected data fields as rendered in the respective data visualization.

3. The method of claim 2, wherein visual structure includes clustering of data points.

4. The method of claim 2, wherein visual structure includes presence of outliers.

5. The method of claim 2, wherein visual structure includes monotonicity of rendered data points.

6. The method of claim 2, wherein visual structure includes striation of a user-selected data field, wherein each respective data value stored in the user-selected data field is substantially a respective integer multiple of a single base value.

7. The method of claim 1, wherein a second scoring function of the set of scoring functions scores each respective data visualization according to one or more aesthetic qualities of the respective data visualization as rendered using the plurality of data values stored in one or more of the plurality of user-selected data fields.

8. The method of claim 7, wherein the aesthetic qualities include aspect ratio of the rendered data visualizations.

9. The method of claim 7, wherein the aesthetic qualities include measuring an extent to which entire rendered data visualizations can be displayed on a user screen at one time in a human readable format.

10. The method of claim 7, wherein a third scoring function of the set of scoring functions scores each respective data visualization based on an extent to which the respective data visualization aligns with user selections.

11. The method of claim 1, wherein the first scoring function of the set of scoring functions further scores each respective data visualization according to visual encodings of the plurality of data values stored in one or more of the plurality of user-selected data fields.

12. The method of claim 11, wherein visual encoding of a user-selected data field comprises assigning a size, shape, or color to visual marks according to the plurality of data values stored in the user-selected data field.

13. The method of claim 1, wherein each of the data visualizations has a unique respective view type that specifies how it is rendered.

14. The method of claim 13, wherein each of the data visualizations has a view type selected from the group consisting of text table, bar chart, scatter plot, line graph, and map.

15. The method of claim 13, wherein the set of scoring functions includes a second scoring function, and the second scoring function scores each respective data visualization according to the respective view type of the respective data visualization and the plurality of user-selected data fields.

16. The method of claim 13, wherein the set of scoring functions is hierarchical, comprising a first set of criteria that ranks view types based on the plurality of user-selected data fields, and a respective view-specific set of criteria that ranks individual data visualizations for the respective view type based on the plurality of user-selected data fields.

17. The method of claim 1, further comprising:
receiving user specification of one or more visual layout properties for layout of a data visualization that includes the plurality of user-selected data fields;
wherein the set of scoring functions includes a second scoring function that measures an extent to which a data visualization of the plurality of data visualizations is consistent with the user specified visual layout properties.

18. The method of claim 1, wherein each of the plurality of data visualizations uses each of the plurality of user-selected data fields.

19. The method of claim 1, wherein each of the plurality of data visualizations uses a respective subset of the plurality of user-selected data fields when the number of data fields in the plurality of user-selected data fields exceeds a predefined field count threshold, and wherein a respective number of data fields in the respective subset does not exceed the predefined field count threshold.

20. The method of claim 1, further comprising presenting the first ranked list to the user.

21. The method of claim 1, wherein having the first scoring function of the set of scoring functions score each data visualization based on statistical properties of the plurality of data values stored in one or more of the plurality of user-selected data fields includes the first scoring function scoring each respective data visualization based on a distribution of the plurality of data values stored in one or more of the plurality of user-selected data fields.

22. A computer system for ranking data visualizations, comprising:
one or more processors;
memory; and
one or more programs stored in the memory for execution by the one or more processors, the one or more programs comprising instructions for:
receiving user selection of a plurality of data fields from a set of data;
identifying a plurality of data visualizations that use a majority of the plurality of user-selected data fields;
for each of the plurality of data visualizations, computing a total score comprising a weighted sum of a respective plurality of scores determined using a set of scoring functions, wherein a first score of the respective plurality of scores is determined using a first scoring function of the set of scoring functions, which scores each data visualization based on statistical properties of a plurality of data values stored in one or more of the plurality of user-selected data fields in the set of data; and creating a first ranked list of the plurality of data visualizations, wherein the first ranked list is ordered according to the computed total scores of the plurality of data visualizations.

23. The computer system of claim 22, wherein having the first scoring function of the set of scoring functions score each data visualization based on statistical properties of the plurality of data values stored in one or more of the plurality of user-selected data fields includes the first scoring function scoring each respective data visualization according to visual structure of the plurality of data values stored in one or more of the plurality of user-selected data fields as rendered in the respective data visualization.

24. The computer system of claim 23, wherein the visual structure is selected from the group consisting of clustering of data points, presence of outliers, monotonicity of rendered data points, and striation of a user-selected data field.

25. The computer system of claim 22, wherein a second scoring function of the set of scoring functions scores each respective data visualization according to one or more aesthetic qualities of the respective data visualization as rendered using the plurality of data values stored in one or more of the plurality of user-selected data fields, and wherein the aesthetic qualities are selected from the group consisting of aspect ratio of the rendered data visualizations and measuring an extent to which entire rendered data visualizations can be displayed on a user screen at one time in a human readable format.

26. The computer system of claim 22, wherein the first scoring function of the set of scoring functions further scores each respective data visualization according to visual encodings of the plurality of data values stored in one or more of the plurality of user-selected data fields and wherein visual encoding of a user-selected data field comprises assigning a size, shape, or color to visual marks according to the plurality of data values stored in the user-selected data field.

27. The computer system of claim 22, wherein each of the data visualizations has a unique respective view type that specifies how it is rendered and wherein each of the data visualizations has a view type selected from the group consisting of text table, bar chart, scatter plot, line graph, and map.

28. The computer system of claim 27, wherein the set of scoring functions is hierarchical, comprising a first set of criteria that ranks view types based on the plurality of user-selected data fields, and a respective view-specific set of criteria that ranks individual data visualizations for the respective view type based on the plurality of user-selected data fields.

29. The computer system of claim 22, the one or more programs comprising instructions for:

receiving user specification of one or more visual layout properties for layout of a data visualization that includes the plurality of user-selected data fields;

wherein the set of scoring functions includes a second scoring function that measures an extent to which a data visualization of the plurality of data visualizations is consistent with the user specified visual layout properties.

30. A non-transitory computer readable storage medium storing one or more programs configured for execution by a computer system having one or more processors and memory storing one or more programs for execution by the one or more processors, the one or more programs comprising instructions for:

receiving user selection of a plurality of data fields from a set of data;

identifying a plurality of data visualizations that use a majority of the plurality of user-selected data fields;

for each of the plurality of data visualizations, computing a total score comprising a weighted sum of a respective plurality of scores determined using a set of scoring functions, wherein a first score of the respective plurality of scores is determined using a first scoring function of the set of scoring functions, which scores each data visualization based on statistical properties of a plurality of data values stored in one or more of the plurality of user-selected data fields in the set of data; and creating a first ranked list of the plurality of data visualizations, wherein the first ranked list is ordered according to the computed total scores of the plurality of data visualizations.

* * * * *